(12) United States Patent
Yamazaki et al.

(10) Patent No.: US 12,243,482 B2
(45) Date of Patent: Mar. 4, 2025

(54) DISPLAY DEVICE AND DISPLAY CORRECTION SYSTEM

(71) Applicant: Semiconductor Energy Laboratory Co., Ltd., Atsugi (JP)

(72) Inventors: Shunpei Yamazaki, Setagaya (JP); Hajime Kimura, Atsugi (JP); Tatsuya Onuki, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/036,221

(22) PCT Filed: Nov. 24, 2021

(86) PCT No.: PCT/IB2021/060902
§ 371 (c)(1),
(2) Date: May 10, 2023

(87) PCT Pub. No.: WO2022/118141
PCT Pub. Date: Jun. 9, 2022

(65) Prior Publication Data
US 2023/0410738 A1    Dec. 21, 2023

(30) Foreign Application Priority Data

Dec. 6, 2020 (JP) .................. 2020-202340
Dec. 11, 2020 (JP) .................. 2020-205895
Feb. 25, 2021 (JP) .................. 2021-028883

(51) Int. Cl.
*G09G 3/3233* (2016.01)

(52) U.S. Cl.
CPC ... *G09G 3/3233* (2013.01); *G09G 2300/0814* (2013.01); *G09G 2310/08* (2013.01);
(Continued)

(58) Field of Classification Search
CPC ...... G09G 3/3233; G09G 3/32; G09G 3/3208; G09G 2300/0814; G09G 2300/0842;
(Continued)

(56) References Cited

U.S. PATENT DOCUMENTS 5,953,985 A    9/1999 Kobayashi
6,120,338 A    9/2000 Hirano et al.
(Continued)

FOREIGN PATENT DOCUMENTS

CN    001339876 A    3/2002
CN    001477492 A    2/2004
(Continued)

OTHER PUBLICATIONS

International Search Report (Application No. PCT/IB2021/060902) Dated Mar. 22, 2022.
(Continued)

*Primary Examiner* — Christopher E Leiby
(74) *Attorney, Agent, or Firm* — Eric J. Robinson; Robinson Intellectual Property Law Office, P.C.

(57) ABSTRACT

A display device excellent in downsizing, reduction in power consumption, or layout flexibility of an arithmetic device is provided. The display device includes a pixel circuit, a driver circuit, and a functional circuit. The driver circuit has a function of outputting an image signal for performing display in the pixel circuit. The functional circuit includes a CPU including a CPU core including a flip-flop electrically connected to a backup circuit. The display device includes a first layer and a second layer. The first layer includes the driver circuit and the CPU. The second layer includes the pixel circuit and the backup circuit. The first layer includes a semiconductor layer including silicon in a channel formation region. The second layer includes a semiconductor layer including a metal oxide in a channel
(Continued)

formation region. The CPU has a function of correcting the image signal in accordance with the amount of current flowing through the pixel circuit.

16 Claims, 42 Drawing Sheets

(52) U.S. Cl.
CPC .............. G09G 2320/0626 (2013.01); G09G 2330/021 (2013.01); G09G 2330/10 (2013.01)

(58) Field of Classification Search
CPC ..... G09G 2300/023; G09G 2300/0417; G09G 2300/0426; G09G 2300/0452; G09G 2300/0861; G09G 2300/0404; G09G 2310/08; G09G 2310/0289; G09G 2320/0626; G09G 2320/0233; G09G 2320/0295; G09G 2330/021; G09G 2330/10; G09G 2330/08; G02B 27/02; G09F 9/30; G09F 9/335; H05B 33/02; H10K 50/00; H10K 59/00; H10K 59/12
See application file for complete search history.

(56) References Cited

U.S. PATENT DOCUMENTS

| | | | |
|---|---|---|---|
| 7,196,709 B2 | 3/2007 | Kurokawa. et al. | |
| 7,250,927 B2 | 7/2007 | Yamazaki et al. | |
| 7,791,610 B2 | 9/2010 | Kurokawa et al. | |
| 8,072,400 B2 | 12/2011 | Mizukoshi et al. | |
| 8,605,010 B2 | 12/2013 | Yamazaki et al. | |
| 9,225,329 B2 | 12/2015 | Kozuma et al. | |
| 9,385,713 B2 | 7/2016 | Uesugi et al. | |
| 9,601,215 B2 | 3/2017 | Ohmaru | |
| 9,979,386 B2 | 5/2018 | Kozuma et al. | |
| 10,177,142 B2 | 1/2019 | Tamura | |
| 10,373,983 B2 | 8/2019 | Takahashi et al. | |
| 10,430,093 B2 | 10/2019 | Kurokawa | |
| 10,586,495 B2 | 3/2020 | Kobayashi et al. | |
| 10,770,482 B2 | 9/2020 | Kawashima et al. | |
| 10,862,036 B2 | 12/2020 | Ke et al. | |
| 11,068,174 B2 | 7/2021 | Kurokawa | |
| 11,205,387 B2 | 12/2021 | Kobayashi et al. | |
| 2002/0036604 A1 | 3/2002 | Yamazaki et al. | |
| 2002/0072139 A1 | 6/2002 | Kashiwabara | |
| 2003/0103025 A1 | 6/2003 | Kurokawa. et al. | |
| 2005/0270259 A1 | 12/2005 | Shirasaki et al. | |
| 2008/0024399 A1 | 1/2008 | Yamazaki et al. | |
| 2009/0160742 A1 | 6/2009 | Mizukoshi et al. | |
| 2011/0148290 A1 | 6/2011 | Oota | |
| 2012/0256204 A1 | 10/2012 | Yoshizumi et al. | |
| 2012/0273804 A1 | 11/2012 | Hatano | |
| 2012/0276484 A1 | 11/2012 | Izumi et al. | |
| 2013/0084531 A1 | 4/2013 | Hamaguchi et al. | |
| 2013/0084664 A1 | 4/2013 | Yoshitoku et al. | |
| 2013/0084666 A1 | 4/2013 | Oshige | |
| 2013/0280839 A1 | 10/2013 | Sonoda et al. | |
| 2013/0295705 A1 | 11/2013 | Sonoda et al. | |
| 2014/0004640 A1 | 1/2014 | Hamaguchi et al. | |
| 2014/0004642 A1 | 1/2014 | Otsuka et al. | |
| 2015/0060826 A1 | 3/2015 | Matsumoto et al. | |
| 2015/0069360 A1 | 3/2015 | Sato | |
| 2015/0076476 A1 | 3/2015 | Odaka et al. | |
| 2015/0263723 A1* | 9/2015 | Takahashi ............. H01L 27/124 327/108 | |
| 2015/0294991 A1 | 10/2015 | Ishizu | |
| 2016/0172595 A1 | 6/2016 | Malinowski et al. | |
| 2016/0315133 A1 | 10/2016 | Sato | |
| 2017/0141167 A1 | 5/2017 | Naganuma | |
| 2017/0256754 A1 | 9/2017 | Defranco et al. | |
| 2017/0300261 A1 | 10/2017 | Kurokawa | |
| 2017/0337884 A1* | 11/2017 | Kurokawa ............. G02F 1/136 | |
| 2018/0026218 A1 | 1/2018 | Kobayashi et al. | |
| 2018/0090111 A1* | 3/2018 | Kozuma ................. G09G 3/36 | |
| 2018/0096648 A1* | 4/2018 | Kurokawa ............. G09G 3/035 | |
| 2018/0190908 A1 | 7/2018 | Ke et al. | |
| 2018/0336827 A1 | 11/2018 | Zahirovic et al. | |
| 2019/0378859 A1 | 12/2019 | Kawashima et al. | |
| 2020/0203662 A1 | 6/2020 | Mollard et al. | |
| 2021/0383762 A1 | 12/2021 | Kobayashi et al. | |
| 2023/0025460 A1 | 1/2023 | Yoshiyasu. et al. | |

FOREIGN PATENT DOCUMENTS

| | | |
|---|---|---|
| CN | 001707569 A | 12/2005 |
| CN | 108962139 A | 12/2018 |
| CN | 109074296 A | 12/2018 |
| EP | 1182636 A | 2/2002 |
| EP | 1605507 A | 12/2005 |
| JP | 11-184792 A | 7/1999 |
| JP | 2000-002856 A | 1/2000 |
| JP | 2000-036385 A | 2/2000 |
| JP | 2002-140034 A | 5/2002 |
| JP | 2003-059663 A | 2/2003 |
| JP | 2003-167558 A | 6/2003 |
| JP | 2005-345976 A | 12/2005 |
| JP | 2007-004424 A | 1/2007 |
| JP | 2008-098106 A | 4/2008 |
| JP | 2008-147072 A | 6/2008 |
| JP | 2008-251270 A | 10/2008 |
| JP | 2009-151218 A | 7/2009 |
| JP | 2014-120218 A | 6/2014 |
| JP | 2014-135251 A | 7/2014 |
| JP | 2014-232568 A | 12/2014 |
| JP | 2015-115178 A | 6/2015 |
| JP | 2016-197494 A | 11/2016 |
| JP | 2017-194680 A | 10/2017 |
| JP | 2018-022143 A | 2/2018 |
| JP | 2019-179696 A | 10/2019 |
| JP | 2019-215534 A | 12/2019 |
| JP | 2020-160305 A | 10/2020 |
| KR | 2002-0015978 A | 3/2002 |
| KR | 2003-0044796 A | 6/2003 |
| KR | 2006-0048203 A | 5/2006 |
| KR | 2018-0134359 A | 12/2018 |
| WO | WO-2017/178923 | 10/2017 |

OTHER PUBLICATIONS

Written Opinion (Application No. PCT/IB2021/060902) Dated Mar. 22, 2022.
Zakhidov.A et al., "Orthogonal processing: A new strategy for organic electronics", Chem. Sci. (Chemical Science), Apr. 7, 2011, vol. 2, No. 6, pp. 1178-1182.
Malinowski.P et al., "High resolution photolithography for direct view active matrix organic light-emitting diode augmented reality displays", J. Soc. Inf. Display (Journal of the Society for Information Display), Apr. 2, 2018, vol. 26, No. 3, pp. 128-136.
Malinowski.P et al., "Photolithographic patterning of organic photodetectors with a non-fluorinated photoresist system", Organic Electronics, Jul. 12, 2014, vol. 15, No. 10, pp. 2355-2359.
Malinowski.P et al., "Multicolor 1250 ppi OLED Arrays Patterned by Photolithography", SID Digest '16 : SID International Symposium Digest of Technical Papers, May 22, 2016, vol. 47, No. 1, pp. 1009-1012.
Papadopoulos.N et al., "AMOLED Displays with In-Pixel Photodetector", Liquid Crystals and Display Technology, Jul. 9, 2020, pp. 1-19.
Ke. T et al., "Technology Developments in High-Resolution FMM-free OLED and BEOL IGZO TFTs for Power-Efficient Microdisplays", SID Digest '21 : SID International Symposium Digest of Technical Papers, May 1, 2021, vol. 52, No. 1, pp. 127-130.
Malinowski.P et al., "Integration of additional functionalities into the frontplane of AMOLED displays", SID Digest '20 : SID International Symposium Digest of Technical Papers, Aug. 1, 2020, vol. 51, No. 1, pp. 646-649.
Malinowski.P et al., "Organic photolithography for displays with integrated fingerprint scanner", SID Digest '19 : SID International Symposium Digest of Technical Papers, May 29, 2019, vol. 50, No. 1, pp. 1007-1010.

(56) References Cited

OTHER PUBLICATIONS

Ke. T et al., "Island and Hole Fabrication on OLED Stack for High-Resolution Sensor in Display Application", IDW '20 : Proceedings of the 27th International Display Workshops, Dec. 9, 2020, vol. 27, pp. 902-905.

Gather.M et al., "Solution-Processed Full-Color Polymer-OLED Displays Fabricated by Direct Photolithography", SID Digest '06 : SID International Symposium Digest of Technical Papers, Jun. 1, 2006, vol. 37, No. 1, pp. 909-911.

Malinowski.P et al., "Photolithography as Enabler of AMOLED Displays Beyond 1000 ppi", SID Digest '17 : SID International Symposium Digest of Technical Papers, May 1, 2017, vol. 48, No. 1, pp. 623-626.

\* cited by examiner

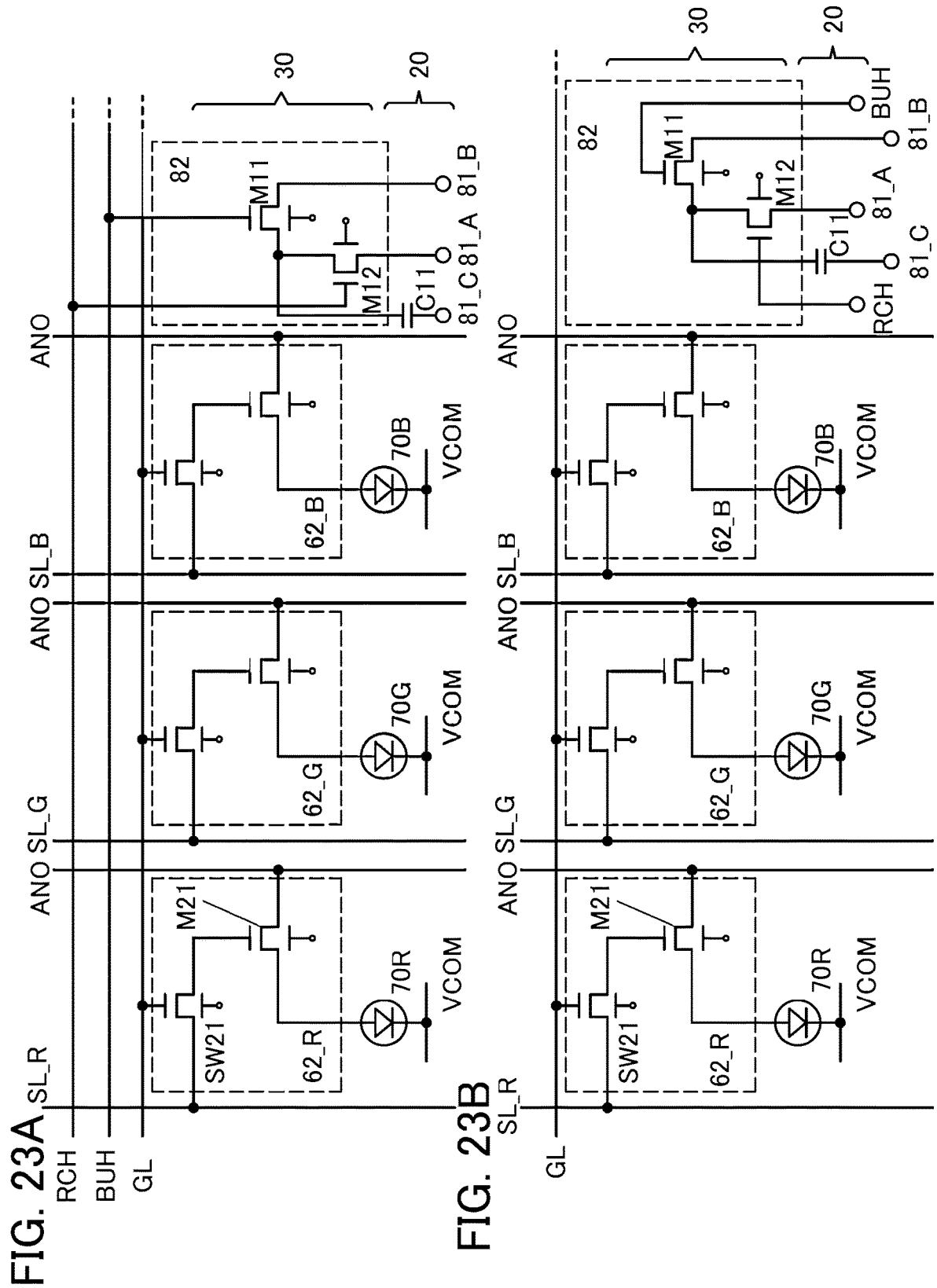

FIG. 39A
Intermediate state
New crystalline phase
| Amorphous | Crystalline | Crystal |
|---|---|---|
| •completely amorphous | •CAAC<br>•nc<br>•CAC<br><br>excluding single crystal and poly crystal | •single crystal<br>•poly crystal |
FIG. 39B
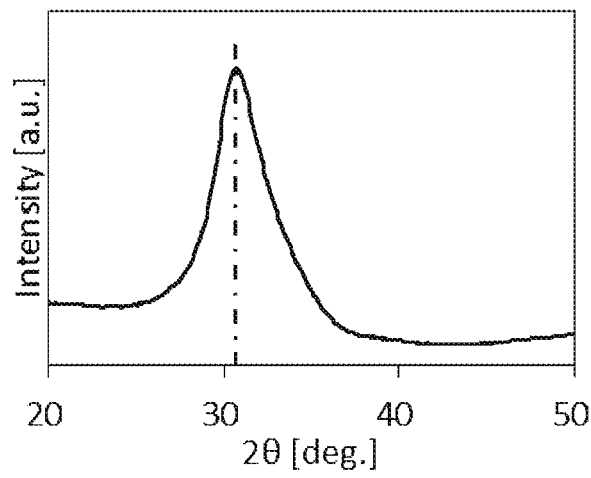
FIG. 39C
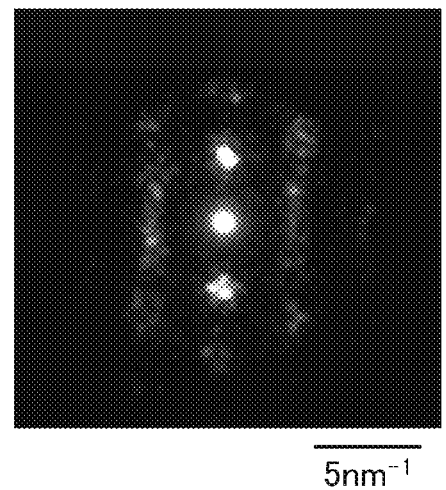

DISPLAY DEVICE AND DISPLAY CORRECTION SYSTEM

TECHNICAL FIELD

One embodiment of the present invention relates to a display device and a display correction system.

Note that one embodiment of the present invention is not limited to the above technical field. Examples of the technical field of one embodiment of the present invention disclosed in this specification and the like include a semiconductor device, an imaging device, a display device, a light-emitting device, a power storage device, a memory device, a display system, an electronic device, a lighting device, an input device, an input-output device, a driving method thereof, and a manufacturing method thereof.

In this specification and the like, a semiconductor device refers to every device that can function by utilizing semiconductor characteristics. A display device (a liquid crystal display device, a light-emitting display device, and the like), a projection device, a lighting device, an electro-optical device, a power storage device, a memory device, a semiconductor circuit, an imaging device, an electronic device, and the like can sometimes be regarded as a semiconductor device. Alternatively, they can sometimes be regarded as including a semiconductor device.

BACKGROUND ART

As electronic devices with display devices for augmented reality (AR) or virtual reality (VR), wearable electronic devices and stationary electronic devices are becoming widespread. Examples of wearable electronic devices include a head-mounted display (HMD) and an eyeglass-type electronic device. Examples of stationary electronic devices include a head-up display (HUD).

When using an electronic device such as an HMD with a small distance between a display portion and a user, the user is likely to perceive pixels and strongly feels granularity, whereby the sense of immersion and realistic sensation of AR and VR might be diminished. Therefore, an HMD preferably includes a display device that has minute pixels so that pixels are not perceived by the user. Patent Document 1 discloses a method in which an HMD having minute pixels is achieved by using transistors capable of high-speed driving.

REFERENCE

Patent Document

[Patent Document 1] Japanese Published Patent Application No. 2000-2856

SUMMARY OF THE INVENTION

Problems to be Solved by the Invention

Reducing the size of a pixel included in a display device can increase the pixel density. Thus, more pixels can be provided in the display device to enhance a sense of immersion or realistic sensation. Defects in pixels (bright spots or dark spots) are preferably reduced to further enhance a sense of immersion or realistic sensation.

To eliminate defects in pixels, a structure in which defects in pixels are corrected by an arithmetic device such as a CPU is effective. However, in the case where an arithmetic device such as a CPU and a display device are provided separately, an electronic device including the devices might be larger. Alternatively, when arithmetic processing for correcting defects in pixels is performed by an arithmetic device such as a CPU, the function of a display device might be impaired by heat generated from the arithmetic device, for example. Alternatively, when an arithmetic device and a display device are integrated, the degree of layout flexibility of the arithmetic device might be lost depending on the shape of the display device or the like.

An object of one embodiment of the present invention is to provide a display device, a display correction system, or the like with a novel structure. Another object of one embodiment of the present invention is to provide a display device, a display correction system, or the like which can be reduced in size. Another object of one embodiment of the present invention is to provide a display device, a display correction system, or the like which can achieve low power consumption. Another object of one embodiment of the present invention is to provide a display device, a display correction system, or the like in which the degree of layout flexibility of an arithmetic device is increased.

Note that the description of a plurality of objects does not preclude the existence of each object. Note that one embodiment of the present invention need not necessarily achieve all of these objects. Objects other than those listed above will be apparent from the description of the specification, the drawings, the claims, and the like, and such objects could be objects of one embodiment of the present invention.

Means for Solving the Problems

One embodiment of the present invention is a display device including a pixel circuit, a driver circuit, and a functional circuit; the driver circuit has a function of outputting a signal for performing display in the pixel circuit and the functional circuit includes a CPU including a CPU core including a flip-flop electrically connected to a backup circuit. The display device includes a first layer and a second layer; the first layer includes the driver circuit and the CPU and the second layer includes the pixel circuit and the backup circuit. The first layer and the second layer are provided in different layers.

One embodiment of the present invention is a display device including a pixel circuit, a driver circuit, and a functional circuit; the driver circuit has a function of outputting an image signal for performing display in the pixel circuit and the functional circuit includes a CPU including a CPU core including a flip-flop electrically connected to a backup circuit. The display device includes a first layer and a second layer; the first layer includes the driver circuit and the CPU and the second layer includes the pixel circuit and the backup circuit. The first layer and the second layer are provided in different layers. The CPU has a function of correcting the image signal in accordance with the amount of current flowing through the pixel circuit.

One embodiment of the present invention is a display device including a pixel circuit, a driver circuit, and a functional circuit; the driver circuit has a function of outputting an image signal for performing display in the pixel circuit and the functional circuit includes a CPU including a CPU core including a flip-flop electrically connected to a backup circuit. The display device includes a first layer and a second layer; the first layer includes the driver circuit and the CPU and the second layer includes the pixel circuit and the backup circuit. The first layer includes a first transistor including a semiconductor layer including silicon in a channel formation region and the second layer includes a second transistor including a semiconductor layer including a metal oxide in a channel formation region. The CPU has a function of correcting the image signal in accordance with the amount of current flowing through the pixel circuit.

In the display device of one embodiment of the present invention, it is preferable that the metal oxide include In, an element M (M is Al, Ga, Y, or Sn), and Zn.

In the display device of one embodiment of the present invention, it is preferable that the backup circuit have a function of retaining data stored in the flip-flop in a state where supply of power supply voltage is stopped when the CPU is not activated.

In the display device of one embodiment of the present invention, it is preferable that the functional circuit include an accelerator, and the accelerator be a circuit performing product-sum operation.

In the display device of one embodiment of the present invention, it is preferable that the pixel circuit include an organic EL device, and the organic EL device be a light-emitting device processed by a photolithography method.

In the display device of one embodiment of the present invention, it is preferable that the backup circuit include the first transistor provided in the first layer and a capacitor electrically connected to the first transistor, and the capacitor be provided in the first layer.

One embodiment of the present invention is a display correction system including a pixel circuit, a driver circuit, and a functional circuit; the driver circuit has a function of outputting an image signal for performing display in the pixel circuit and the functional circuit includes a CPU including a CPU core including a flip-flop electrically connected to a backup circuit. The display correction system includes a first layer and a second layer; the first layer includes the driver circuit and the CPU and the second layer includes the pixel circuit and the backup circuit. The backup circuit has a function of retaining data stored in the flip-flop by bringing a first transistor including a semiconductor layer including silicon in a channel formation region into an off state when the CPU is not activated and the CPU has a function of correcting the image signal through estimation of a defective pixel in accordance with the amount of current flowing through the pixel circuit. In the correction, the amount of current flowing through a pixel circuit of a pixel adjacent to the defective pixel is corrected.

Note that other embodiments of the present invention are shown in the description of the following embodiments and the drawings.

Effect of the Invention

One embodiment of the present invention can provide a display device, a display correction system, or the like with a novel structure. Another embodiment of the present invention can provide a display device, a display correction system, or the like which can be reduced in size. Another embodiment of the present invention can provide a display device, a display correction system, or the like which can achieve low power consumption. Another embodiment of the present invention can provide a display device, a display correction system, or the like in which the degree of layout flexibility of an arithmetic device is increased.

Note that the description of these effects does not preclude the existence of other effects. Note that one embodiment of the present invention need not necessarily have all of these effects. Other effects will be apparent from and can be derived from the description of the specification, the drawings, the claims, and the like.

BRIEF DESCRIPTION OF THE DRAWINGS

FIG. 23A and FIG. 23B are circuit diagrams illustrating configuration examples of a display device.

FIG. 39A is a diagram showing the classification of crystal structures of IGZO. FIG. 39B is a graph showing an XRD spectrum of a CAAC-IGZO film. FIG. 39C is a diagram showing nanobeam electron diffraction patterns of a CAAC-IGZO film.

MODE FOR CARRYING OUT THE INVENTION

Figure 1:
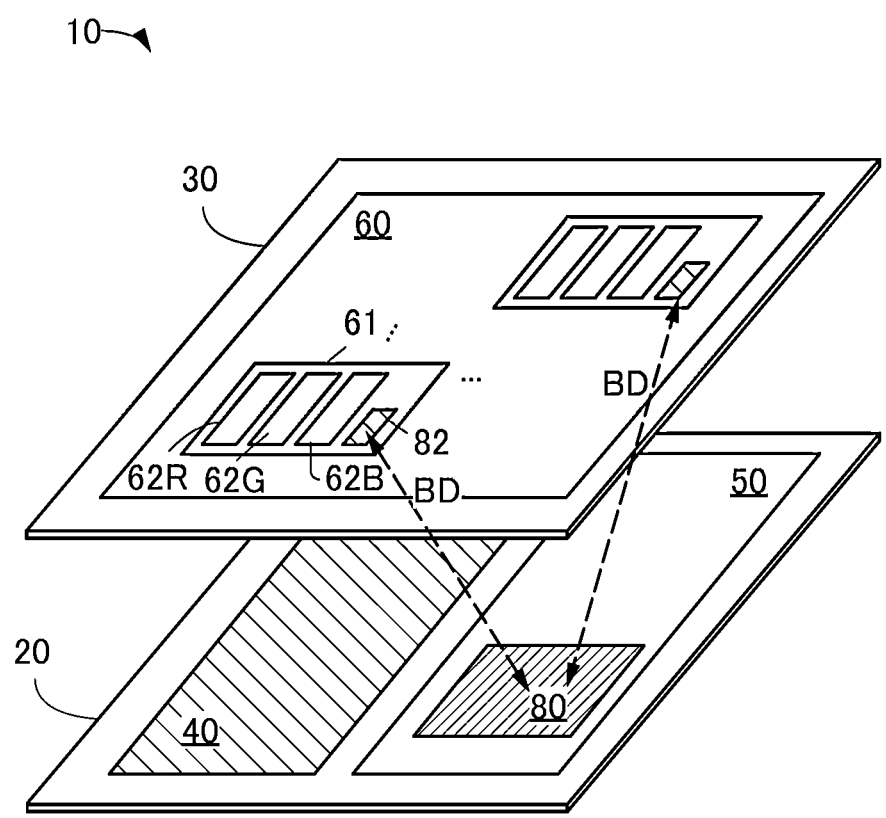
FIG. 1 is a block diagram illustrating a structure example of a display device.

Embodiments will be described below with reference to the drawings. However, the embodiments can be implemented with various modes, and it will be readily appreciated by those skilled in the art that modes and details can be changed in various ways without departing from the spirit and scope of the present invention. Thus, the present invention should not be construed as being limited to the following description of the embodiments.

In the drawings, the size, the layer thickness, or the region is exaggerated for clarity in some cases. Therefore, the drawings are not limited to the illustrated scale. Note that the drawings schematically show ideal examples, and embodiments of the present invention are not limited to shapes, values, and the like shown in the drawings.

Unless otherwise specified, off-state current in this specification and the like refers to drain current of a transistor in an off state (also referred to as a non-conduction state or a cutoff state). Unless otherwise specified, an off state in an n-channel transistor refers to a state where the voltage $V_{gs}$ between its gate and source is lower than the threshold voltage $V_{th}$ (higher than $V_{th}$ in a p-channel transistor).

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when an OS transistor is described, it can also be referred to as a transistor including an oxide or an oxide semiconductor.

Embodiment 1

In this embodiment, a display device and a display correction system, each of which is one embodiment of the present invention, are described.

<Structure Example of Display Device>

FIG. 1 is a block diagram schematically illustrating a structure example of a display device 10 that is a display device of one embodiment of the present invention. The display device 10 includes a layer 20 and a layer 30. The layer 30 can be stacked above the layer 20, for example. An interlayer insulator, a conductor for electrical connection between different layers, or the like can be provided between the layer 20 and the layer 30.

For example, a transistor provided in the layer 20 can be a transistor including silicon in a channel formation region (also referred to as a Si transistor), such as a transistor including single crystal silicon in a channel formation region. In particular, the use of a transistor including single crystal silicon in a channel formation region as the transistor provided in the layer 20 can increase the on-state current of the transistor. Thus, this is preferable because a circuit included in the layer 20 can be driven at high speed. The Si transistor can be formed by microfabrication to have a channel length of 3 nm to 10 nm; therefore, the display device 10 can be provided with a CPU, an accelerator such as a GPU, an application processor, or the like.

A transistor provided in the layer 30 can be an OS transistor, for example. In particular, a transistor including an oxide including at least one of indium, an element M (the element M is aluminum, gallium, yttrium, or tin), and zinc in a channel formation region is preferably used as the OS transistor. Such an OS transistor has a characteristic of extremely low off-state current. Thus, it is particularly preferable to use the OS transistor as a transistor provided in a pixel circuit included in a display portion, in which case analog data written to the pixel circuit can be retained for a long period.

A driver circuit 40 and a functional circuit 50 are provided in the layer 20. The Si transistor of the layer 20 can have increased on-state current of the transistor. Thus, each circuit can be driven at high speed.

A display portion 60 provided with a plurality of pixels 61 is provided in the layer 30. Pixel circuits 62R, 62G, and 62B that control emission of red, green, and blue light are provided in the pixel 61. Each of the pixel circuits 62R, 62G, and 62B has a function of a subpixel of the pixel 61. Since the pixel circuits 62R, 62G, and 62B include OS transistors, analog data written to the pixel circuits can be retained for a long period. A backup circuit 82 is provided in each of the pixels 61 included in the layer 30. Note that the backup circuit is sometimes referred to as a storage circuit or a memory circuit.

The driver circuit 40 includes a gate line driver circuit, a source line driver circuit, and the like for driving the pixel circuits 62R, 62G, and 62B. The driver circuit 40 includes, for example, a gate line driver circuit and a source line driver circuit for driving the pixels 61 in the display portion 60. With a structure in which the driver circuit 40 is provided in the layer 20 different from the layer 30 where the display is provided, an area occupied by the display portion in the layer 30 can be larger. In addition, the driver circuit 40 may include, for example, an LVDS (Low Voltage Differential Signaling) circuit or a D/A (Digital to Analog) converter circuit which has a function of an interface for receiving data such as image data from the outside of the display device 10. The Si transistor of the layer 20 can have increased on-state current of the transistor. The channel length, the channel width, or the like of the Si transistor may be varied depending on the operation speed of each circuit.

The functional circuit 50 includes a CPU used for arithmetic processing of data. The CPU includes a plurality of CPU cores. The CPU cores each include a flip-flop. The flip-flop includes a plurality of scan flip-flops. A flip-flop 80 inputs and outputs data of the scan flip-flops (backup data) to and from the backup circuit 82. FIG. 1 illustrates backup data BD as a data signal retained in the backup circuit 82.

As the backup circuit 82, for example, a memory including OS transistors is suitable. The backup circuit formed with OS transistors has advantages of, for example, inhibiting a decrease in voltage corresponding to data to be backed up and consuming almost no electric power for data retention, because the OS transistors have extremely low off-state current. The backup circuit 82 including the OS transistors can be provided in the display portion 60 in which the plurality of pixels 61 are provided. FIG. 1 illustrates a state where the backup circuit 82 is provided in each of the pixels 61.

The backup circuits 82 formed with OS transistors can be stacked over the layer 20 including Si transistors. The backup circuits 82 may be arranged in a matrix like the subpixels in the pixels 61; alternatively, the backup circuit 82 may be provided for every plurality of pixels. That is, the backup circuit 82 can be provided in the layer 30 without being limited by the arrangement of the pixels 61. Therefore, the backup circuit 82 can be arranged without an increase in the circuit area and the layout flexibility of the display portion/the circuits is enhanced, so that storage capacity of the backup circuits 82 required for arithmetic processing can be increased.

<Structure Example of Pixel Circuit and Backup Circuit>

Figure 2:
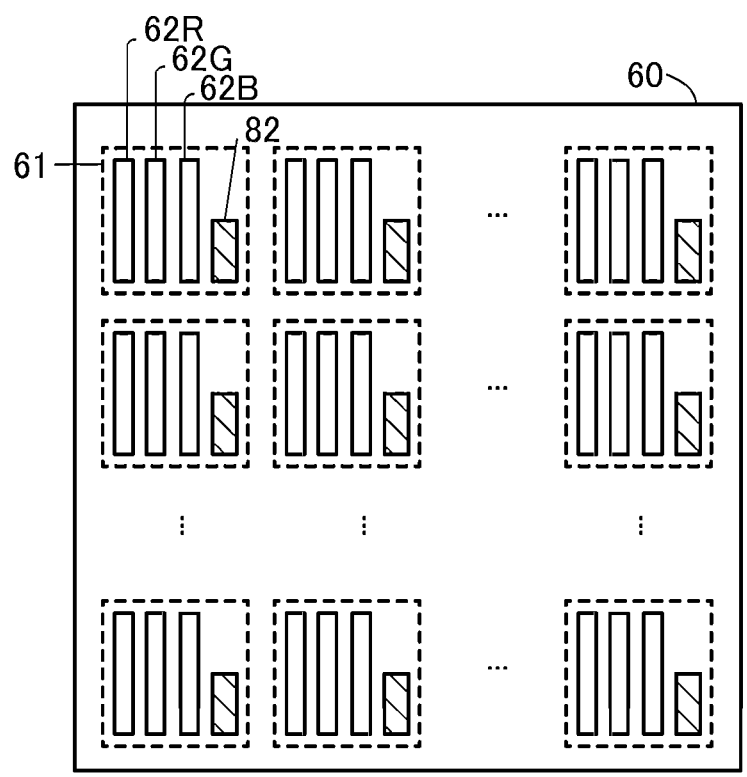
FIG. 2 is a block diagram illustrating a structure example of a display device.
Figure 3:
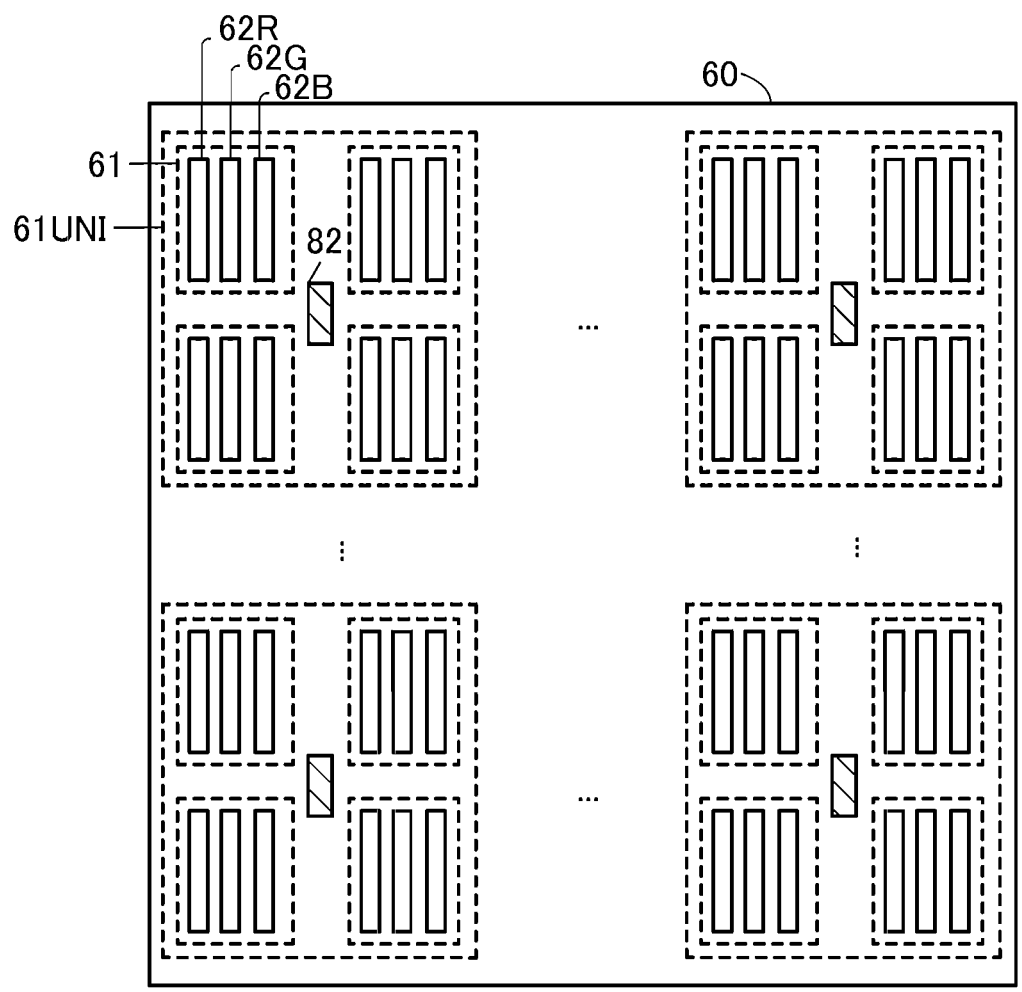
FIG. 3 is a block diagram illustrating a structure example of a display device.

FIG. 2 to FIG. 4 show structure examples of the arrangement of the backup circuit 82 and the pixel circuits 62R, 62G, and 62B that are the subpixels in the display portion 60.

FIG. 2 illustrates a structure in which the plurality of pixels 61 are arranged in a matrix in the display portion 60. The pixels 61 each include the backup circuit 82 as well as the pixel circuits 62R, 62G, and 62B. As described above, the backup circuit 82 and the pixel circuits 62R, 62G, and 62B can be formed with OS transistors and thus can be provided in the same pixel.

FIG. 3 illustrates a structure in which the plurality of pixels 61 are arranged in a matrix in the display portion 60, and FIG. 3 illustrates the pixels 61 in two rows and two columns as a unit pixel 61UNI. The pixels 61 each include the pixel circuits 62R, 62G, and 62B. The unit pixels 61UNI each include the backup circuit 82 in a position surrounded by four pixels 61. As described above, the backup circuit 82 and the pixels 61 can be formed with OS transistors and thus can be provided in the same unit pixel 61UNI.

Figure 4A:
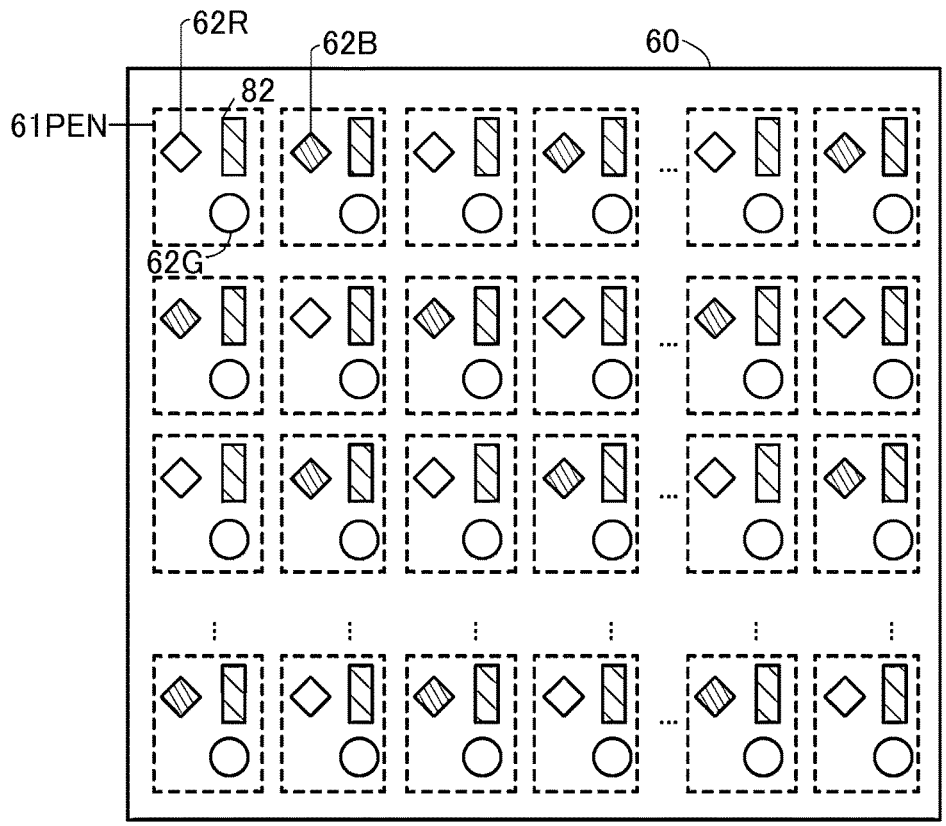
FIG. 4A and FIG. 4B are block diagrams illustrating structure examples of a display device.

FIG. 4A illustrates a structure in which pixels 61PEN which employ PenTile arrangement are arranged in the display portion. The pixels 61PEN each include, for example, the backup circuit 82 as well as the pixel circuits 62R and 62G or the pixel circuits 62B and 62G. As described above, the backup circuit 82 and the pixel circuits 62R and 62G or the pixel circuits 62B and 62G can be formed with OS transistors and thus can be provided in the same pixel.

Figure 4B:
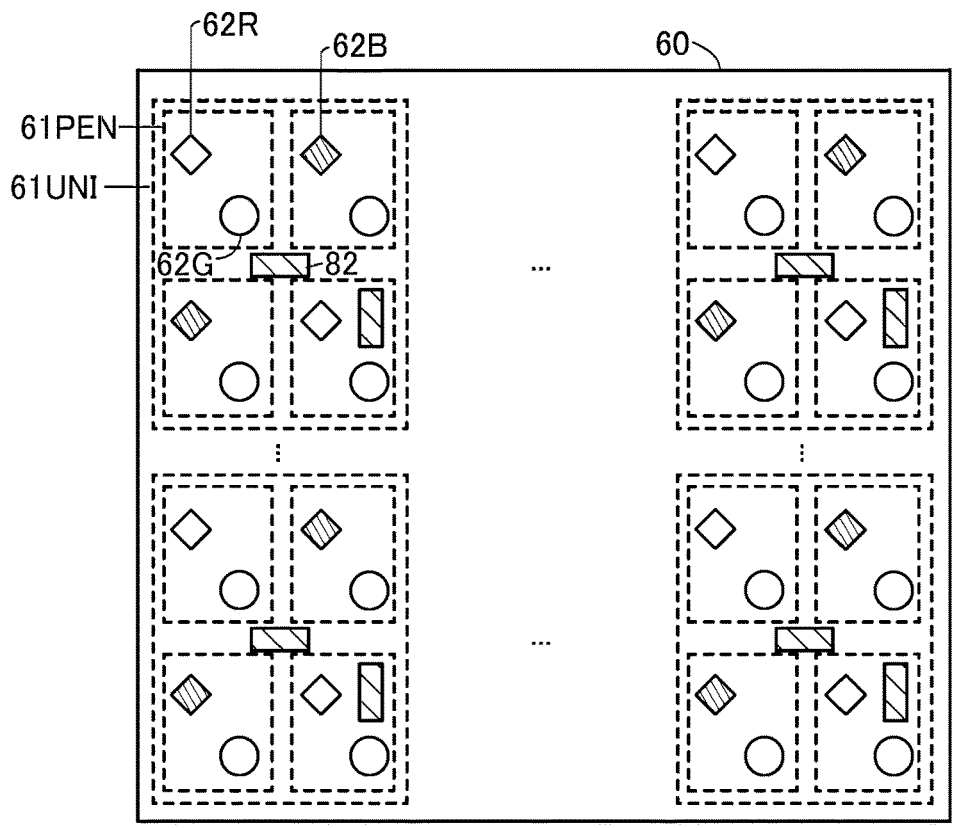

FIG. 4B illustrates a structure in which the pixels 61PEN are arranged in a matrix in the display portion 60, and FIG. 4B illustrates the pixels 61PEN in two rows and two columns as the unit pixel 61UNI. The pixels 61PEN each include the pixel circuit 62R and 62G or the pixel circuits 62B and 62G. The unit pixels 61UNI each include the backup circuit 82 in a position surrounded by the four pixels 61PEN. As described above, the backup circuit 82 and the pixels 61PEN can be formed with OS transistors and thus can be provided in the same unit pixel 61UNI.

<Block Diagram of Display Device>

Figure 5:
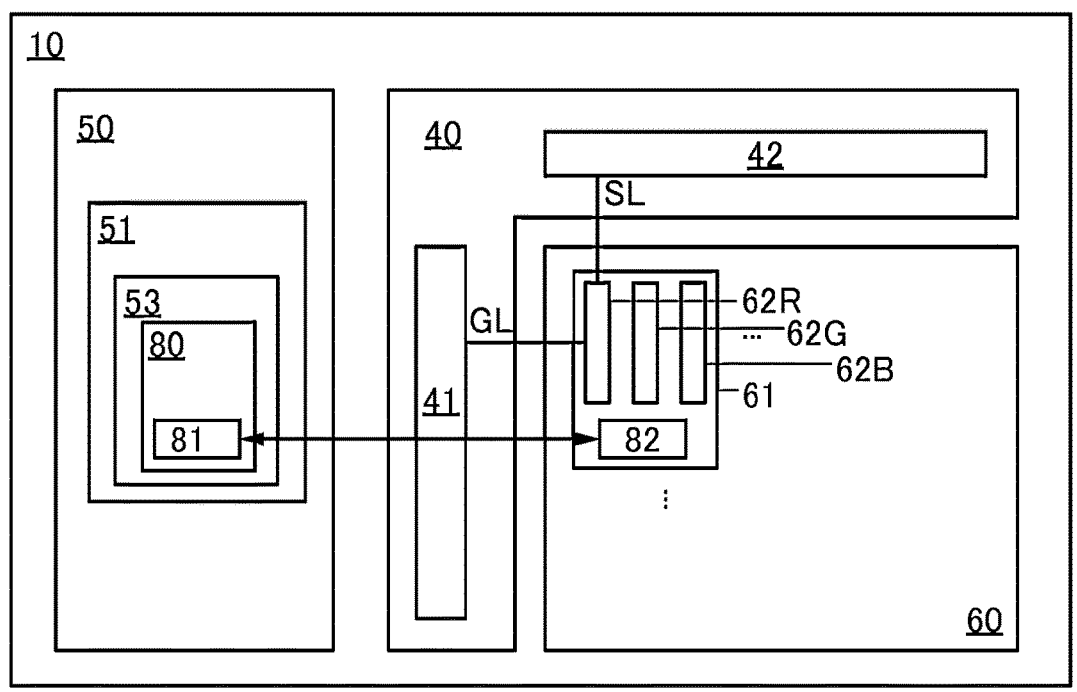
FIG. 5 is a block diagram illustrating a structure example of a display device.

Next, FIG. 5 illustrates a block diagram for describing each component included in the display device 10. The display device includes the driver circuit 40, the functional circuit 50, and the display portion 60.

The driver circuit 40 includes a gate driver 41 and a source driver 42, for example. The gate driver 41 has a function of driving a wiring GL which functions as a gate line for outputting signals to the pixel circuits 62R, 62G, and 62B. The source driver 42 has a function of driving a plurality of wirings SL which function as source lines for outputting signals to the pixel circuits 62R, 62G, and 62B. Furthermore, the driver circuit 40 supplies voltage for performing display with the pixel circuits 62R, 62G, and 62B to the pixel circuits 62R, 62G, and 62B through a plurality of wirings.

The functional circuit 50 includes a CPU 51. The CPU 51 includes a CPU core 53. The CPU core 53 includes the flip-flop 80 for temporarily retaining data used for arithmetic processing. The flip-flop 80 includes a plurality of scan flip-flops 81, and each of the scan flip-flops 81 is electrically connected to the backup circuit 82 provided in the display portion 60.

The display portion 60 includes the plurality of pixels 61 each including the pixel circuits 62R, 62G, and 62B and the backup circuit 82. The backup circuit 82 is not necessarily provided in the pixel 61 that is a repeating unit, as shown in FIGS. 2 to 4. The backup circuit 82 can be provided freely in accordance with the shape of the display portion 60, the shapes of the pixel circuits 62R, 62G, and 62B, and the like.

Figure 6:
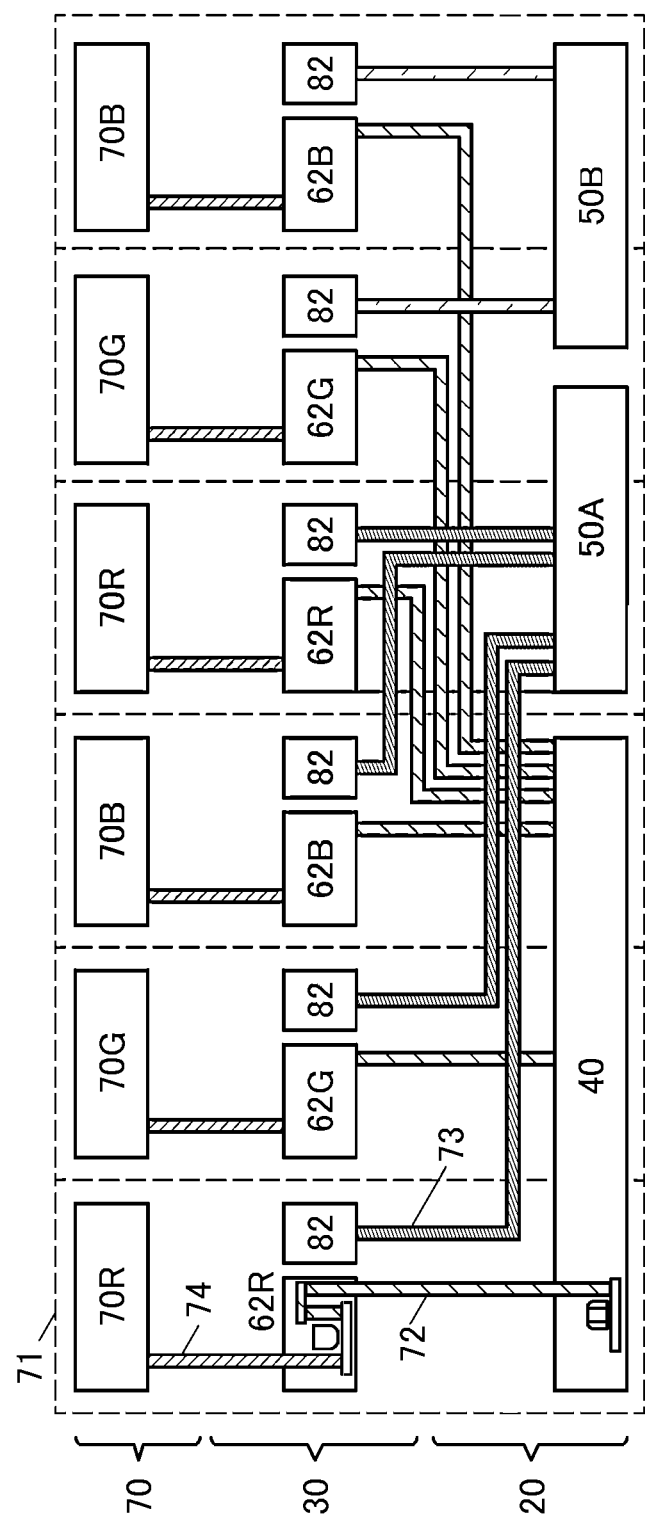
FIG. 6 is a block diagram illustrating a structure example of a display device.

FIG. 6 is a schematic view for showing a positional relation between the layer 30 and a light-emitting element 70 provided over the layer 20. FIG. 6 corresponds to an example of the cross-sectional schematic view of the display device 10 illustrated in FIG. 1.

In FIG. 6, the driver circuit 40 and functional circuits 50A and 50B as examples of the functional circuit 50 are illustrated in the layer 20. The driver circuit 40 and the functional circuits 50A and 50B each include a Si transistor. The functional circuits 50A and 50B are functional circuits having different functions.

In FIG. 6, the layer 30 includes the pixel circuits 62R, 62G, and 62B and the backup circuit 82 each provided in a position overlapping with the driver circuit 40 or the functional circuits 50A and 50B. FIG. 6 illustrates a structure example in which the pixel circuits each include the backup circuit.

In FIG. 6, the light-emitting element 70 includes light-emitting elements 70R, 70G, and which are connected to the pixel circuits 62R, 62G, and 62B, respectively. For example, the light-emitting element 70R, the pixel circuit 62R, the backup circuit 82, and the driver circuit 40 are provided to overlap with each other in a region 71.

As illustrated in FIG. 6, the functional circuit 50A and the functional circuit 50B are connected to different backup circuits 82 through wirings 72 and 73. As illustrated in FIG. 6, the pixel circuits 62R, 62G, and 62B are connected to the light-emitting elements 70R, 70G, and 70B, respectively, through wirings 74.

As illustrated in FIG. 6, the backup circuit 82 can be provided in the layer 30 where OS transistors are provided, and thus can be stacked over the layer 20 including Si transistors. The backup circuits 82 can be provided in the layer 30 without being limited by the arrangement of the pixels 61. Therefore, the backup circuits 82 can be provided without an increase in the circuit area and the layout flexibility of the display portion/the circuits is enhanced, so that storage capacity of the backup circuits 82 required for arithmetic processing can be increased. As a result, the functional circuit 50A and the functional circuit 50B can be operated intermittently, whereby power can be saved.

<Configuration Example of Pixel Circuit>

Figure 7A:
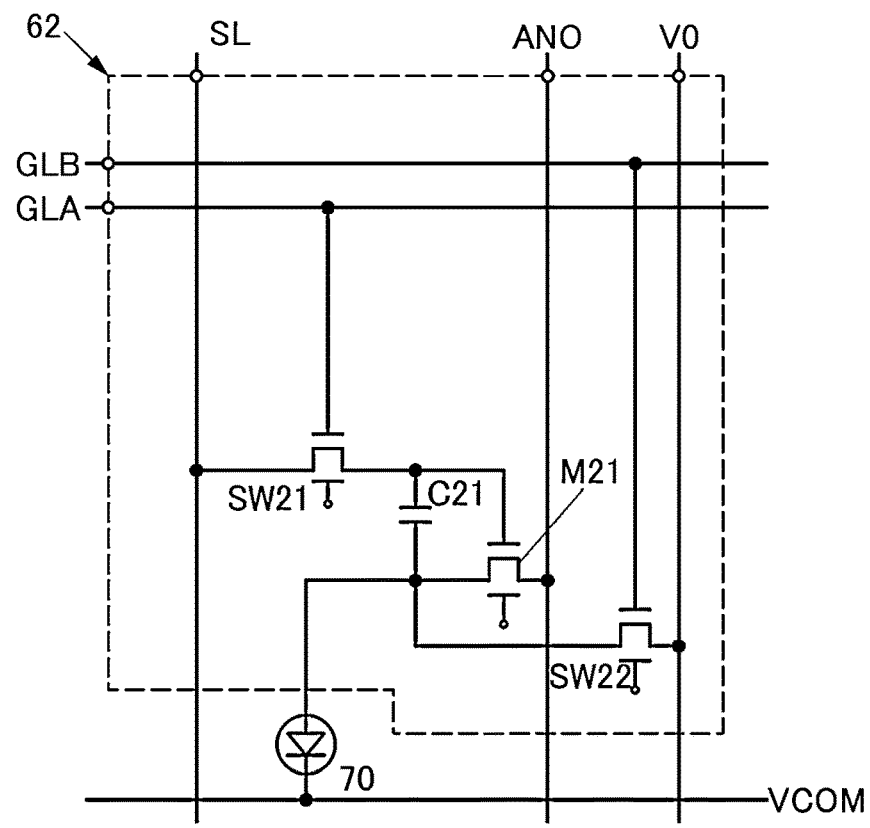
FIG. 7A and FIG. 7B are circuit diagrams illustrating a configuration example of a display device.
Figure 7B:
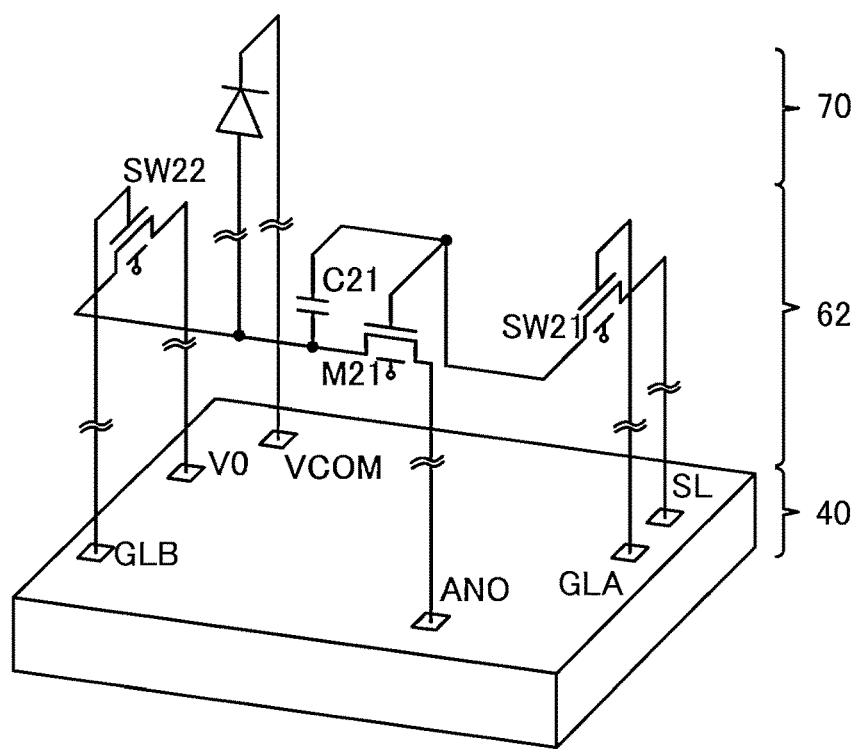

FIG. 7A and FIG. 7B illustrate a configuration example of a pixel circuit 62 that can be used as the pixel circuits 62R, 62G, and 62B and the light-emitting element 70 connected to the pixel circuit 62. FIG. 7A is a diagram illustrating connection between elements, and FIG. 7B is a diagram schematically illustrating the vertical positional relation between the driver circuit 40, the pixel circuit 62, and the light-emitting element 70.

In this specification and the like, the term "element" can be replaced with the term "device" in some cases. For example, a display element, a light-emitting element, and a liquid crystal element can be rephrased as a display device, a light-emitting device, and a liquid crystal device, respectively.

The pixel circuit 62, which is illustrated as an example in FIG. 7A and FIG. 7B, includes a switch SW21, a switch SW22, a transistor M21, and a capacitor C21. Here, the switch SW21 and the switch SW22 can be transistors. Note that the switches of the switch SW21 and the switch SW22 can also be transistors in some cases. The switch SW21, the switch SW22, and the transistor M21 can be formed with OS transistors. Each of the OS transistors of the switch SW21, the switch SW22, and the transistor M21 preferably includes a back gate electrode, in which case the structure in which the back gate electrode is supplied with the same signals as those supplied to the gate electrode or the structure in which the back gate electrode is supplied with signals different from those supplied to the gate electrode can be used.

The transistor M21 includes a gate electrode electrically connected to the switch SW21, a first electrode electrically connected to the light-emitting element 70, and a second electrode electrically connected to a wiring ANO. The wiring ANO is a wiring for supplying a potential for supplying current to the light-emitting element 70.

The switch SW21 includes a first terminal electrically connected to the gate electrode of the transistor M21 and a second terminal electrically connected to the wiring SL which functions as a source line, and has a function of controlling its conduction state or non-conduction state on the basis of the potential of a wiring GLA which functions as a gate line.

The switch SW22 includes a first terminal electrically connected to a wiring VO and a second terminal electrically connected to the light-emitting element 70, and has a function of controlling its conduction state or non-conduction state on the basis of the potential of a wiring GLB which functions as a gate line. The wiring VO is a wiring for supplying a reference potential and a wiring for outputting current flowing in the pixel circuit 62 to the driver circuit 40 or the functional circuit 50.

The capacitor C21 includes a conductive film electrically connected to the gate electrode of the transistor M21 and a conductive film electrically connected to the second electrode of the switch SW22.

The light-emitting element 70 includes a first electrode electrically connected to the first electrode of the transistor M21 and a second electrode electrically connected to a wiring VCOM. The wiring VCOM is a wiring for supplying a potential for supplying current to the light-emitting element 70.

Thus, the intensity of light emitted by the light-emitting element 70 can be controlled in accordance with an image signal supplied to the gate electrode of the transistor M21. The amount of current flowing through the light-emitting element 70 can be controlled by the reference potential of the wiring VO that is supplied through the switch SW22. It is possible to estimate the amount of current flowing through the light-emitting element by monitoring the amount of current flowing through the wiring VO with an external circuit. Thus, a defect of a pixel or the like can be detected.

Note that the light-emitting element described in one embodiment of the present invention refers to a self-luminous display element such as an organic EL element (also referred to as an OLED (Organic Light Emitting Diode)). Note that the light-emitting element electrically connected to the pixel circuit can be a self-luminous light-emitting element such as an LED (Light Emitting Diode), a micro LED, a QLED (Quantum-dot Light Emitting Diode), or a semiconductor laser. Alternatively, a liquid crystal element or the like can be used as a display element.

Note that in the structure illustrated as an example in FIG. 7B, the wirings electrically connecting the pixel circuit 62 and the driver circuit 40 can be shortened, so that wiring resistance of the wirings can be reduced. Thus, data can be written at high speed, enabling high-speed driving of the display device 10. Therefore, even when the number of the pixels 61 included in the display device 10 is increased, a sufficiently long frame period can be ensured, and thus, the pixel density of the display device 10 can be increased. In addition, the increased pixel density of the display device 10 can increase the resolution of an image displayed by the display device 10. For example, the pixel density of the display device 10 can be 1000 ppi or more, 5000 ppi or more, or 7000 ppi or more. Thus, the display device 10 can be, for example, a display device for AR or VR and can be suitably used in an electronic device with a short distance between the display portion and the user, such as an HMD.

Although signals and voltage of the wiring GLA, the wiring GLB, the wiring ANO, the wiring VCOM, the wiring VO, and the wiring SL are supplied from the driver circuit 40 below the pixel circuit 62 through the wirings in FIG. 7B, one embodiment of the present invention is not limited thereto. For example, a structure in which wirings for supplying signals and voltage of the driver circuit 40 are led to an outer region of the display portion 60 and electrically connected to the pixel circuits 62 arranged in a matrix in the layer 30 may be employed. In this case, a structure in which the gate driver 41 included in the driver circuit 40 is provided in the layer 30 is effective. That is, a structure in which OS transistors are used as transistors of the gate driver 41 is effective. In addition, a structure in which part of the function of the source driver 42 included in the driver circuit 40 is provided in the layer 30 is effective. For example, a structure in which a demultiplexer distributing signals output by the source driver 42 to each of source lines is provided in the layer 30 is effective. A structure in which OS transistors are used as transistors of the demultiplexer is effective.

Although in FIG. 7A and FIG. 7B, the pixel circuit 62 including three transistors, two transistors which function as switches and one transistor which functions as a driving transistor, is illustrated as an example, one embodiment of the present invention is not limited thereto. For example, the pixel circuit 62A illustrated in FIG. 8A or the pixel circuit 62B illustrated in FIG. 8A can also be employed.

Figure 8A:
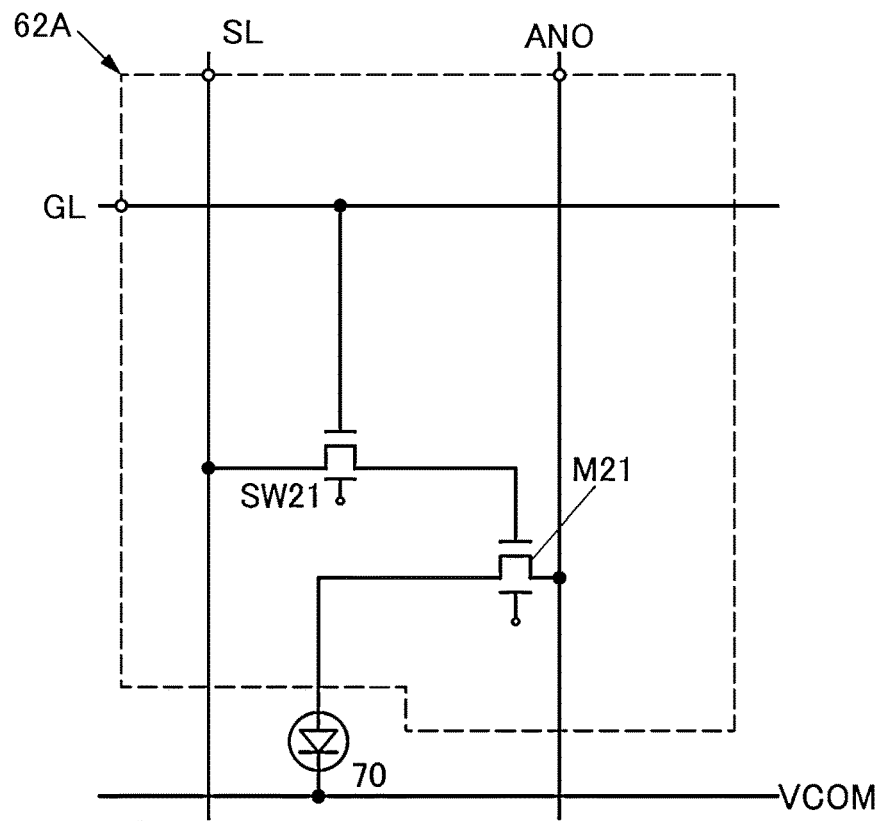
FIG. 8A and FIG. 8B are circuit diagrams illustrating configuration examples of display devices.
Figure 8B:
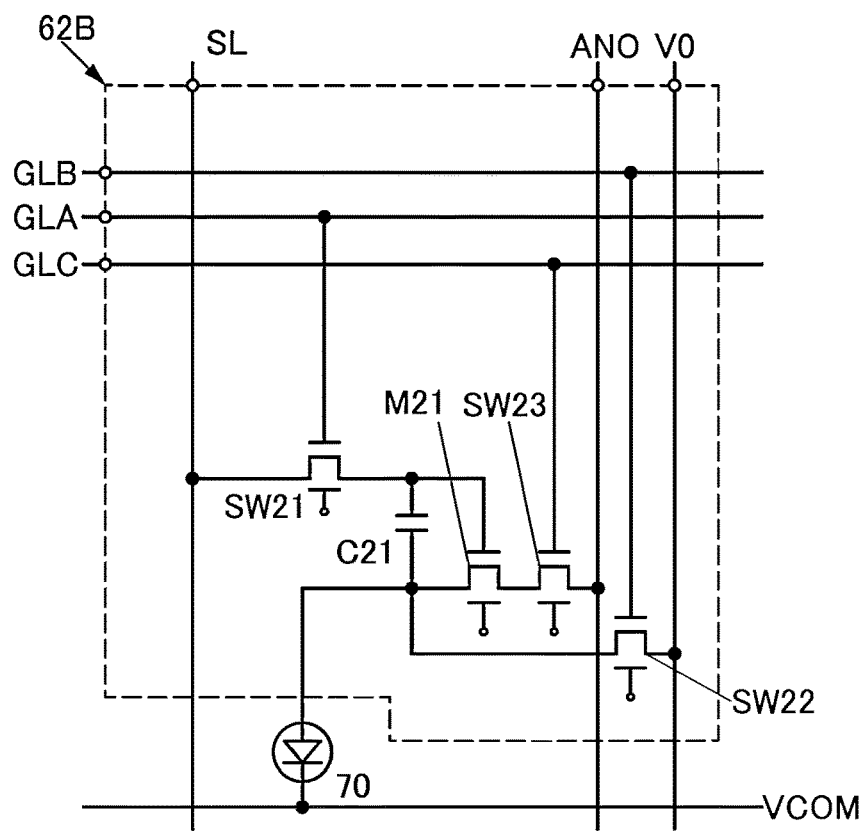

The pixel circuit 62A illustrated in FIG. 8A is a pixel circuit including two transistors, the switch SW21 and the transistor M21. The capacitor C21 in FIG. 7A and FIG. 7B can be omitted by utilizing the gate capacitance of the transistor M21. The pixel circuit 62B illustrated in FIG. 8B is a pixel circuit in which a switch SW23 with a gate electrode electrically connected to a wiring GLC is provided between the transistor M21 and the wiring ANO in the pixel circuit 62 in FIG. 7A and FIG. 7B. That is, the pixel circuit 62B illustrated in FIG. 8B is a pixel circuit including four transistors. The number of the transistors in the pixel circuit 62 is not limited to those in the pixel circuit 62A and the pixel circuit 62B illustrated as an example, and a pixel circuit with another circuit structure can be used.

Although in the pixel circuits shown in FIG. 7A to FIG. 8B, a structure in which a wiring connected to the back gate electrode is different from a wiring connected to the gate electrode and different potentials are supplied to the back gate electrode and the gate electrode is illustrated, another structure may be employed. For example, a structure in which a back gate electrode and a gate electrode are mutually connected to one another can be used. Alternatively, the transistors may have different connection structures between the transistor functioning as a switch and the driving transistor controlling current flowing through the light-emitting element 70. For example, a transistor functioning as a switch can have a structure in which the back gate electrode and the gate electrode are mutually connected to one another and a driving transistor can have a structure in which the back gate electrode is connected to the source side of the transistor (e.g., the side of a wiring connected to the light-emitting element 70).

<Structure Example of Functional Circuit>

A CPU including a CPU core capable of power gating is described as an example of a circuit included in a functional circuit.

Figure 9:
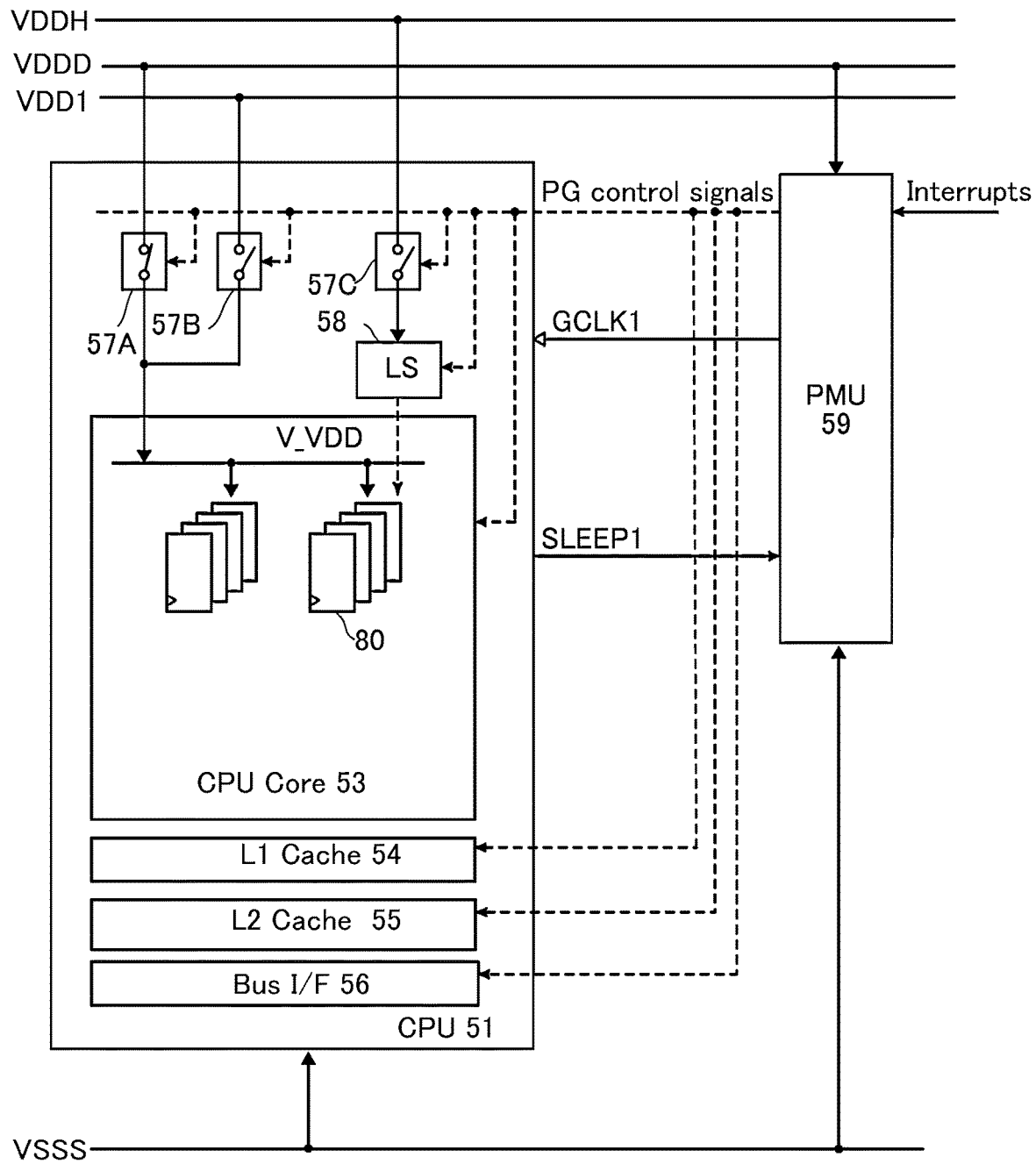
FIG. 9 is a block diagram illustrating a structure example of a display device.

FIG. 9 illustrates a configuration example of the CPU 51 included in the functional circuit 50. The CPU 51 includes the CPU core 53, an L1 (level 1) cache memory device (L1 Cache) 54, an L2 cache memory device (L2 Cache) 55, a bus interface portion (Bus I/F) 56, power switches 57A to 57C, and a level shifter (LS) 58. The CPU core 53 includes the flip-flop 80.

Through the bus interface portion 56, the CPU core 53, the L1 cache memory device 54, and the L2 cache memory device 55 are mutually connected to one another.

A PMU 59 generates a clock signal GCLK1 and various PG (power gating) control signals in response to signals such as an interrupt signal (Interrupts) input from the outside and a signal SLEEP1 emitted from the CPU 51. The clock signal GCLK1 and the PG control signal are input to the CPU 51. The PG control signal controls the power switches 57A to 57C and the flip-flop 80.

The power switches 57A and 57B control supply of voltages VDDD and VDD1 to a virtual power supply line V_VDD (hereinafter referred to as a V_VDD line), respectively. The power switch 57C controls supply of voltage VDDH to a virtual power supply line V_VDH (hereinafter referred to as a V_VDH line). Voltage VSSS is input to the CPU 51 and the PMU 59 without through the power switches. The voltage VDDD is input to the PMU 59 without through the power switches.

The voltages VDDD and VDD1 are drive voltages for a CMOS circuit. The voltage VDD1 is lower than the voltage VDDD and is a drive voltage in a sleep state. The voltage VDDH is a drive voltage for an OS transistor and is higher than the voltage VDDD.

The L1 cache memory device 54, the L2 cache memory device 55, and the bus interface portion 56 each include at least one power domain capable of power gating. The power domain capable of power gating is provided with one or a plurality of power switches. These power switches are controlled by the PG control signal.

The flip-flop 80 is used for a register. The flip-flop 80 is provided with a backup circuit. The flip-flop 80 is described below.

Figure 10A:
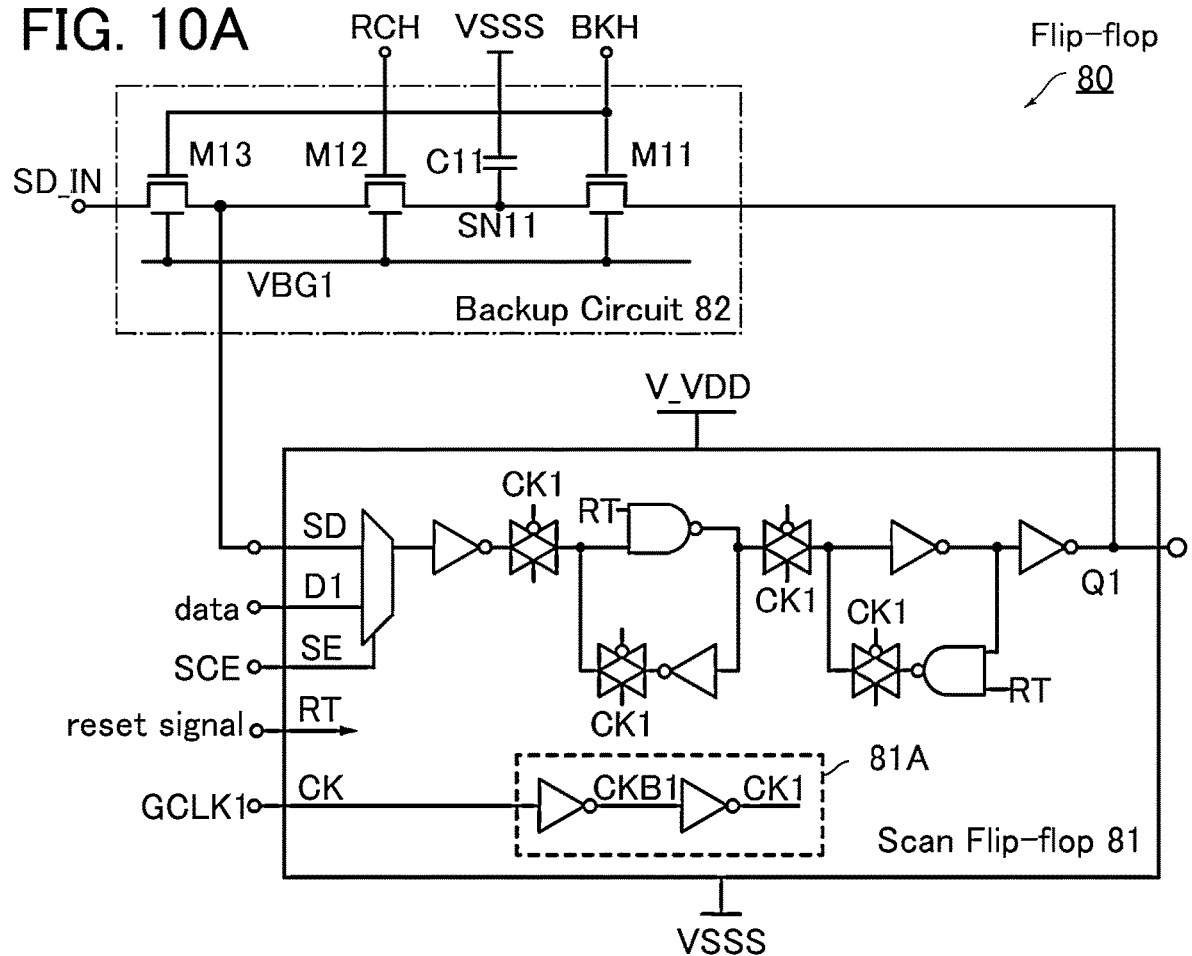
FIG. 10A and FIG. 10B are circuit diagrams illustrating a configuration example of a display device.

FIG. 10A illustrates a circuit configuration example of the flip-flop 80. The flip-flop includes the scan flip-flop 81 and the backup circuit (Buckup Circuit) 82.

The scan flip-flop 81 includes nodes D1, Q1, SD, SE, RT, and CK and a clock buffer circuit 81A.

The node D1 is a data input node, the node Q1 is a data output node, and the node SD is a scan test data input node. The node SE is a signal SCE input node. The node CK is a clock signal GCLK1 input node. The clock signal GCLK1 is input to the clock buffer circuit 81A. Analog switches in the scan flip-flop 81 are connected to nodes CK1 and CKB1 of the clock buffer circuit 81A. The node RT is a reset signal input node.

The signal SCE is a scan enable signal, which is generated in the PMU 59. The PMU 59 generates signals BK and RC. The level shifter 58 level-shifts the signals BK and RC to generate signals BKH and RCH. The signals BK and RC are a backup signal and a recovery signal.

The circuit configuration of the scan flip-flop 81 is not limited to that in FIG. 10A. A flip-flop prepared in a standard circuit library can be employed.

The backup circuit 82 includes nodes SD_IN and SN11, transistors M11 to M13, and a capacitor C11.

The node SD_IN is a scan test data input node and is connected to the node Q1 of the scan flip-flop 81. The node SN11 is a retention node of the backup circuit 82. The capacitor C11 is a storage capacitor for retaining the voltage of the node SN11.

The transistor M11 controls a conduction state between the node Q1 and the node SN11. The transistor M12 controls a conduction state between the node SN11 and the node SD. The transistor M13 controls a conduction state between the node SD_IN and the node SD. The on and off of the transistors M11 and M13 are controlled by the signal BKH, and the on and off of the transistor M12 are controlled by the signal RCH.

The transistors M11 to M13 are OS transistors, like transistors included in the pixel circuit 62. The transistors M11 to M13 have back gates in the illustrated structure. In the illustrated example, the back gates of the transistors M11 to M13 are connected to a power supply line for supplying voltage VBG1.

At least the transistors M11 and M12 are preferably OS transistors. Because of extremely low off-state current, which is a feature of the OS transistor, a decrease in the voltage of the node SN11 can be suppressed and almost no electric power is consumed to retain data; therefore, the backup circuit 82 has a nonvolatile characteristic. Data is rewritten by charging and discharging of the capacitor C11; hence, there is theoretically no limitation on rewrite cycles of the backup circuit 82, and data can be written and read out with low energy.

Figure 10B:
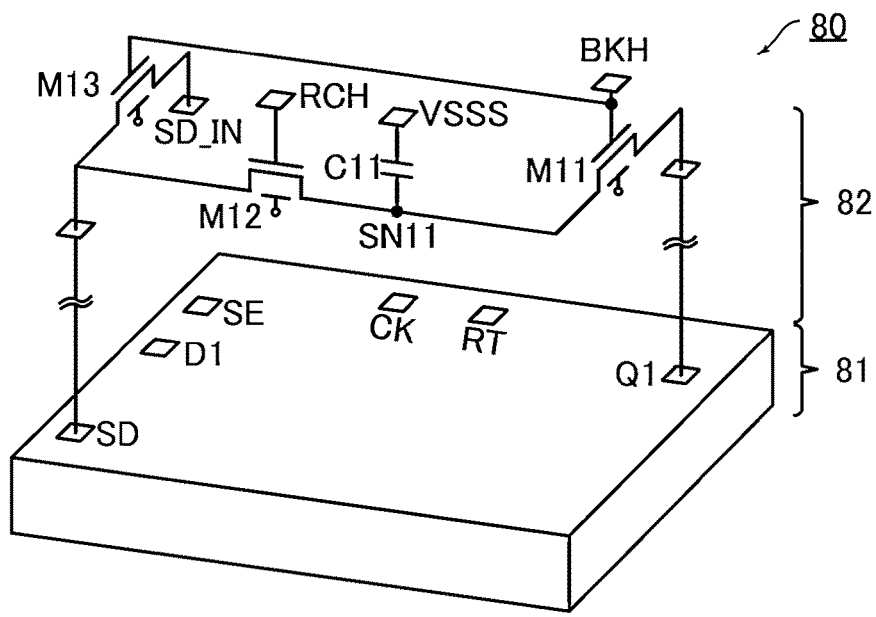

All of the transistors in the backup circuit 82 are extremely preferably OS transistors. As shown in FIG. 10B, the backup circuit 82 can be stacked over the scan flip-flop 81 formed with a silicon CMOS circuit.

The number of elements in the backup circuit 82 is much smaller than the number of elements in the scan flip-flop 81; hence, there is no need to change the circuit configuration and layout of the scan flip-flop 81 in order to stack the backup circuit 82. That is, the backup circuit 82 is a backup circuit that has very broad utility. In addition, the backup circuit 82 can be provided to overlap with a region where the scan flip-flop 81 is formed; thus, even when the backup circuit 82 is incorporated, the area overhead of the flip-flop 80 can be zero. Therefore, the backup circuit 82 is provided in the flip-flop 80, whereby power gating of the CPU core 53 is enabled. Since the less energy is necessary for the power gating, highly efficient power gating can be performed by the CPU core 53.

When the backup circuit 82 is provided, parasitic capacitance due to the transistor M11 is added to the node Q1. However, the parasitic capacitance is lower than parasitic capacitance generated by a logic circuit connected to the node Q1; therefore, there is no influence of the parasitic capacitance on the operation of the scan flip-flop 81. That is, even when the backup circuit 82 is provided, the performance of the flip-flop 80 does not substantially decrease.

The CPU core 53 can be set to be in a clock gating state, a power gating state, or a resting state as a low power consumption state (non-operation state). The PMU 59 selects the low power consumption mode of the CPU core 53 on the basis of the interrupt signal, the signal SLEEP1, and the like. For example, in the case of transition from a normal operation state to a clock gating state, the PMU 59 stops generation of the clock signal GCLK1.

For example, in the case of transition from a normal operation state to a resting state, the PMU 59 performs voltage and/or frequency scaling. For example, when the voltage scaling is performed, the PMU 59 turns off the power switch 57A and turns on the power switch 57B to input the voltage VDD1 to the CPU core 53. The voltage VDD1 is voltage at which data in the scan flip-flop 81 is not lost. When the frequency scaling is performed, the PMU 59 reduces the frequency of the clock signal GCLK1.

In the case where the CPU core 53 transitions from a normal operation state to a power gating state, data in the scan flip-flop 81 is backed up to the backup circuit 82. When the CPU core 53 is returned from the power gating state to the normal operation state, recovery operation of writing back data in the backup circuit 82 to the scan flip-flop 81 is performed.

Figure 11:
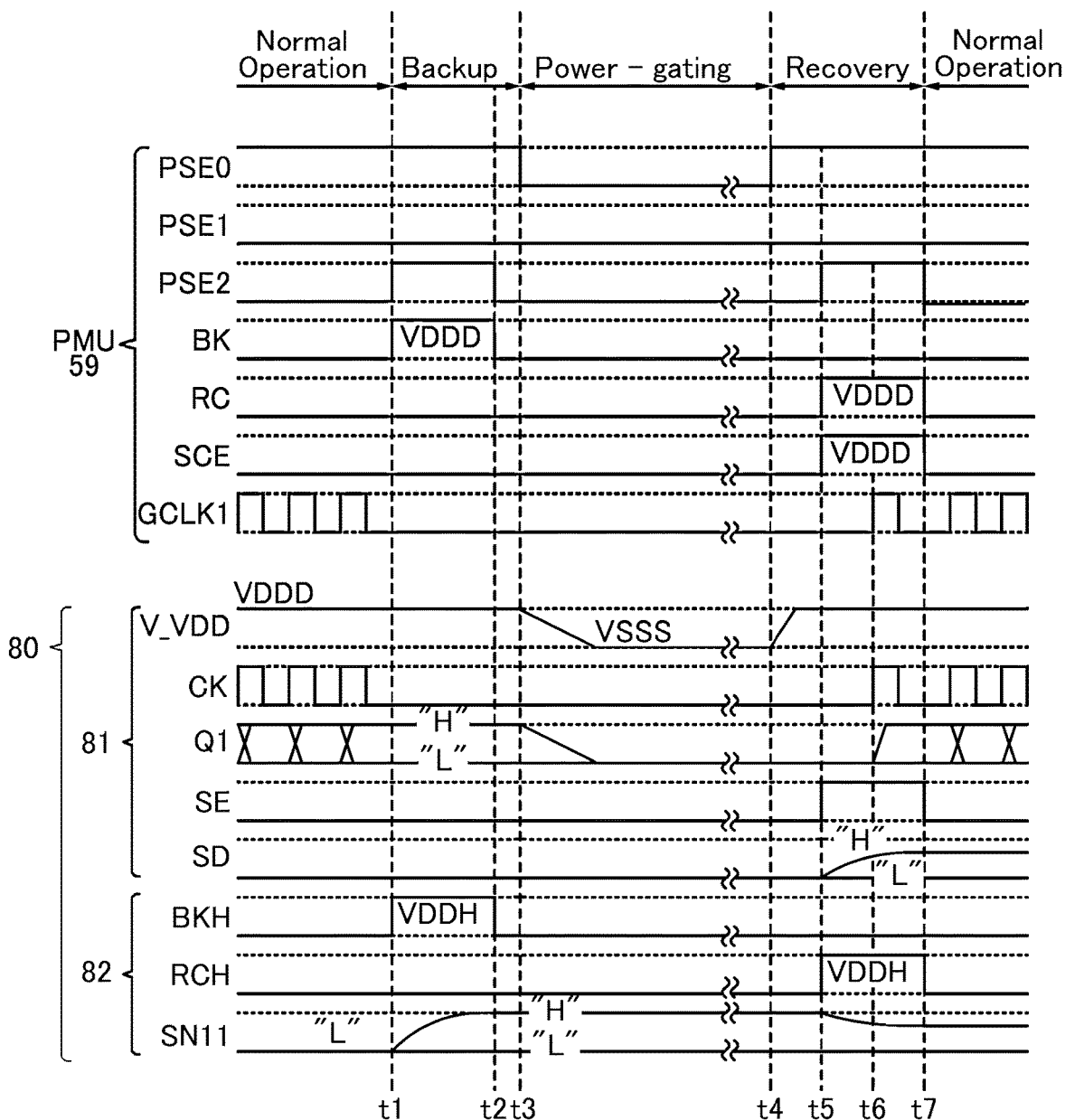
FIG. 11 is a timing chart showing an example of a method for driving a display device.

FIG. 11 illustrates an example of the power gating sequence of the CPU core 53. Note that in FIGS. 11, t1 to t7 represent the time. Signals PSE0 to PSE2 are control signals of the power switches 57A to 57C, which are generated in the PMU 59. When the signal PSE0 is at "H"/"L", the power switches 57A to 57C are on/off. The same applies to the signals PSE1 and PSE2.

Until Time t1, normal operation is performed. The power switch 57A is on, and the voltage VDDD is input to the CPU core 53. The scan flip-flop 81 performs the normal operation. At this time, the level shifter 58 does not need to be operated; thus, the power switch 57C is off and the signals SCE, BK, and RC are each at "L". The node SE is at "L"; thus, the scan flip-flop 81 stores data in the node D1. Note that in the example of FIG. 11, the node SN11 of the backup circuit 82 is at "L" at Time t1.

Backup operation is described. At Time t1 of operation, the PMU 59 stops the clock signal GCLK1 and sets the signals PSE2 and BK at "H". The level shifter 58 becomes active and outputs the signal BKH at "H" to the backup circuit 82.

The transistor M11 in the backup circuit 82 is turned on, and data in the node Q1 of the scan flip-flop 81 is written to the node SN11 of the backup circuit 82. When the node Q1 of the scan flip-flop 81 is at "L", the node SN11 remains at "L", whereas when the node Q1 is at "H", the node SN11 becomes "H".

The PMU 59 sets the signals PSE2 and BK at "L" at Time t2 and sets the signal PSE0 at "L at Time t3. The state of the CPU core 53 transitions to a power gating state at Time t3. Note that at the timing when the signal BK falls, the signal PSE0 may fall.

Power-gating operation is described. When the signal PSE0 is set at "L, data in the node Q1 is lost because the voltage of the V_VDD line decreases. The node SN11 retains data that is stored in the node Q1 at Time t3.

Recovery operation is described. When the PMU 59 sets the signal PSE0 at "H" at Time t4, the power gating state transitions to a recovery state. Charging of the V_VDD line starts, and the PMU 59 sets the signals PSE2, RC, and SCE at "H" in a state where the voltage of the V_VDD line becomes VDDD (at Time t5).

The transistor M12 is turned on, and charge in the capacitor C11 is distributed to the node SN11 and the node SD. When the node SN11 is at "H", the voltage of the node SD increases. The node SE is at "H", and thus, data in the node SD is written to a latch circuit on the input side of the scan flip-flop 81. When the clock signal GCLK1 is input to the node CK at Time t6, data in the latch circuit on the input side is written to the node Q1. That is, data in the node SN11 is written to the node Q1.

When the PMU 59 sets the signals PSE2, SCE, and RC at "L" at Time t7, the recovery operation is terminated.

The backup circuit 82 using an OS transistor is extremely suitable for normally-off computing because both dynamic and static power consumption are low. Even when the flip-flop 80 is mounted, a decrease in the performance and an increase in the dynamic power of the CPU core 53 can be made hardly to occur.

Note that the CPU core 53 may include a plurality of power domains capable of power gating. In the plurality of power domains, one or a plurality of power switches for controlling voltage input are provided. In addition, the CPU core 53 may include one or a plurality of power domains where power gating is not performed. For example, the power domain where power gating is not performed may be provided with a power gating control circuit for controlling the flip-flop 80 and the power switches 57A to 57C.

Note that the application of the flip-flop 80 is not limited to the CPU 51. In an arithmetic device, the flip-flop 80 can be used as a register provided in a power domain capable of power gating.

<Structure Example of Display Correction System>

The display correction system of one embodiment of the present invention can reduce display defects based on defective pixels, such as bright spots or dark spots, by correcting current TEL flowing through the light-emitting elements 70.

Figure 12A:
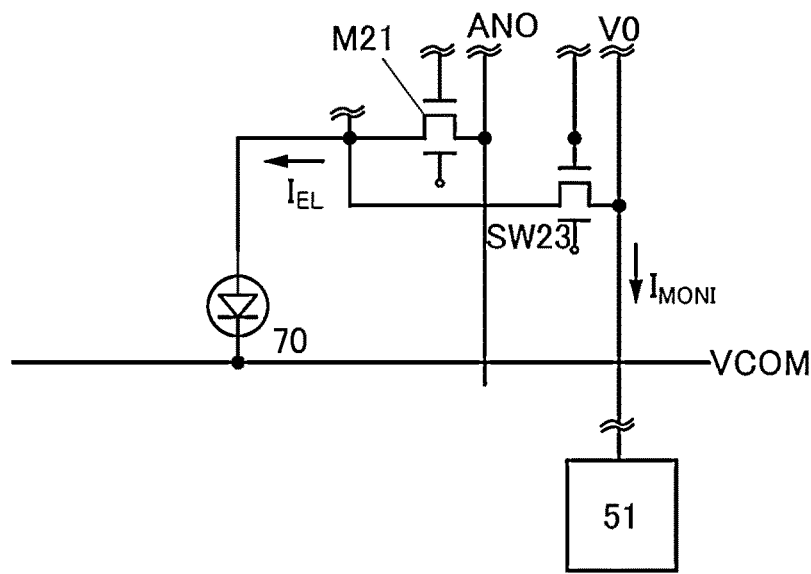
FIG. 12A to FIG. 12C are a circuit diagram and schematic views illustrating a structure example of a display device.

A circuit diagram illustrated in FIG. 12A illustrates part of the pixel circuit 62 illustrated in FIG. 5. The amount of the current TEL flowing through the light-emitting element 70 in a defective pixel causing a bright spot, a dark spot, or the like is far larger or smaller than current flowing through a pixel that performs normal display.

Figure 12B:
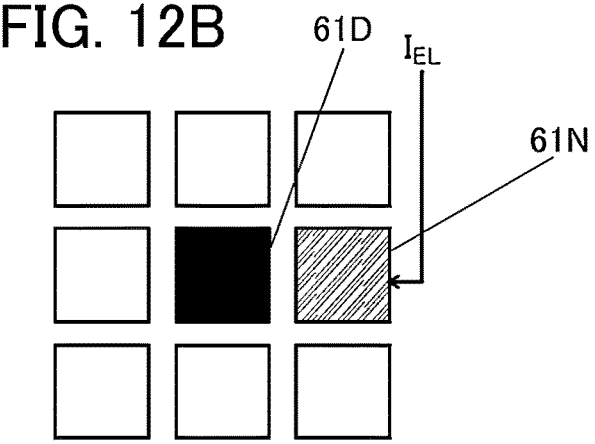

The CPU 51 periodically obtains data of monitor current Nom that flows through the switch SW23. The amount of the monitor current $I_{MONI}$ is converted into digital data that can be processed in the CPU 51 and arithmetic processing is performed with the digital data in the CPU 51. A defective pixel is estimated by the arithmetic processing in the CPU 51, and correction is performed in the CPU 51 so that a display defect due to the defective pixel is less likely to be seen. For example, in the case where a pixel 61D illustrated in FIG. 12B is a defective pixel, the current TEL that flows through the light-emitting element 70 of an adjacent pixel 61N is corrected.

The correction can be estimated by implementing arithmetic operation based on an artificial neural network such as a deep neural network (DNN), a convolutional neural network (CNN), a recurrent neural network (RNN), an autoencoder, a deep Boltzmann machine (DBM), or a deep belief network (DBN).

Figure 12C:
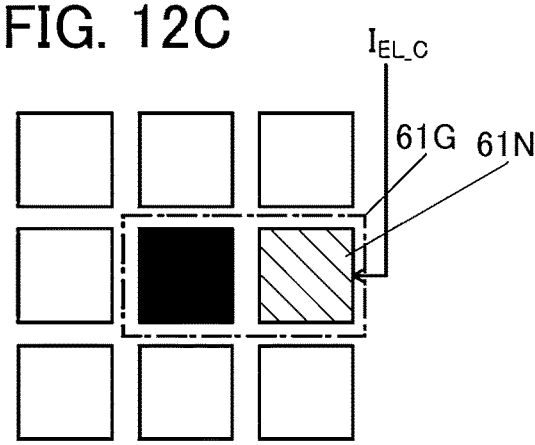

As illustrated in FIG. 12C, the current TEL that flows through the adjacent pixel 61N is corrected to be current $I_{EL\_C}$, whereby display can be performed using a pixel 61G in which a defective pixel and the pixel 61N are combined. As a result, display defects due to the defective pixels, such as bright spots or dark spots are less likely to be seen and thus a normal display can be achieved.

Note that during arithmetic operation by the display correction system, which is performed for correcting current flowing through a pixel, data in the arithmetic operation can be retained as backup data in the CPU 51. Therefore, the display correction system is particularly effective in arithmetic processing with an enormous amount of calculation, such as arithmetic operation based on an artificial neural network. Note that it is also possible to reduce power consumption in addition to a reduction in display defects by making the CPU 51 function as an application processor, in combination with, for example, driving that makes a frame frequency changeable.

<Modification Example of Display Device>

FIG. 13 to FIG. 27 illustrate modification examples of the components included in the display device 10 described above.

Figure 13:
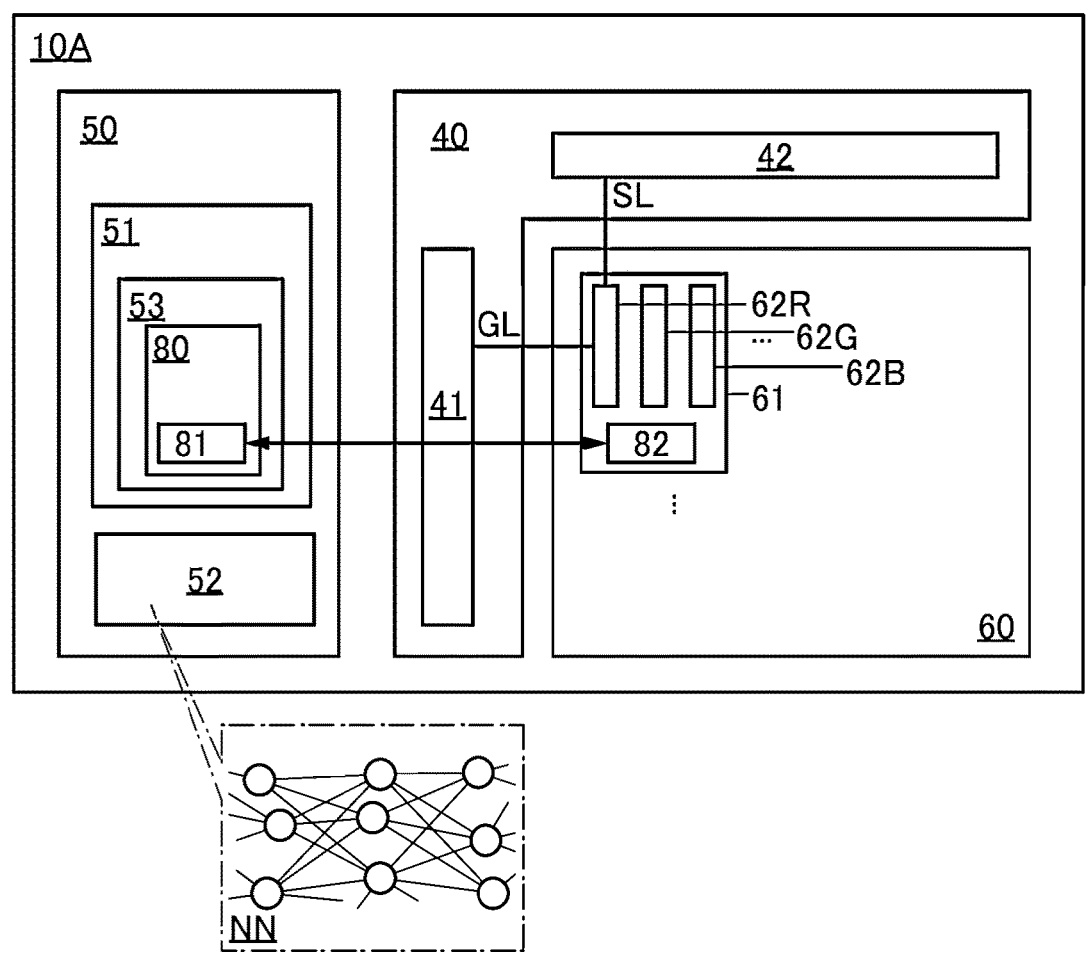
FIG. 13 is a block diagram illustrating a structure example of a display device.

A structure of a block diagram of a display device 10A illustrated in FIG. 13 corresponds to the structure of the display device 10 in FIG. 5 in which an accelerator 52 is added to the functional circuit 50.

In the case where arithmetic operation based on an artificial neural network is performed in the above-described display correction system, product-sum operation is repeatedly performed. The accelerator 52 functions as a dedicated arithmetic circuit for product-sum operation processing of an artificial neural network NN. In the arithmetic operation with the accelerator 52, the above-mentioned correction for display defects or processing for correcting the outline of an image by upconversion of display data or the like can be performed, for example. Note that with a structure in which power gating of the CPU 51 is performed during the arithmetic processing with the accelerator 52, it is possible to reduce the power consumption.

Figure 14A:
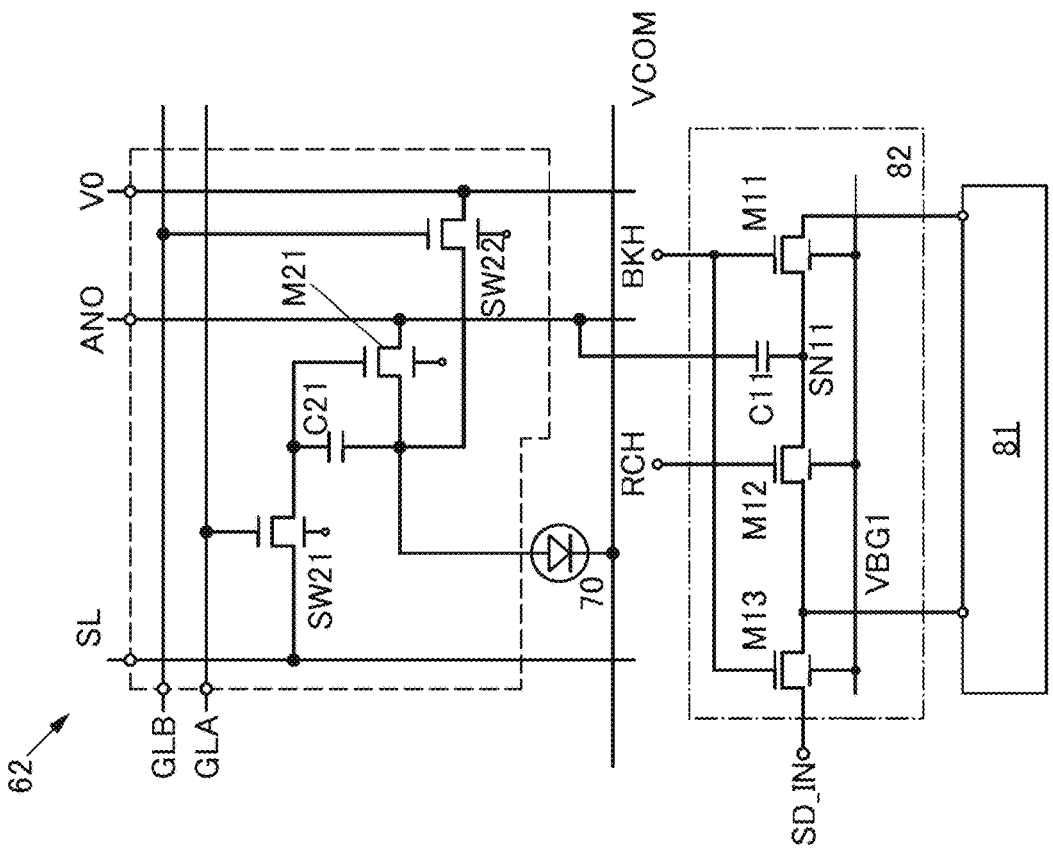
FIG. 14A and FIG. 14B are circuit diagrams illustrating configuration examples of a display device.
Figure 14B:
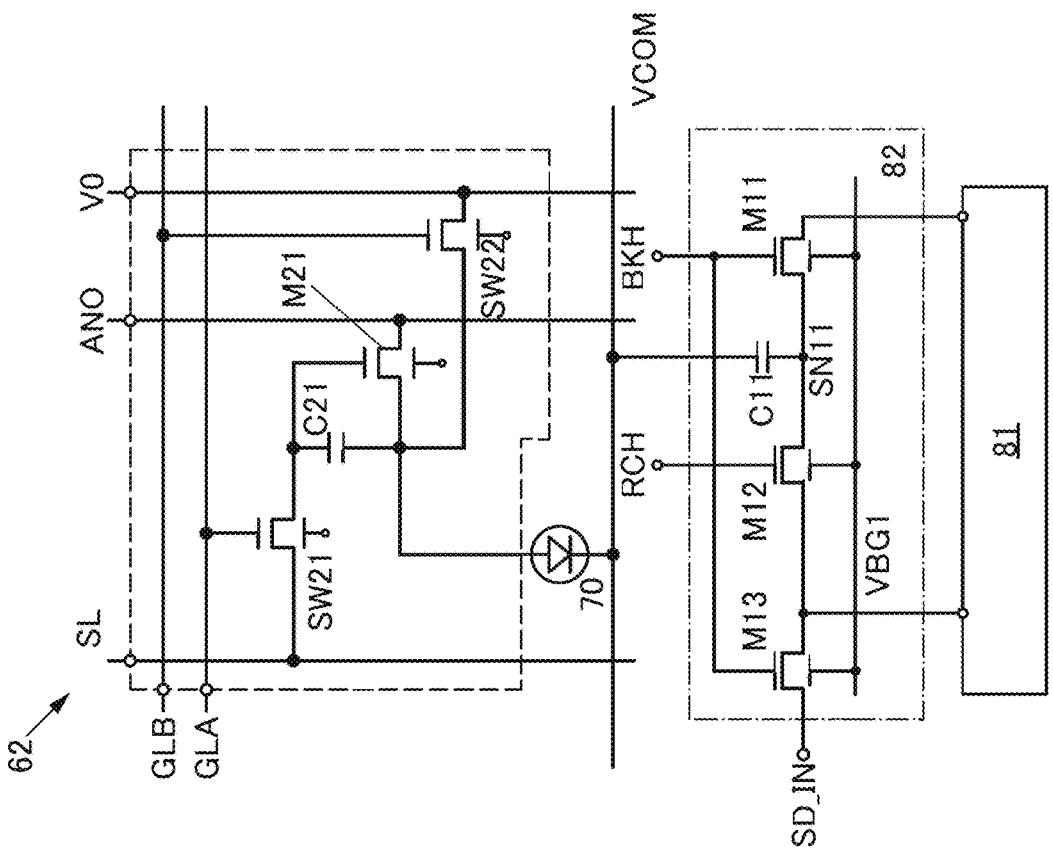

Circuit diagrams illustrated in FIG. 14A and FIG. 14B are each a diagram in which the pixel circuit 62 illustrated in FIG. 7A and the backup circuit 82 illustrated in FIG. 10A are combined. FIG. 14A illustrates a configuration in which one electrode of the capacitor C11 included in the backup circuit 82 is connected to the wiring VCOM. FIG. 14B illustrates a configuration in which the one electrode of the capacitor C11 included in the backup circuit 82 is connected to the wiring ANO. As illustrated in FIG. 14A and FIG. 14B, a wiring is shared between the pixel circuit 62 and the backup circuit 82 having different circuit configurations in the layer 30, whereby the number of wirings can be reduced.

In the backup circuit 82 illustrated in FIG. 14A and FIG. 14B, the transistor M12 and the transistor M13 can be omitted. Such a configuration is illustrated in each of FIG. 15A and FIG. 15B. A memory circuit 82B illustrated in FIG. 15A and FIG. 15B can be used as a versatile memory circuit that is not only for data backup in the flip-flop 80. For example, the memory circuit 82B can be used as a memory circuit of the functional circuit 50.

Figure 15A:
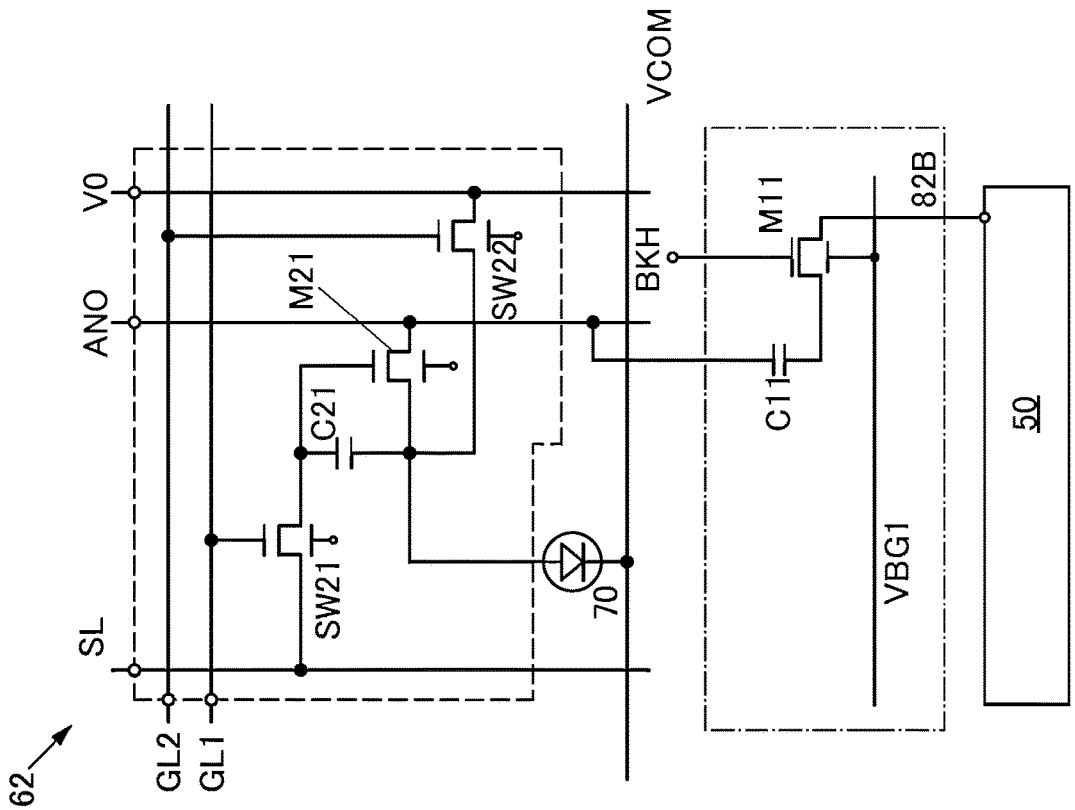
FIG. 15A and FIG. 15B are circuit diagrams illustrating configuration examples of a display device.
Figure 15B:
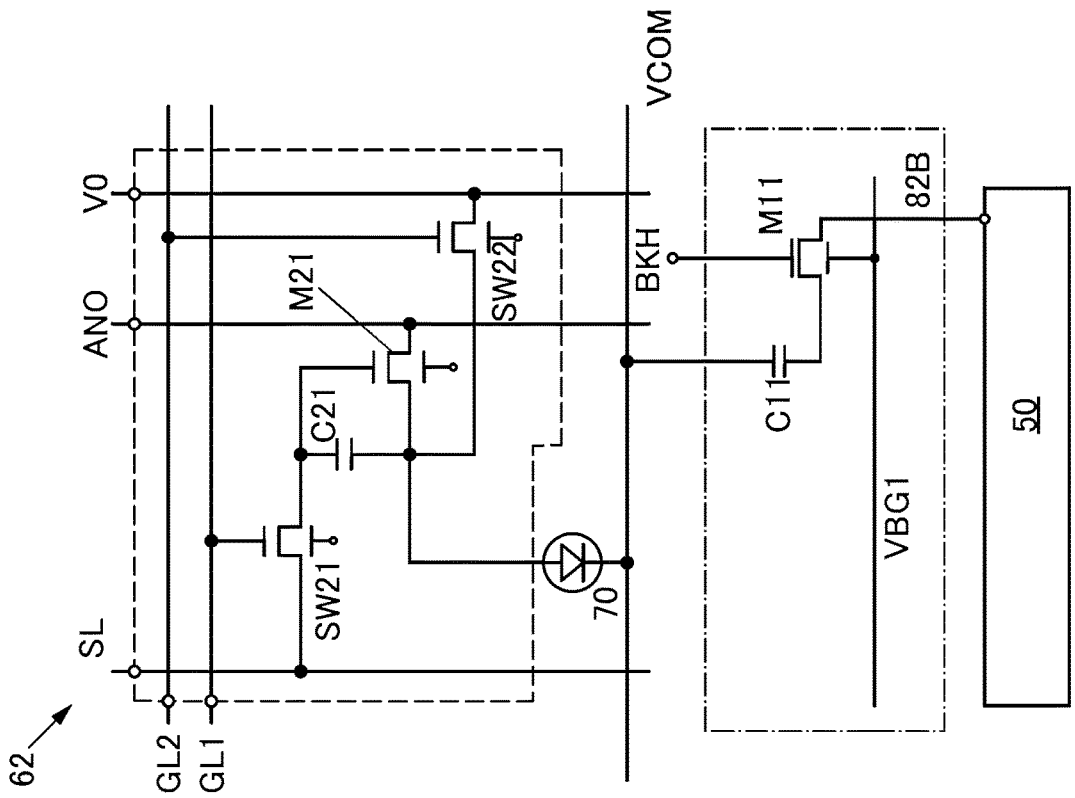

Although FIG. 15A and FIG. 15B each illustrate a configuration in which one electrode of the capacitor C11 of the memory circuit 82B is connected to the wiring VCOM or the wiring ANO, another configuration may be employed. For example, a configuration in which the one electrode is connected to the wiring VO, the wiring GL, or the like may be employed.

Figure 16:
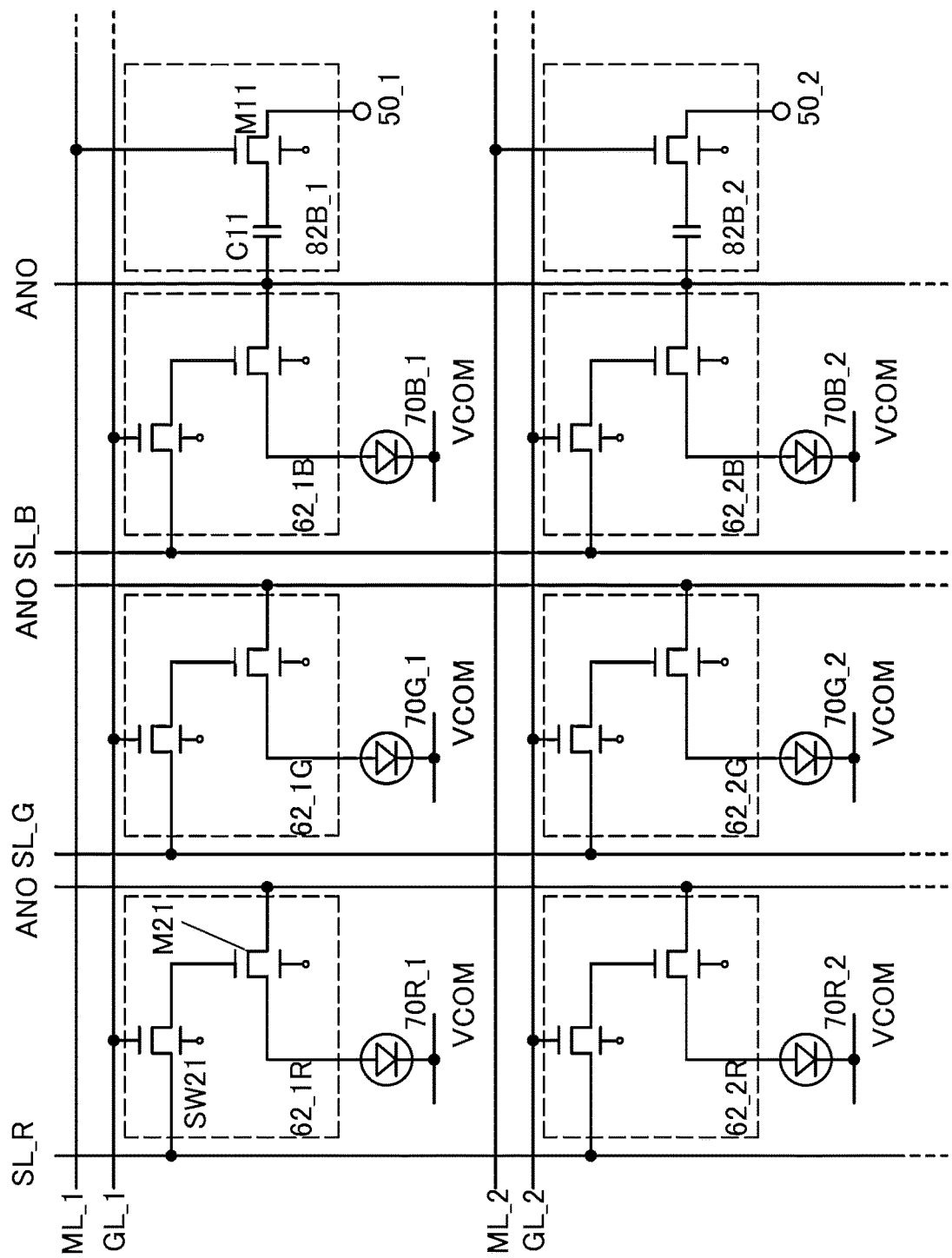
FIG. 16 is a circuit diagram illustrating a configuration example of a display device.

A circuit diagram in FIG. 16 illustrates an example of pixel circuits and memory circuits which are provided in a plurality of rows. FIG. 16 illustrates a pixel circuit 62_1R, a pixel circuit 62_1G, and a pixel circuit 62_1B as pixel circuits functioning as subpixels in a first row. In FIG. 16, a light-emitting element 70R_1, a light-emitting element 70G_1, and a light-emitting element are illustrated as light-emitting elements in the first row. In FIG. 16, a memory circuit 82B_1 is illustrated as a memory circuit in the first row. In FIG. 16, a pixel circuit 62_2R, a pixel circuit 62_2G, and a pixel circuit 62_2B are illustrated as pixel circuits functioning as subpixels in a second row. In FIG. 16, a light-emitting element 70R_2, a light-emitting element 70G_2, and a light-emitting element 70B_2 are illustrated as light-emitting elements in the second row. In FIG. 16, a memory circuit 82B_2 is illustrated as a memory circuit in the second row. Note that the memory circuits 82B_1 and 82B_2 are connected to nodes which retain data in functional circuits 50_1 and 50_2, respectively. Note that the functional circuits 50_1 and 50_2 correspond to different terminals in the functional circuit 50.

In FIG. 16, a wiring GL_1 functioning as the wiring GL in the first row and a wiring GL_2 functioning as the wiring GL in the second row are illustrated. In FIG. 16, wirings SL R, SL G, and SL_B functioning as source lines, the wiring ANO, and the wiring VCOM are illustrated. In FIG. 16, a wiring ML_1 supplying the signal BKH for controlling the memory circuit 82B_1 and a wiring ML_2 supplying the signal BKH for controlling the memory circuit 82B_2 are illustrated.

Note that in the following description, when the same components such as the pixel circuit 62_1R, the pixel circuit 62_1G, and the pixel circuit 62_1B are described, description is sometimes made with a common reference numeral indicated, like a pixel circuit 62_1. In the case where a plurality of components using the same reference numerals are described, especially when the components need to be distinguished from each other, an identification sign such as "_1" or "_2" for specifying the row number or an identification sign such as "R", "G", or "B" for identifying a color controlled by a subpixel is added to the reference numerals in some cases.

Note that FIG. 16 illustrates the case where the configuration example in FIG. 8A including the switch SW21 and the transistor M21 is employed for the pixel circuits 62_1 and 62_2. FIG. 16 illustrates the memory circuits 82B_1 and 82B_2 each employing the configuration example in FIG. 15A including the transistor M11 and the capacitor C11. Note that a configuration in which the memory circuit 82B is provided between a set of pixel circuits (the pixel circuits 62_1R, 62_1G, and 62_1B) which control RGB may be employed.

In FIG. 16), the connection destinations of the back gate electrodes of the transistors of the pixel circuits 62_1 and 62_2 and the memory circuits 82B_1 and 82B_2 are not illustrated, but the back gate electrodes may be connected to each other. Alternatively, a configuration in which the back gate electrodes of the transistors in the pixel circuit 62 and the memory circuit 82B, which are in the same row, are connected to each other may be employed. Alternatively, a configuration in which the back gate electrodes of the transistors included in the pixel circuit 62 are connected to each other and the back gate electrodes of the transistors included in the memory circuit 82B are connected to each other may be employed. That is, it is preferable that a wiring connecting the back gate electrodes of the transistors included in the pixel circuit 62 and a wiring connecting the back gate electrodes of the transistors included in the memory circuit 82B be different wirings.

As illustrated in FIG. 16, the memory circuit 82B provided together with the pixel circuit 62 can be provided for RGB subpixels. The memory circuit 82B can retain data of the circuit such as the functional circuit 50 or the CPU 51, which is provided in the layer 20, by using OS transistors. The memory circuits 82B provided in the layer 30 in which the OS transistors are provided can be uniformly provided in the layer 30; hence, electrical connection between the memory circuit 82B and the functional circuit 50 or the CPU 51 can be easily made unlike in the case where the memory circuits 82B are locally provided.

Figure 17:
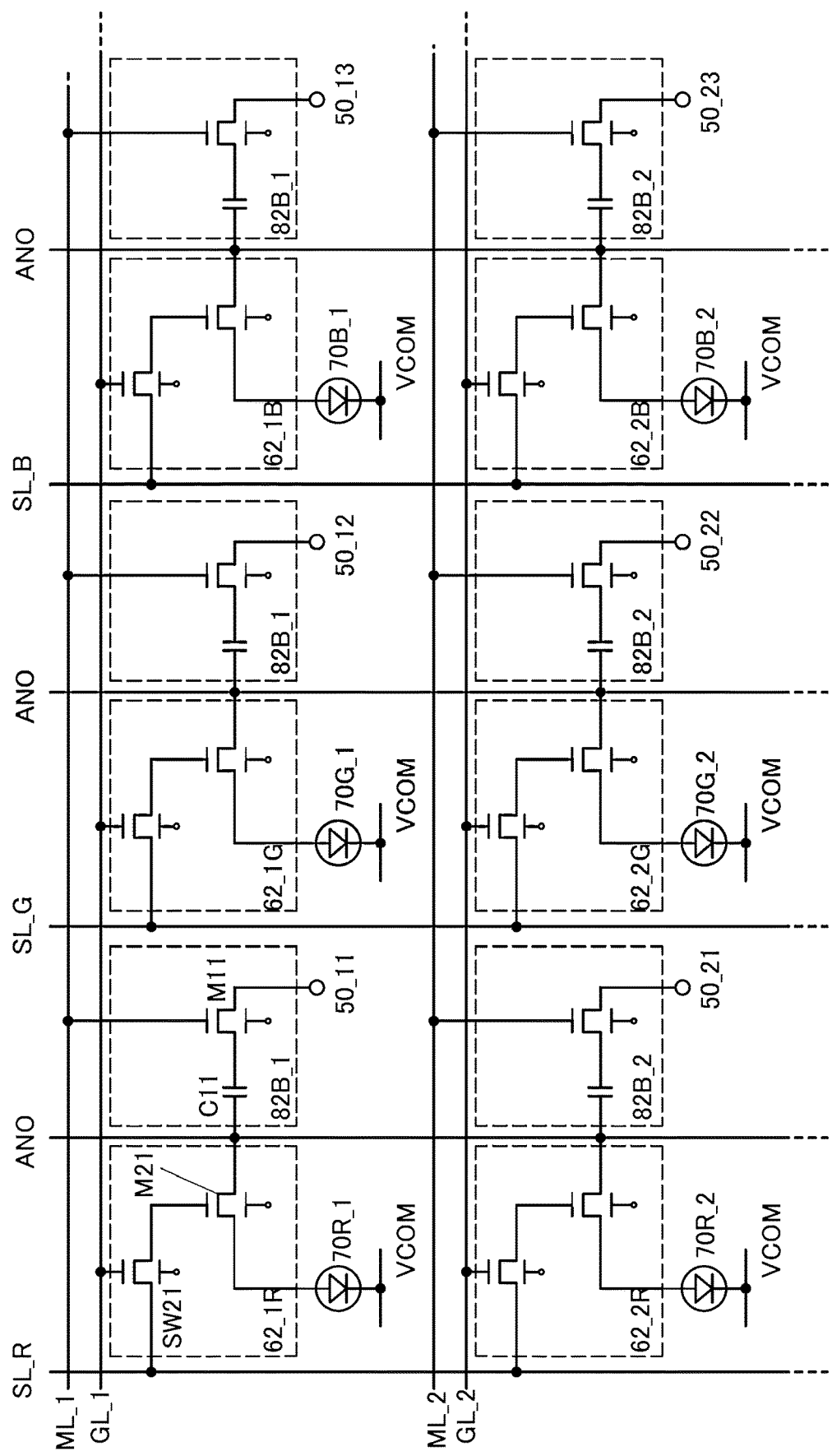
FIG. 17 is a circuit diagram illustrating a configuration example of a display device.

FIG. 17 illustrates a configuration example where the pixel circuits and the memory circuits are provided in a plurality of rows in a manner different from that in FIG. 16. Although FIG. 16 illustrates the configuration where the memory circuit 82B is provided for the corresponding set of the pixel circuits 62_1 or 62_2 that controls RGB, FIG. 17 illustrates a configuration where the memory circuit 82B is provided for each pixel circuit that controls RGB. Note that functional circuits 50_11, 50_12, 50_13, 50_21, 50_22, and 50_23 correspond to different terminals in the functional circuit 50. With the configuration in FIG. 17, more memory circuits 82B than those of the configuration in FIG. 16 can be provided in the layer 30 in which the OS transistors are provided. In addition, the memory circuits can be uniformly provided in the layer 30; hence, electrical connection between the memory circuit 82B and the functional circuit 50 or the CPU 51 can be easily made regardless of the circuit configuration of the functional circuit 50 or the CPU 51 unlike in the case where the memory circuits 82B are locally provided.

Figure 18:
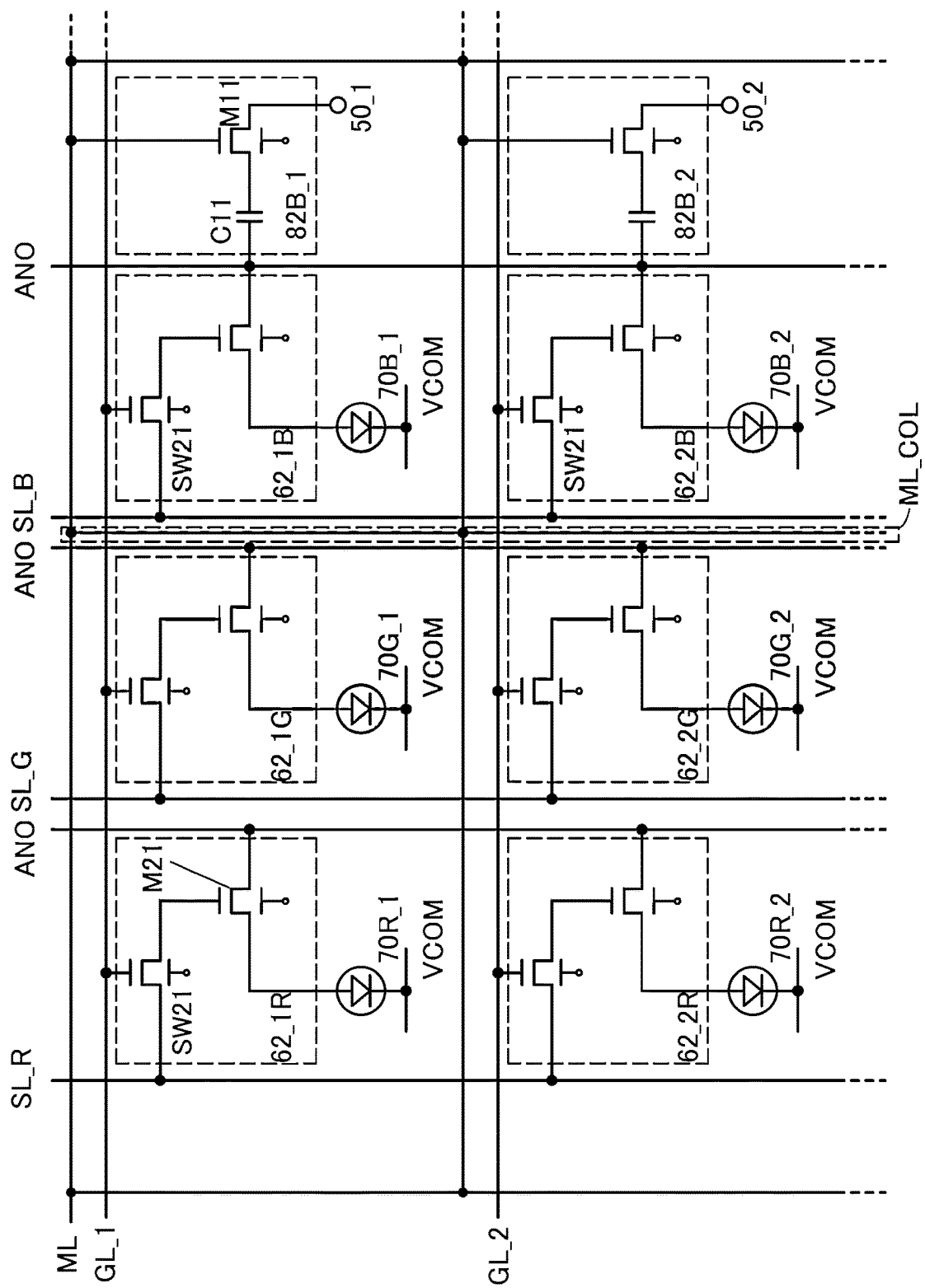
FIG. 18 is a circuit diagram illustrating a configuration example of a display device.

FIG. 18 illustrates a configuration example where the pixel circuits and the memory circuits are provided in a plurality of rows in a manner different from those in FIG. 16 and FIG. 17. In the configuration in FIG. 18, the wiring ML_1 and the wiring ML_2 are illustrated as a common wiring ML. The wiring ML is a wiring for supplying the signal BKH for controlling the memory circuit 82B_1 and the memory circuit 82B_2. A structure is employed in which the wirings ML provided in different rows are connected with a wiring provided parallel to the wirings provided in the column direction. A wiring ML COL provided parallel to the wirings provided in the column direction can reduce the influence of noise between the pixel circuits by, for example, being provided between the pixel circuits of the subpixels.

Figure 19:
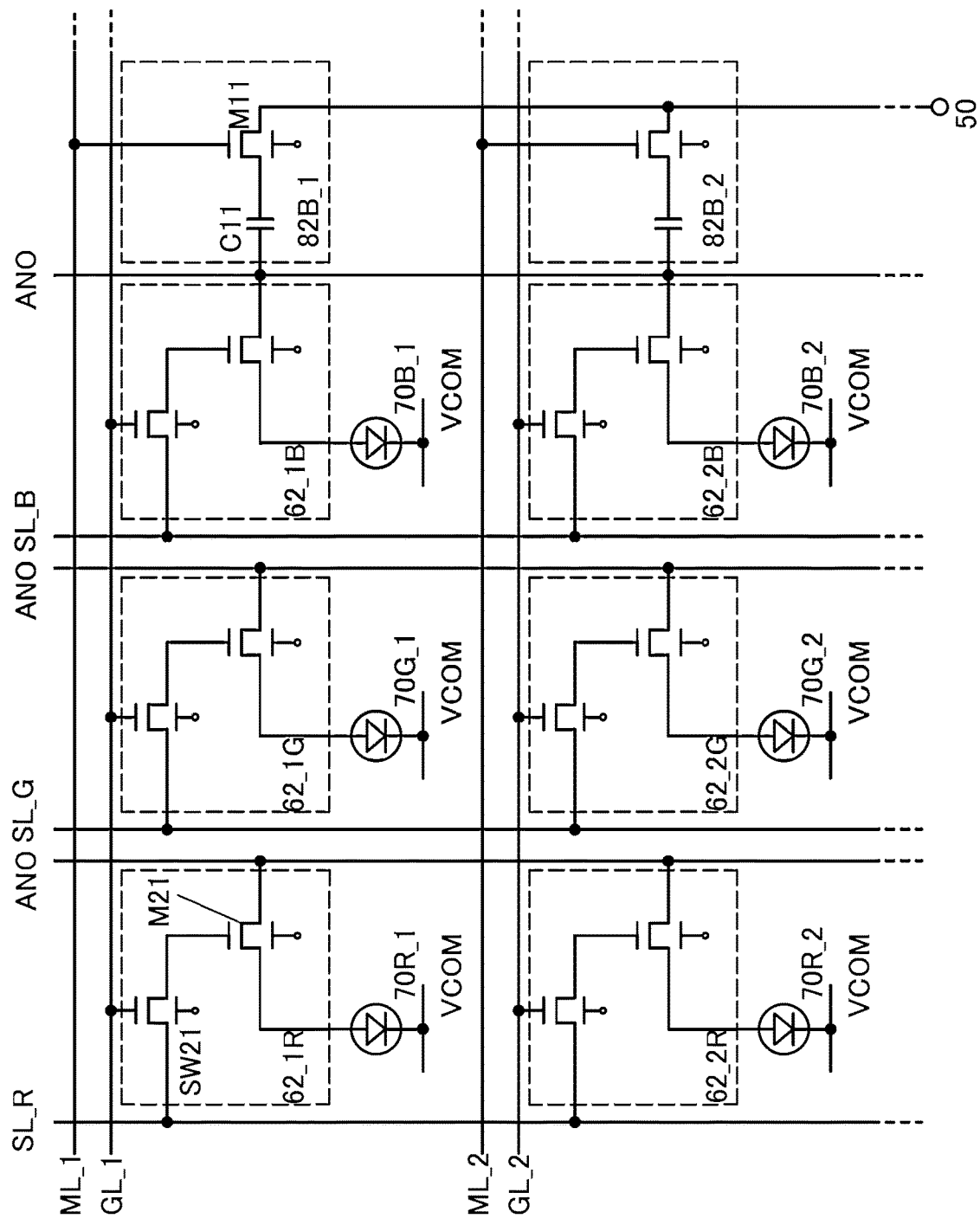
FIG. 19 is a circuit diagram illustrating a configuration example of a display device.

FIG. 19 illustrates a configuration example where the pixel circuits and the memory circuits are provided in a plurality of rows in a manner different from those in FIG. 16 to FIG. 18. In the configuration in FIG. 19, the memory circuit 82B_1 in the first row and the memory circuit 82B_2 in the second row are connected to the same node retaining data in the functional circuit 50. The memory circuit 82B_1 and the memory circuit 82B_1 can control the transistors M11 by different signals in different timings; thus, a configuration in which data of the node in the functional circuit 50 is obtained in a plurality of timings and retained can be employed.

Figure 20A:
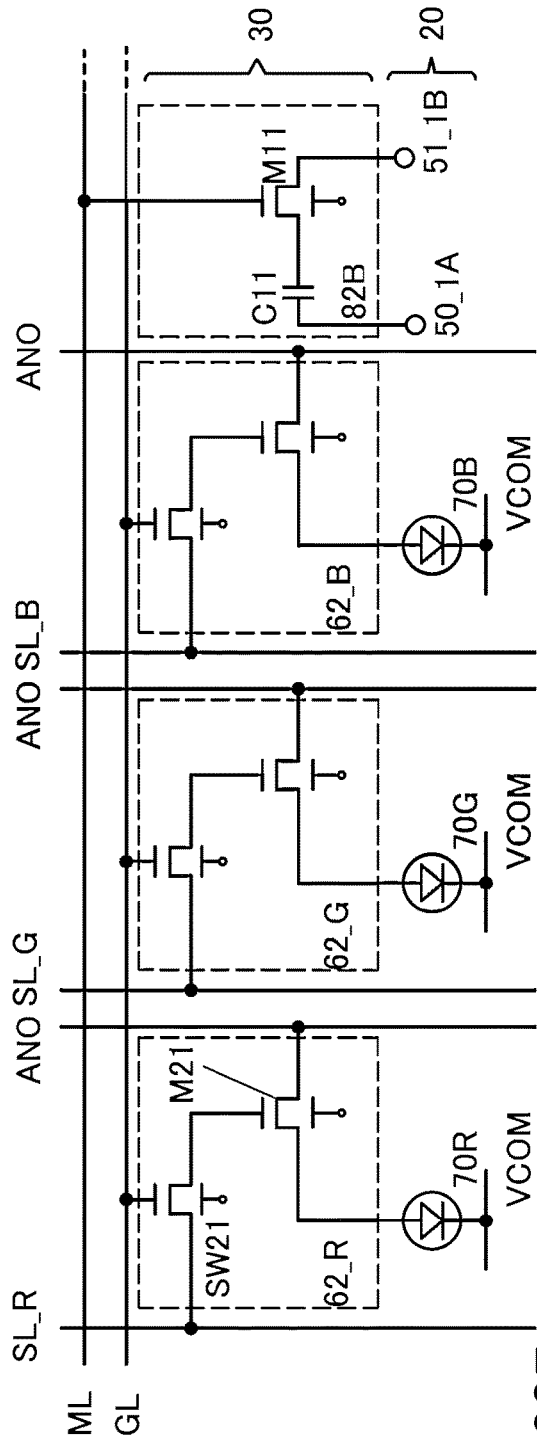
FIG. 20A and FIG. 20B are circuit diagrams illustrating configuration examples of a display device.
Figure 20B:
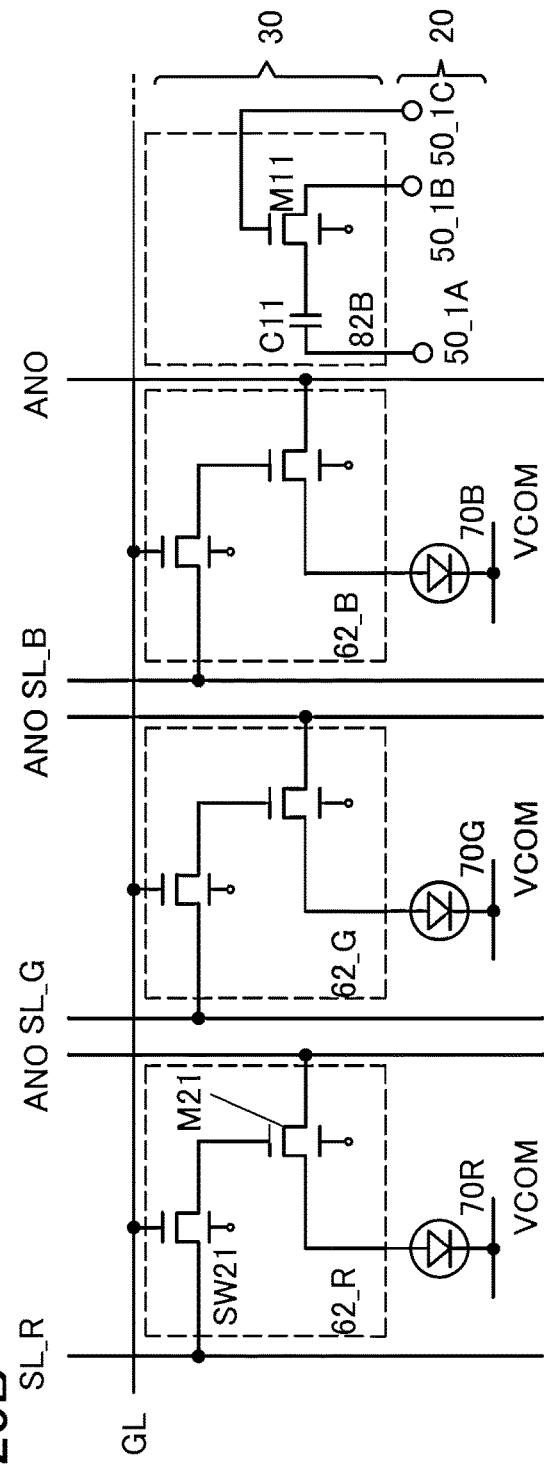

FIG. 20A illustrates a modification example of the memory circuit 82B that can be used as the memory circuit 82B_1 in the first row and/or the memory circuit 82B_2 in the second row illustrated in FIG. 16 to FIG. 19. FIG. 20A illustrates a configuration in which a terminal of the capacitor C11 on the side connected to the wiring ANO is connected to a node to which a fixed potential is applied in the functional circuit 50 on the layer 20 side. As another configuration, FIG. 20B illustrates a configuration in which the terminal of the capacitor C11 on the side connected to the wiring ANO is connected to the node to which a fixed potential is applied in the functional circuit 50 on the layer 20 side and the wiring ML connected to the gate electrode of the transistor M11 is omitted so that a control signal is supplied from the functional circuit 50 on the layer 20 side. Note that the functional circuits 50_1A, 50_1B, and 50_1C represent different terminals in the functional circuit 50. With such a configuration, the area occupied by the memory circuits 82B in the layer 30 can be reduced and the area occupied by the pixel circuits 62 can be increased.

Figure 21A:
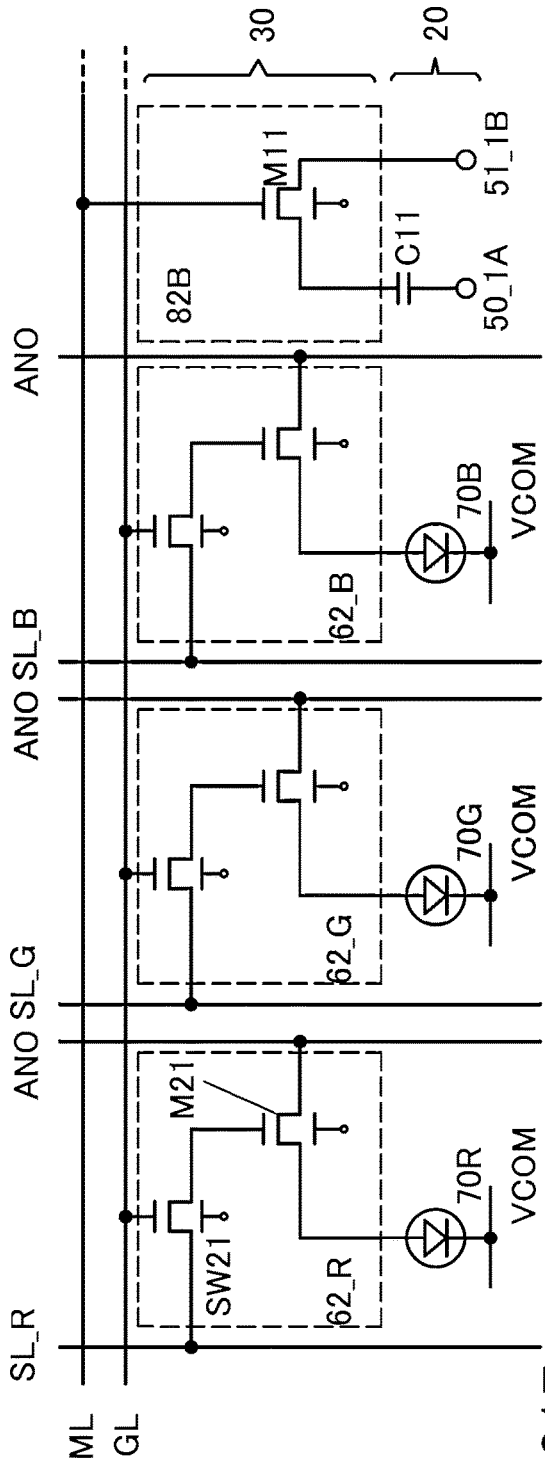
FIG. 21A and FIG. 21B are circuit diagrams illustrating configuration examples of a display device.
Figure 21B:
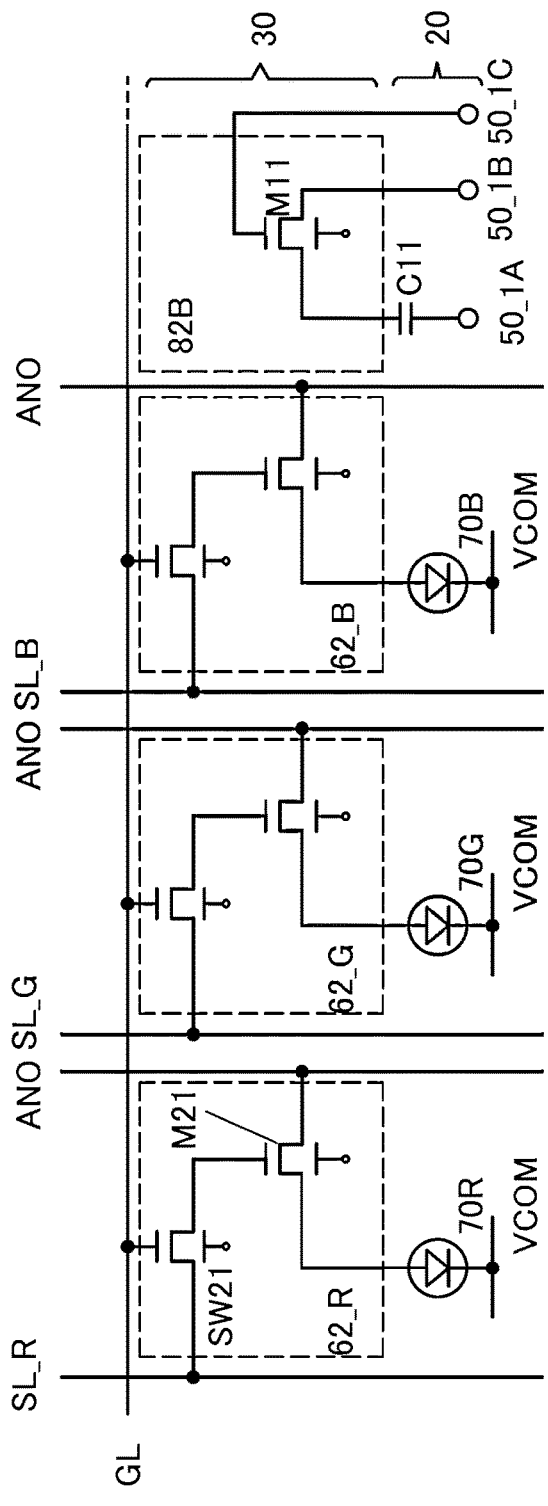

Like FIG. 20A and FIG. 20B, FIG. 21A illustrates a modification example of the memory circuit 82B. FIG. 21A illustrates a configuration in which the capacitor C11 in the memory circuit 82B is provided in the functional circuit 50 on the layer 20 side. As another configuration, FIG. 21B illustrates a configuration in which the capacitor C11 in the memory circuit 82B is provided in the functional circuit 50 on the layer 20 side and the wiring ML connected to the gate electrode of the transistor M11 is omitted so that a control signal is supplied from the functional circuit 50 on the layer 20 side. With such a configuration, the area occupied by the memory circuit 82B in the layer 30 can be reduced and the area occupied by the pixel circuits 62 can be increased.

Figure 22A:
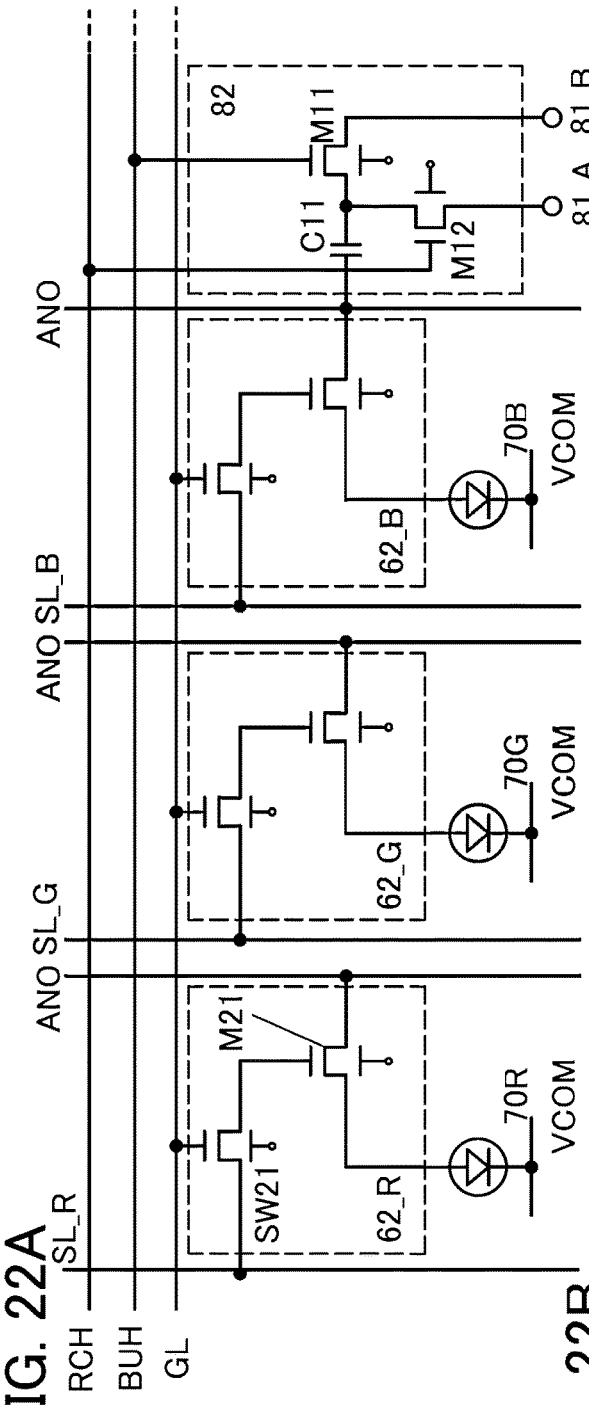
FIG. 22A and FIG. 22B are circuit diagrams illustrating configuration examples of a display device.
Figure 22B:
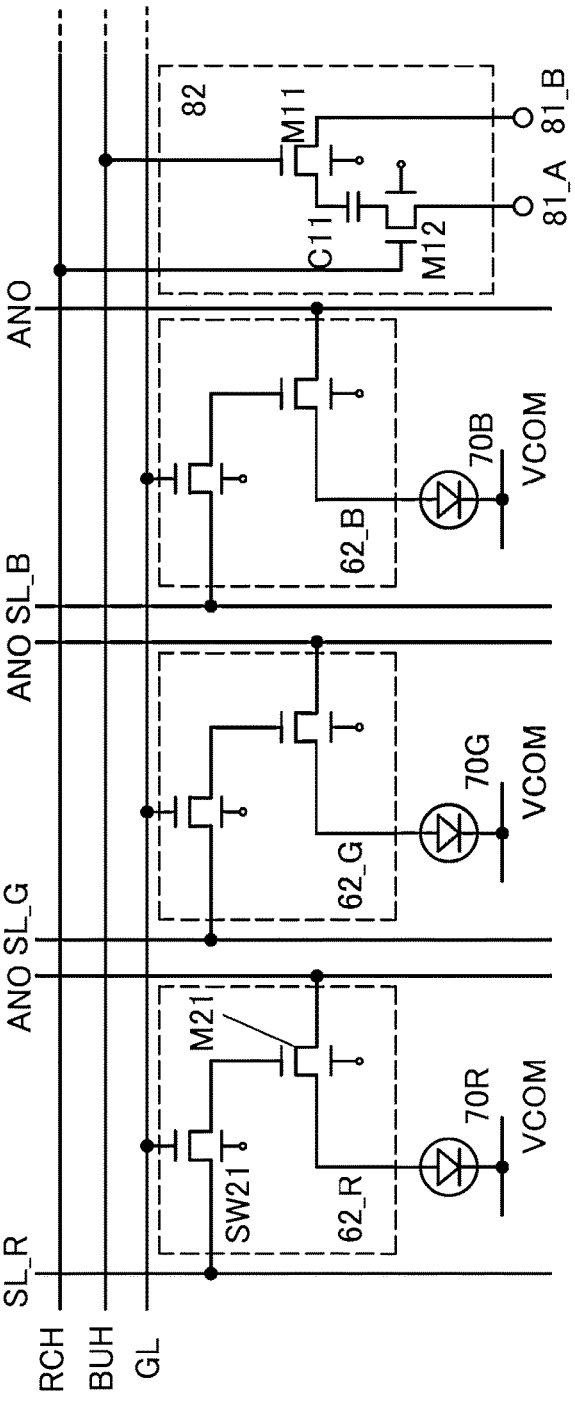

A circuit diagram in FIG. 22A illustrates a modification example where the backup circuit 82 shown in FIG. 14B is used instead of the memory circuit 82B shown in FIG. 16 to FIG. FIG. 22A illustrates a configuration in which a terminal of the capacitor C11 in the backup circuit 82 is connected to the wiring ANO. FIG. 22B illustrates a configuration in which the terminal of the capacitor C11 in the backup circuit 82 is connected to the transistor M12. Note that scan flip-flops 81_A, 81_B and 81_C represent different terminals in the scan flip-flop 81. With such a configuration, data in the node in the functional circuit 50 can also be retained in the capacitor C11.

Like FIG. 22A and FIG. 22B, FIG. 23A illustrates a modification example of the backup circuit 82. FIG. 23A illustrates a configuration in which the capacitor C11 in the backup circuit 82 is provided on the layer 20 side where the scan flip-flop 81 is provided. As another configuration, FIG. 23B illustrates a configuration in which the capacitor C11 in the backup circuit 82 is provided on the layer 20 side where the scan flip-flop 81 is provided and the wiring connected to the gate electrode of the transistor M11 and the wiring connected to the gate of the transistor M12 are omitted so that control signals BUH and RCH are supplied from the functional circuit 50 on the layer 20 side. With such a configuration, the area occupied by the backup circuits 82 in the layer 30 can be reduced and the area occupied by the pixel circuits 62 can be increased.

Note that in FIG. 22A to FIG. 23B, the connection between the back gate electrodes of the transistors of the pixel circuit 62 and the backup circuit 82 are not illustrated, but the back gate electrodes may be connected to each other.

Alternatively, a configuration in which the back gate electrodes of the transistors of the pixel circuit 62 and the backup circuit 82 in the same row are connected to each other may be employed. Alternatively, a configuration in which the back gate electrodes of the transistors included in the pixel circuit 62 are connected to each other and the back gate electrodes of the transistors included in the backup circuit 82 are connected to each other may be employed. That is, it is preferable that a wiring connecting the back gate electrodes of the transistors included in the pixel circuit 62 and a wiring connecting the back gate electrodes of the transistors included in the backup circuit 82 be different from each other.

Figure 24A:
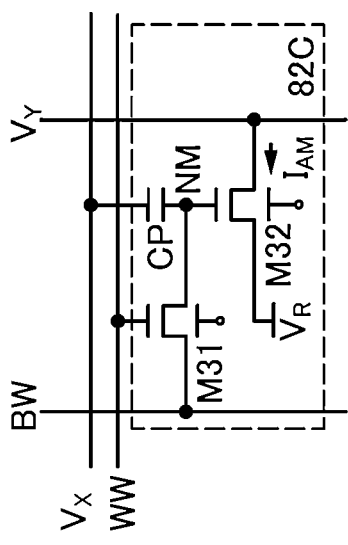
FIG. 24A and FIG. 24B are circuit diagrams illustrating configuration examples of a display device.

FIG. 24A illustrates an example of a circuit configuration different from those of the memory circuit 82B and the backup circuit 82, which are provided in the layer 30. An arithmetic circuit 82C illustrated in FIG. 24A is an example of circuit performing product-sum operation and arithmetic operation of an activation function. The arithmetic circuit 82C illustrated in FIG. 24A is a circuit performing product-sum operation of first data and second data. It is preferable that a plurality of arithmetic circuits 82C be provided because the arithmetic circuits 82C perform product-sum operation using a plurality of pieces of data.

The arithmetic circuit 82C includes a transistor M31, a transistor M32, and a capacitor CP. Note that the transistor M31 is preferably an OS transistor. The use of an OS transistor as the transistor M31 can suppress leakage current of the transistor M31. Therefore, data necessary for the calculation can be retained for a long time in a node NM as charge, so that a product-sum operation circuit with high calculation accuracy can be obtained. The frequency of refresh operation for the potential at the node NM can be reduced, thereby reducing power consumption of the product-sum operation circuit.

The use of an OS transistor also as the transistor M32 allows the transistor M32 to be formed concurrently with the transistor M31, thereby reducing the number of manufacturing steps of the product-sum operation circuit.

In the arithmetic circuit 82C, a first terminal of the transistor M31 is electrically connected to a gate of the transistor M32. A first terminal of the transistor M32 is electrically connected to a wiring VR. A first terminal of the capacitor CP is electrically connected to the gate of the transistor M32.

In the arithmetic circuit 82C, a second terminal of the transistor M31 is electrically connected to a wiring BW, and a gate of the transistor M31 is electrically connected to a wiring WW. A second terminal of the transistor M32 is electrically connected to a wiring $V_Y$, and a second terminal of the capacitor CP is electrically connected to a wiring $V_X$. Note that in FIG. 24A, current flowing from the wiring $V_Y$ to the second terminal of the transistor M32 is referred to as $I_{AM}$.

In the arithmetic circuit 82C, charge corresponding to data is retained in the node NM and a potential of the wiring $V_X$ is changed, whereby the potential of the gate of the transistor M32 in an electrically floating state can be changed, so that the multiplication result of the currents $I_{AM}$ flowing through the transistor M32 can be obtained. By adding the currents $I_{AM}$ flowing through the plurality of arithmetic circuits 82C, the product-sum operation for the sum of the multiplication results can be performed.

Figure 24B:
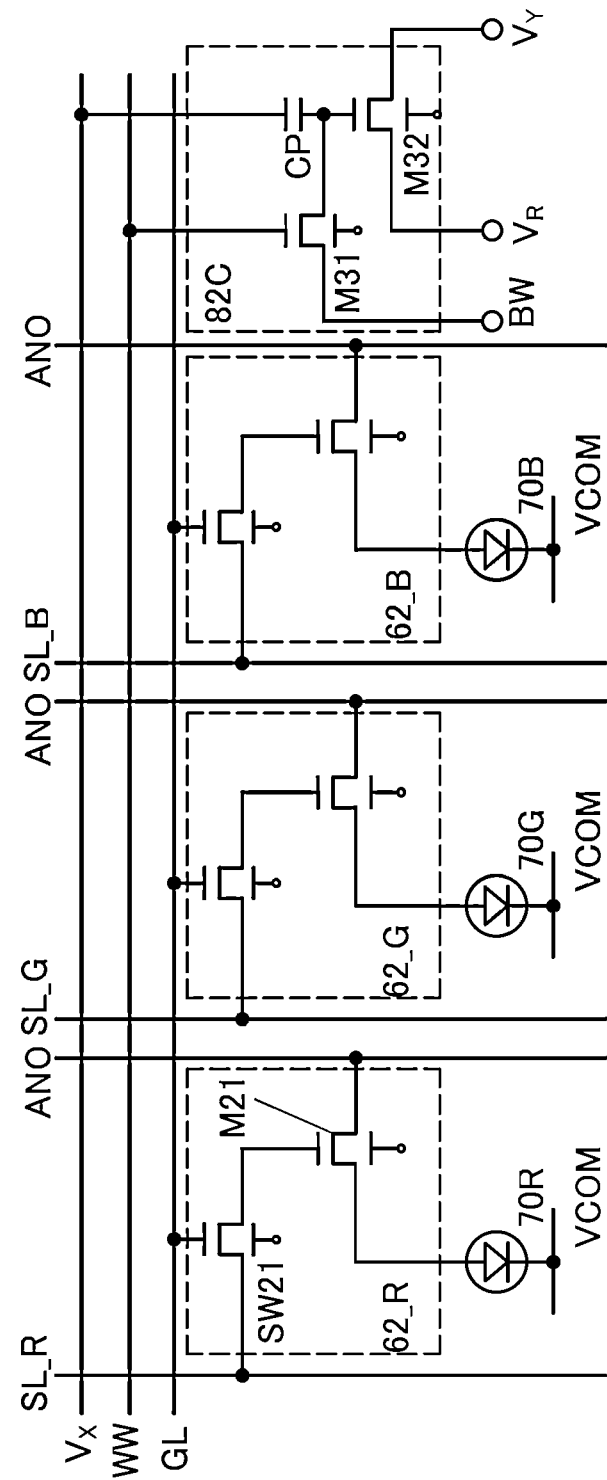

A circuit diagram illustrated in FIG. 24B illustrates a modification example in which the arithmetic circuit 82C shown in FIG. 24A is used instead of the memory circuit 82B or the backup circuit 82 shown in FIG. 16 to FIG. 23.

Figure 25A:
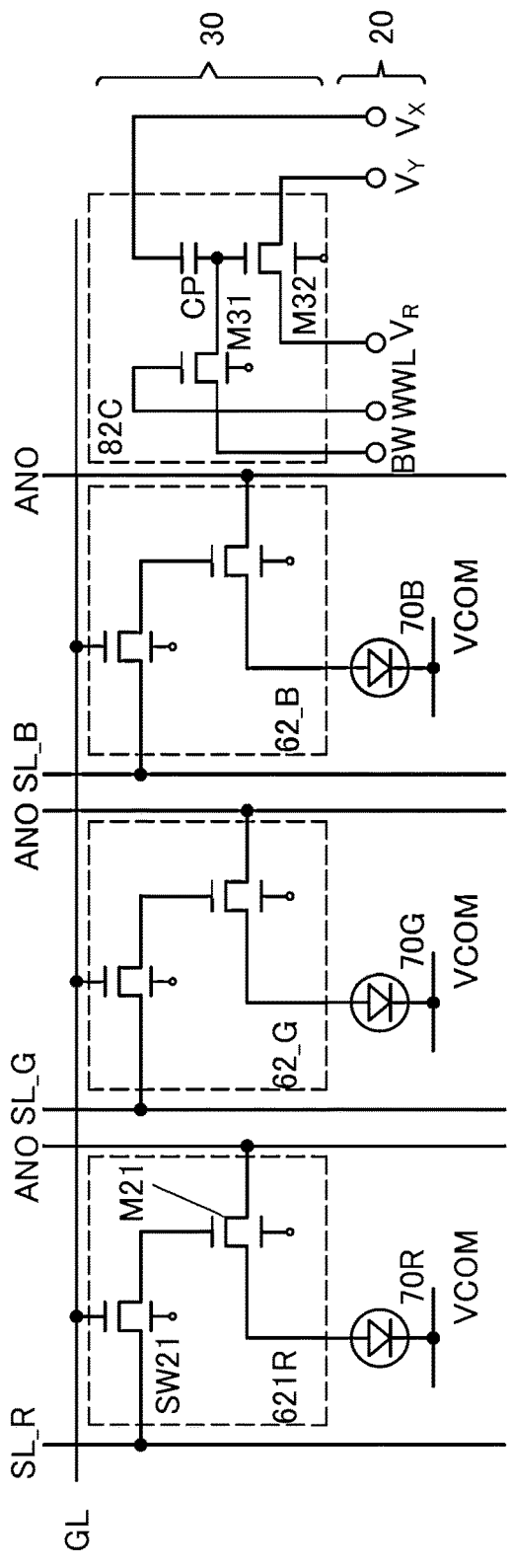
FIG. 25A and FIG. 25B are circuit diagrams illustrating configuration examples of a display device.

FIG. 25A illustrates a configuration in which the capacitor CP in the arithmetic circuit 82C is provided on the layer 30 side. As for the OS transistors provided in the layer 30, the transistor characteristics may be different between the transistors. For example, the transistor M31 is required to suppress leakage current in order to retain charge and the transistor M32 is preferably a transistor including a high-mobility semiconductor layer in order to make the current $I_{AM}$ flow. In this case, the atomic ratio of In—Ga—Zn—O metal oxide in the semiconductor layer of the transistor M31 can be In:Ga:Zn=1:3:4 or 1:1:0.5 and the atomic ratio of In—Ga—Zn—O metal oxide in the semiconductor layer of the transistor M32 can be In:Ga:Zn=4:2:3 or 3:1:2, for example.

Figure 25B:
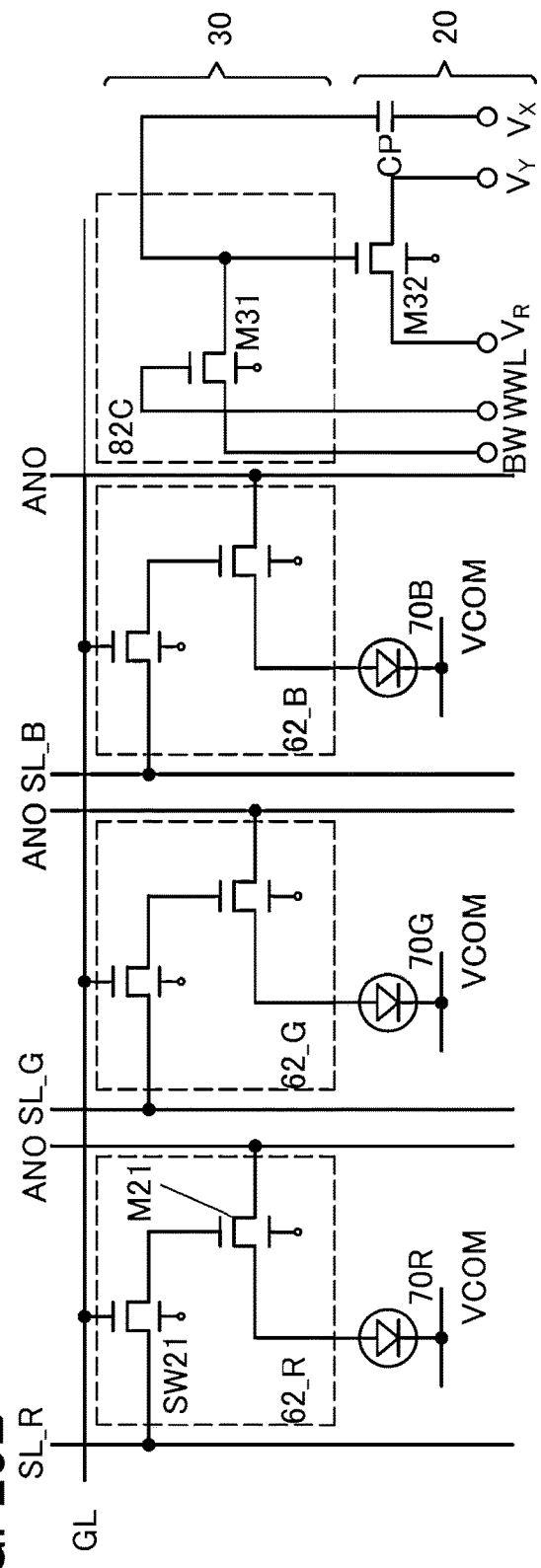

As another configuration, FIG. 25B illustrates a configuration in which the capacitor CP in the arithmetic circuit 82C is provided on the layer 20 side, a wiring connected to the gate electrode of the transistor M31 and a wiring connected to the transistor M32 are omitted, and terminals connected to the wirings BW and WWL and the wirings VR, $V_Y$, and $V_X$ that perform control from the functional circuit 50 on the layer 20 side are provided. Note that FIG. 25B illustrates the transistor M31 as an OS transistor provided in the layer 30 and the transistor M32 as a Si transistor provided in the layer 20. With such a configuration, the area occupied by the arithmetic circuits 82C in the layer 30 can be reduced and the area occupied by the pixel circuits 62 can be increased.

Note that in FIG. 24B to FIG. 25B, the connection between the back gate electrodes of the transistors of the pixel circuit 62 and the arithmetic circuit 82C are not illustrated, but the back gate electrodes may be connected to each other. Alternatively, a configuration in which the back gate electrodes of the transistors in the pixel circuit 62 and the arithmetic circuit 82C, which are in the same row, are connected to each other may be employed. Alternatively, a configuration in which the back gate electrodes of the transistors included in the pixel circuit 62 are connected to each other and the back gate electrodes of the transistors included in the arithmetic circuit 82C are connected to each other may be employed. That is, it is preferable that a wiring connecting the back gate electrodes of the transistors included in the pixel circuit 62 and a wiring connecting the back gate electrodes of the transistors included in the arithmetic circuit 82C be different wirings.

Figure 26A:
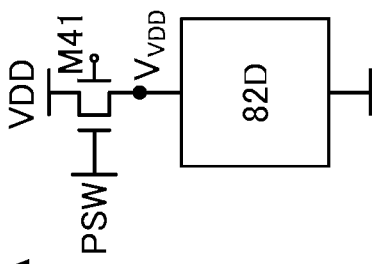
FIG. 26A and FIG. 26B are circuit diagrams illustrating configuration examples of a display device.

FIG. 26A illustrates an example of a circuit configuration different from those of the memory circuit 82B and the backup circuit 82, which are provided in the layer 30. A block circuit 82D illustrated in FIG. 26A represents a sequential circuit or a combinational circuit such as a flip-flop, an inverter, and a shift register. It is preferable that a plurality of block circuits 82D be provided in combination.

The block circuit 82D is provided between wirings supplying a power supply potential (VDD-VSS). The block circuit 82D is connected to a transistor M41 as illustrated in FIG. 26A. Note that it is preferable that the transistor M41 be an OS transistor. A period during which the transistor M41 is turned off by a control signal PSW can be provided. By turning off the transistor M41, the potential of a node $V_{VDD}$ can be lower than VDD; thus, leakage current flowing between the wirings supplying the power supply potential (VDD-VSS) through the block circuit 82D can be suppressed. Thus, the transistor M41 is turned off in a period during which the blocking circuit 82D does not operate, so that power consumption can be reduced.

Figure 26B:
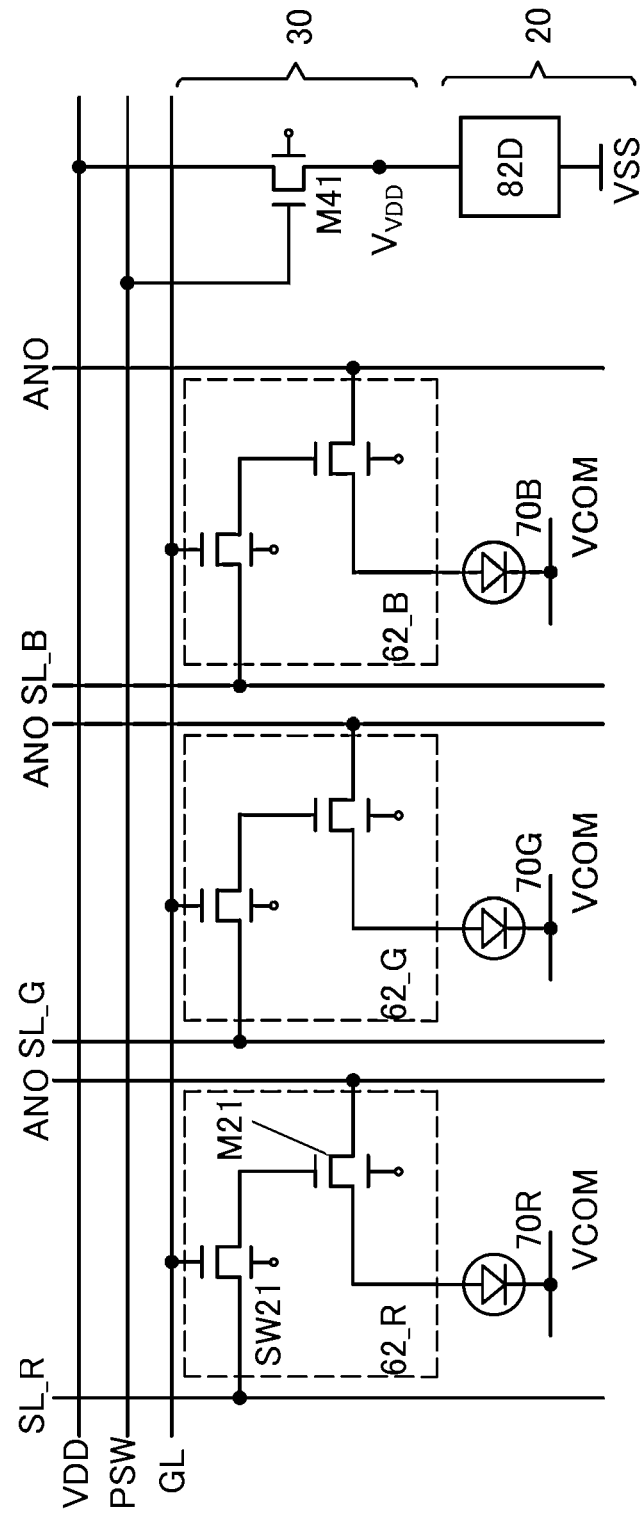

A circuit diagram illustrated in FIG. 26B illustrates a modification example in which the block circuit 82D shown in FIG. 26A is used instead of the memory circuit 82B or the backup circuit 82 shown in FIG. 16 to FIG. 23. FIG. 26A illustrates a configuration in which the block circuit 82D is provided on the layer 20 side and the transistor M41 is provided on the layer 30 side. With such a configuration, the transistor M41 can be provided to overlap with the block circuit 82D; thus, the power consumption can be reduced without increasing the area occupied by the block circuit 82D.

Figure 27A:
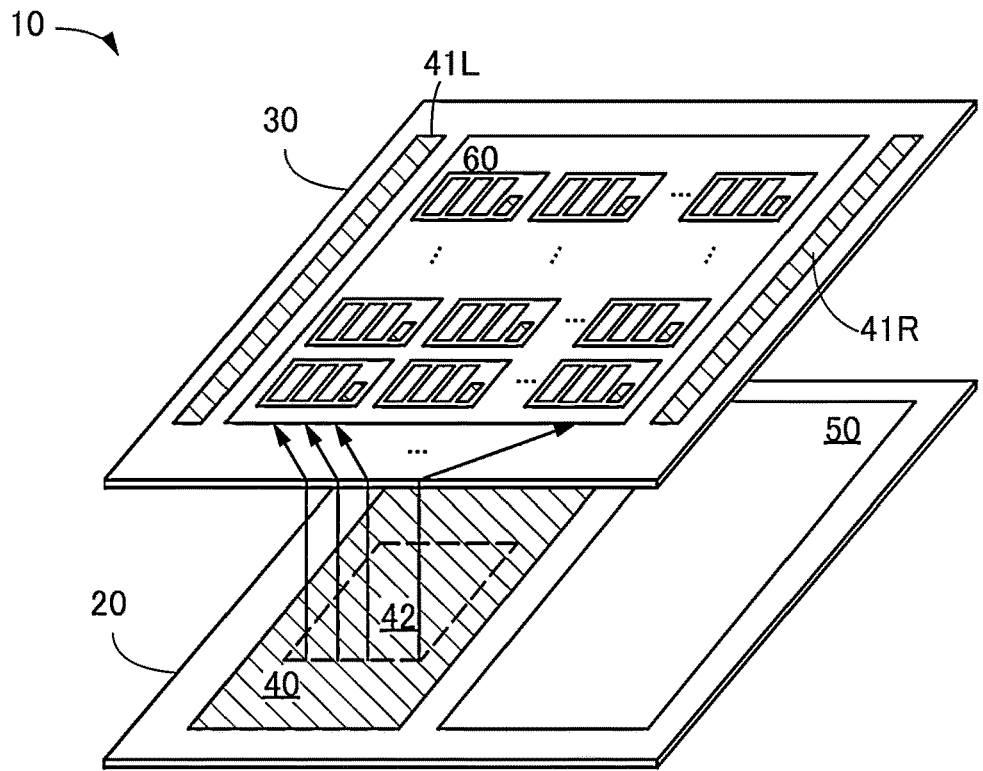
FIG. 27A and FIG. 27B are block diagrams illustrating structure examples of a display device.

FIG. 27A illustrates an example of a structure in which the transistor of the gate driver 41 included in the driver circuit 40 is an OS transistor and the gate driver 41 (illustrated as a gate driver 41L and a gate driver 41R on the opposite sides of the display portion 60 in the diagram) is provided in the layer 30 in FIG. 1. With such a structure, the number of wirings from the driver circuit 40 in the layer 20 to the display portion 60 in the layer 30 can be reduced.

Figure 27B:
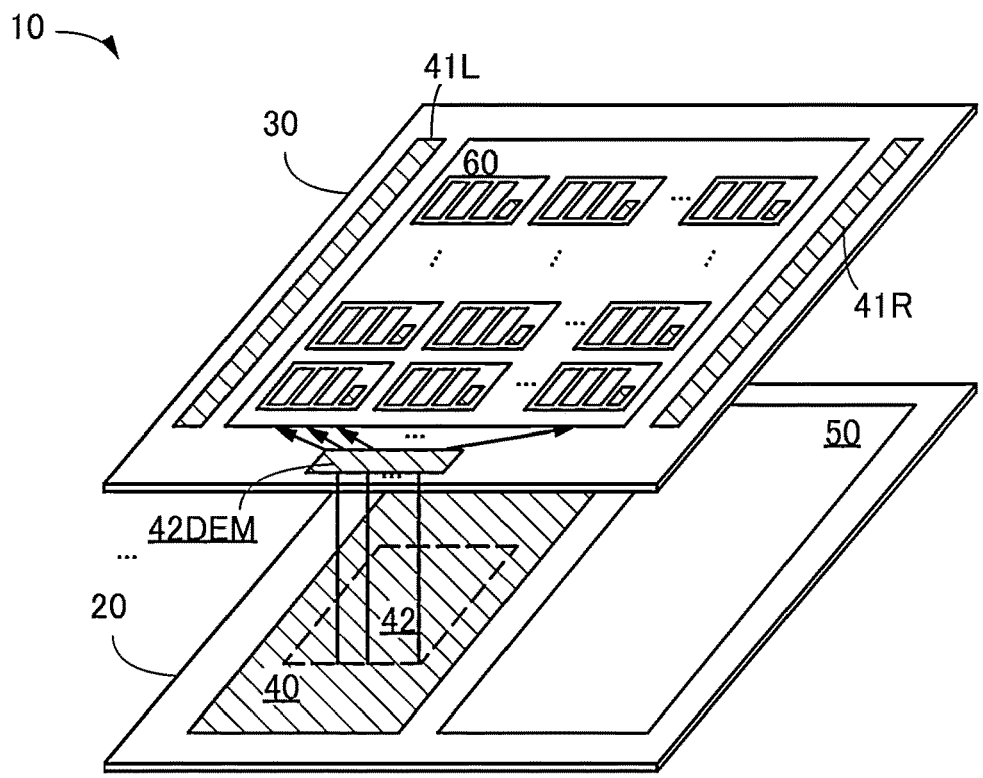

FIG. 27B illustrates an example of a structure in which part of the functions of the source driver 42 included in the driver circuit 40 is provided in the layer 30 in FIG. 27A. FIG. 27B is an example of a structure in which a transistor of the demultiplexer distributing signals output from the source driver 42 to source lines is an OS transistor and a demultiplexer 42DEM is provided in the layer 30. With such a structure, the number of wirings from the driver circuit 40 in the layer to the display portion 60 in the layer 30 can be further reduced.

This embodiment can be combined with the description of the other embodiments as appropriate.

Embodiment 2

In this embodiment, a cross-sectional structure example of the display device 10 of one embodiment of the present invention is described.

Figure 28:
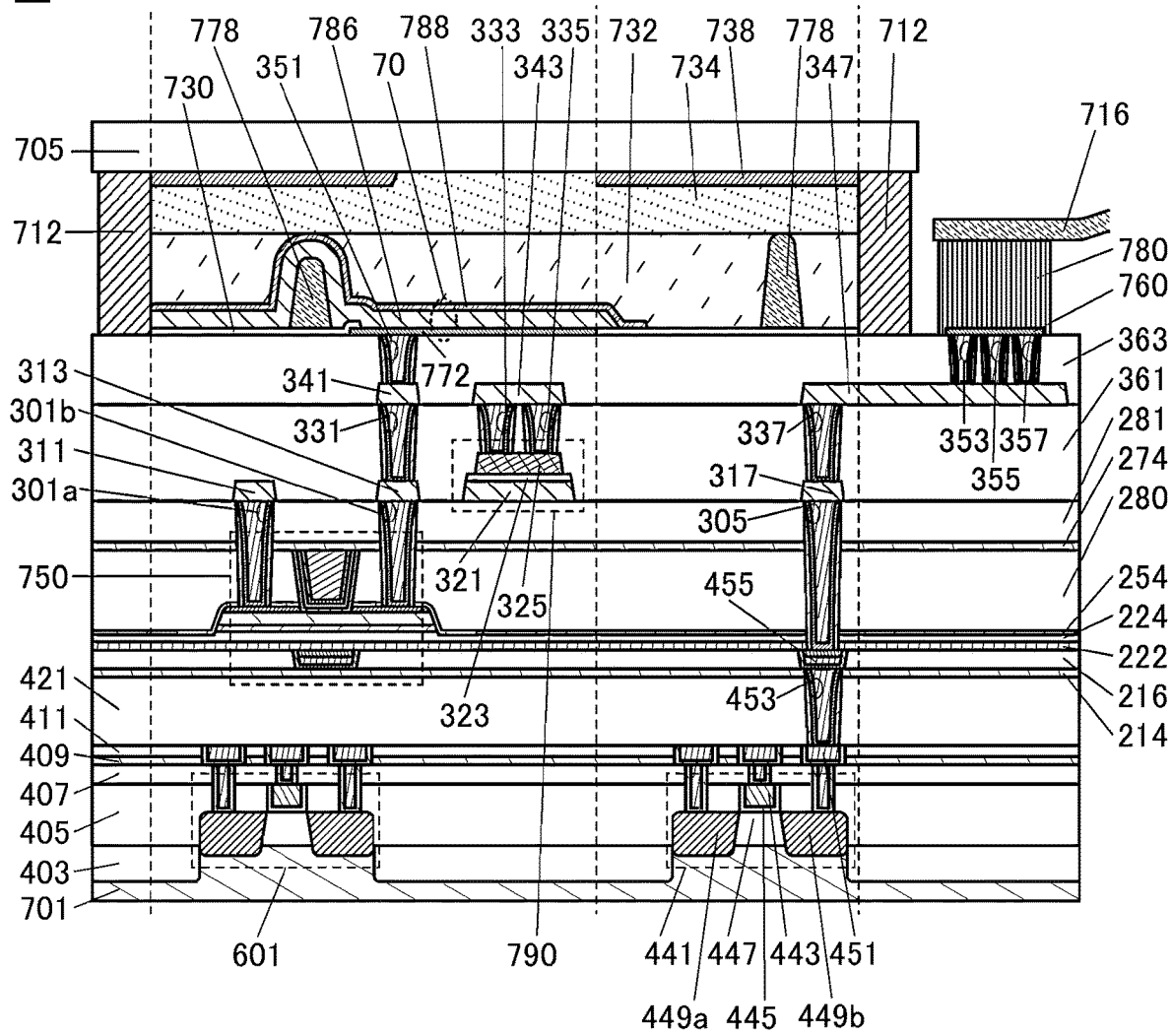
FIG. 28 is a cross-sectional view illustrating a structure example of a display device.

FIG. 28 is a cross-sectional view illustrating a structure example of the display device 10. The display device 10 includes a substrate 701 and a substrate 705, and the substrate 701 and the substrate 705 are attached to each other with a sealant 712.

As the substrate 701, a single crystal semiconductor substrate such as a single crystal silicon substrate can be used. Note that a semiconductor substrate other than a single crystal semiconductor substrate may be used as the substrate 701.

A transistor 441 and a transistor 601 are provided on the substrate 701. The transistor 441 and the transistor 601 can be transistors provided in the layer 20 described in Embodiment 1.

The transistor 441 is formed of a conductor 443 having a function of a gate electrode, an insulator 445 having a function of a gate insulator, and part of the substrate 701 and includes a semiconductor region 447 including a channel formation region, a low-resistance region 449a having a function of one of a source region and a drain region, and a low-resistance region 449b having a function of the other of the source region and the drain region. The transistor 441 can be either a p-channel transistor or an n-channel transistor.

The transistor 441 is electrically isolated from other transistors by an element isolation layer 403. FIG. 28 illustrates the case where the transistor 441 and the transistor 601 are electrically isolated from each other by the element isolation layer 403. The element isolation layer 403 can be formed by a LOCOS (LOCal Oxidation of Silicon) method, an STI (Shallow Trench Isolation) method, or the like.

Here, in the transistor 441 illustrated in FIG. 28, the semiconductor region 447 has a projecting shape. Moreover, the conductor 443 is provided to cover the side surface and the top surface of the semiconductor region 447 with the insulator 445 therebetween. Note that FIG. 28 does not illustrate the state where the conductor 443 covers the side surface of the semiconductor region 447. A material adjusting the work function can be used for the conductor 443.

A transistor having a projecting semiconductor region, like the transistor 441, can be referred to as a fin-type transistor because a projecting portion of a semiconductor substrate is used. Note that an insulator having a function of a mask for forming a projecting portion may be provided in contact with an upper portion of the projecting portion. Although FIG. 28 illustrates the structure in which the projecting portion is formed by processing part of the substrate 701, a semiconductor having a projecting shape may be formed by processing an SOI substrate.

Note that the structure of the transistor 441 illustrated in FIG. 28 is an example; the structure of the transistor 441 is not limited thereto and can be changed as appropriate in accordance with the circuit configuration, an operation method for the circuit, or the like. For example, the transistor 441 may be a planar transistor.

The transistor 601 can have a structure similar to that of the transistor 441.

An insulator 405, an insulator 407, an insulator 409, and an insulator 411 are provided over the substrate 701, in addition to the element isolation layer 403, the transistor 441, and the transistor 601. A conductor 451 is embedded in the insulator 405, the insulator 407, the insulator 409, and the insulator 411. Here, the top surface of the conductor 451 and the top surface of the insulator 411 can be substantially level with each other.

An insulator 421 and an insulator 214 are provided over the conductor 451 and the insulator 411. A conductor 453 is embedded in the insulator 421 and the insulator 214. Here, the top surface of the conductor 453 and the top surface of the insulator 214 can be substantially level with each other.

An insulator 216 is provided over the conductor 453 and the insulator 214. A conductor 455 is embedded in the insulator 216. Here, the top surface of the conductor 455 and the top surface of the insulator 216 can be substantially level with each other.

An insulator 222, an insulator 224, an insulator 254, an insulator 280, an insulator 274, and an insulator 281 are provided over the conductor 455 and the insulator 216. A conductor 305 is embedded in the insulator 222, the insulator 224, the insulator 254, the insulator 280, the insulator 274, and the insulator 281. Here, the top surface of the conductor 305 and the top surface of the insulator 281 can be substantially level with each other.

An insulator 361 is provided over the conductor 305 and the insulator 281. A conductor 317 and a conductor 337 are embedded in the insulator 361. Here, the top surface of the conductor 337 and the top surface of the insulator 361 can be substantially level with each other.

An insulator 363 is provided over the conductor 337 and the insulator 361. A conductor 347, a conductor 353, a conductor 355, and a conductor 357 are embedded in the insulator 363. Here, the top surfaces of the conductor 353, the conductor 355, and the conductor 357 and the top surface of the insulator 363 can be substantially level with each other.

A connection electrode 760 is provided over the conductor 353, the conductor 355, the conductor 357, and the insulator 363. An anisotropic conductor 780 is provided to be electrically connected to the connection electrode 760, and an FPC (Flexible Printed Circuit) 716 is provided to be electrically connected to the anisotropic conductor 780. A variety of signals and the like are supplied to the display device 10 from the outside of the display device 10 through the FPC 716.

As illustrated in FIG. 28, the low-resistance region 449b having a function of the other of the source region and the drain region of the transistor 441 is electrically connected to the FPC 716 through the conductor 451, the conductor 453, the conductor 455, the conductor 305, the conductor 317, the conductor 337, the conductor 347, the conductor 353, the conductor 355, the conductor 357, the connection electrode 760, and the anisotropic conductor 780. Although FIG. 28 illustrates three conductors, which are the conductor 353, the conductor 355, and the conductor 357, as conductors having a function of electrically connecting the connection electrode 760 and the conductor 347, one embodiment of the present invention is not limited thereto. The number of conductors having a function of electrically connecting the connection electrode 760 and the conductor 347 may be one, two, or four or more. Providing a plurality of conductors having a function of electrically connecting the connection electrode 760 and the conductor 347 can reduce the contact resistance.

A transistor 750 is provided over the insulator 214. The transistor 750 can be the transistor provided in the layer 30 described in Embodiment 1. For example, the transistor 750 can be the transistor provided in the pixel circuit 62. An OS transistor can be suitably used as the transistor 750. The OS transistor has a feature of extremely low off-state current. Consequently, the retention time for image data or the like can be increased, so that the frequency of refresh operation can be reduced. Thus, power consumption of the display device 10 can be reduced.

Alternatively, the transistor 750 can be the transistor provided in the backup circuit 82. An OS transistor can be suitably used as the transistor 750. The OS transistor has a feature of extremely low off-state current. Thus, data in the flip-flop can be retained even in a period during which the sharing of power supply voltage is stopped. Consequently, a normally-off operation (the intermittent stop operation of the supply of the power supply voltage) of the CPU can be performed. Thus, power consumption of the display device 10 can be reduced.

A conductor 301a and a conductor 301b are embedded in the insulator 254, the insulator 280, the insulator 274, and the insulator 281. The conductor 301a is electrically connected to one of a source and a drain of the transistor 750, and the conductor 301b is electrically connected to the other of the source and the drain of the transistor 750. Here, the top surfaces of the conductor 301a and the conductor 301b and the top surface of the insulator 281 can be substantially level with each other.

A conductor 311, a conductor 313, a conductor 331, a capacitor 790, a conductor 333, and a conductor 335 are embedded in the insulator 361. The conductor 311 and the conductor 313 are electrically connected to the transistor 750 and have a function of a wiring. The conductor 333 and the conductor 335 are electrically connected to the capacitor 790. Here, the top surfaces of the conductor 331, the conductor 333, and the conductor 335 and the top surface of the insulator 361 can be substantially level with each other.

A conductor 341, a conductor 343, and a conductor 351 are embedded in the insulator 363. Here, the top surface of the conductor 351 and the top surface of the insulator 363 can be substantially level with each other.

The insulator 405, the insulator 407, the insulator 409, the insulator 411, the insulator 421, the insulator 214, the insulator 280, the insulator 274, the insulator 281, the insulator 361, and the insulator 363 have a function of an interlayer film and may also have a function of a planarization film that covers unevenness thereunder. For example, the top surface of the insulator 363 may be planarized by planarization treatment using a chemical mechanical polishing (CMP) method or the like to have the increased planarity.

As illustrated in FIG. 28, the capacitor 790 includes a lower electrode 321 and an upper electrode 325. An insulator 323 is provided between the lower electrode 321 and the upper electrode 325. That is, the capacitor 790 has a stacked-layer structure in which the insulator 323 functioning as a dielectric is sandwiched between a pair of electrodes. Although FIG. 28 illustrates the example in which the capacitor 790 is provided over the insulator 281, the capacitor 790 may be provided over an insulator different from the insulator 281.

In the example illustrated in FIG. 28, the conductor 301a, the conductor 301b, and the conductor 305 are formed in the same layer. In the illustrated example, the conductor 311, the conductor 313, the conductor 317, and the lower electrode 321 are formed in the same layer. In the illustrated example, the conductor 331, the conductor 333, the conductor 335, and the conductor 337 are formed in the same layer. In the illustrated example, the conductor 341, the conductor 343, and the conductor 347 are formed in the same layer. In the illustrated example, the conductor 351, the conductor 353, the conductor 355, and the conductor 357 are formed in the same layer. Forming a plurality of conductors in the same layer can simplify the manufacturing process of the display device 10 and thus can reduce the manufacturing cost of the display device 10. Note that these conductors may be formed in different layers or may contain different types of materials.

The display device 10 illustrated in FIG. 28 includes the light-emitting element 70. The light-emitting element 70 includes a conductor 772, an EL layer 786, and a conductor 788. The EL layer 786 contains an organic compound or an inorganic compound such as quantum dots.

Examples of materials that can be used as an organic compound include a fluorescent material and a phosphorescent material. Examples of materials that can be used as quantum dots include a colloidal quantum dot material, an alloyed quantum dot material, a core-shell quantum dot material, and a core quantum dot material.

The conductor 772 is electrically connected to the other of the source and the drain of the transistor 750 through the conductor 351, the conductor 341, the conductor 331, the conductor 313, and the conductor 301b. The conductor 772 is formed over the insulator 363 and has a function of a pixel electrode.

A material that transmits visible light or a material that reflects visible light can be used for the conductor 772. As a light-transmitting material, for example, an oxide material containing indium, zinc, tin, or the like is preferably used. As a reflective material, for example, a material containing aluminum, silver, or the like is preferably used.

Although not illustrated in FIG. 28, an optical member (optical substrate) such as a polarizing member, a retardation member, or an anti-reflection member can be provided in the display device 10, for example.

On the substrate 705 side, a light-blocking layer 738 and an insulator 734 that is in contact with them are provided. The light-blocking layer 738 has a function of blocking light emitted from adjacent regions. Alternatively, the light-blocking layer 738 has a function of preventing external light from reaching the transistor 750 or the like.

In the display device 10 illustrated in FIG. 28, an insulator 730 is provided over the insulator 363. Here, the insulator 730 can cover part of the conductor 772. The light-emitting element 70 includes the conductor 788 with a light-transmitting property, and thus can be a top-emission light-emitting element. Note that the light-emitting element 70 may have a bottom-emission structure in which light is emitted to the conductor 772 side or a dual-emission structure in which light is emitted towards both the conductor 772 and the conductor 788.

Note that the light-blocking layer 738 is provided to have a region overlapping with the insulator 730. The light-blocking layer 738 is covered with the insulator 734. A space between the light-emitting element 70 and the insulator 734 is filled with a sealing layer 732.

A component 778 is provided between the insulator 730 and the EL layer 786. The component 778 is provided between the insulator 730 and the insulator 734.

Figure 29:
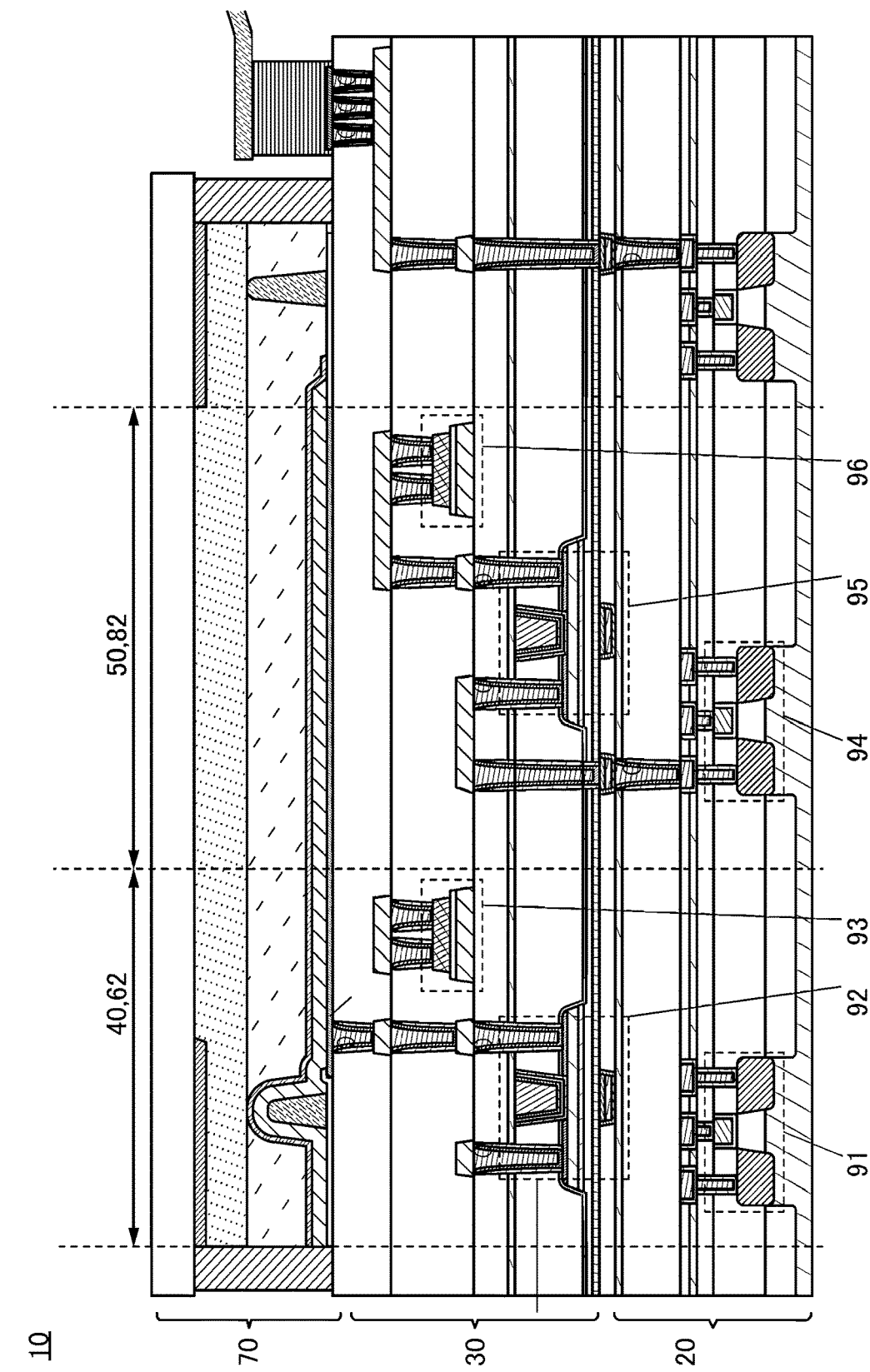
FIG. 29 is a cross-sectional view illustrating a structure example of a display device.

FIG. 29 is a cross-sectional view illustrating a Si transistor included in the driver circuit 40 included in the layer 20 and an OS transistor included in the pixel circuit 62 included in the layer 30 (regions 40 and 62), and a Si transistor included in the functional circuit 50 included in the layer 20 and an OS transistor included in the backup circuit 82 included in the layer 30 (regions 50 and 82), which are described in Embodiment 1. The description of the cross-sectional view illustrated in FIG. 29 is similar to that of the components in the cross-sectional view illustrated in FIG. 28.

As illustrated in FIG. 29, a Si transistor 91 in the driver circuit 40 and a Si transistor 94 in the functional circuit 50 can be provided in the layer 20. As illustrated in FIG. 29, an OS transistor 92 and a capacitor 93 in the pixel circuit 62 and an OS transistor 95 and a capacitor 96 in the backup circuit 82 can be provided in the layer 30. The light-emitting element 70 can be provided above the layer 30.

Figure 30A:
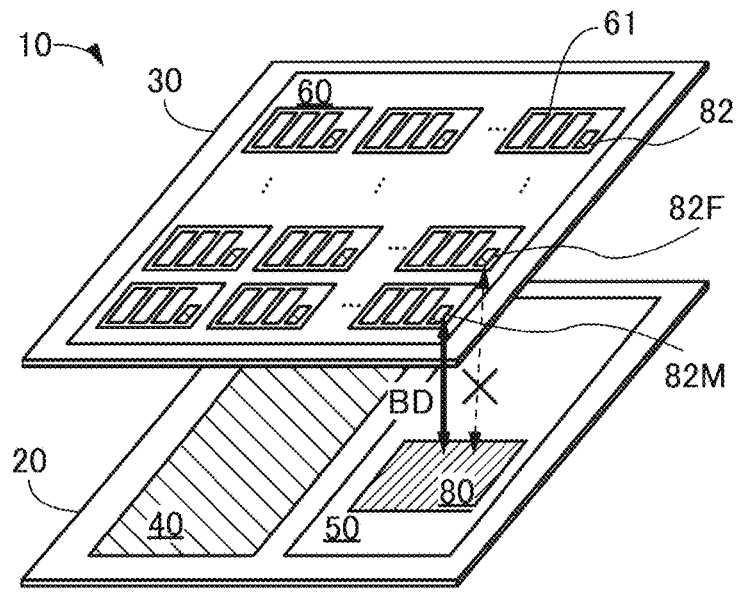
FIG. 30A is a block diagram illustrating a structure example of a display device.

FIG. 30A is a diagram schematically illustrating a state of data backup in the functional circuit 50 provided in the layer 20 in the structure example of the display device 10 described in Embodiment 1. FIG. 30A illustrates a structure example in which the backup circuit 82 is provided in each pixel 61 in the display portion 60 provided in the layer 30.

In a structure in which the backup circuits 82 illustrated in FIG. 30A are provided uniformly in the display portion 60, the flip-flop 80 for transmitting and receiving the backup data BD is preferably provided close to the backup circuit 82. In a structure in which the backup circuits 82 can be uniformly provided in the display portion 60, backup data can be transmitted and received between the flip-flop 80 and the backup circuit 82 directly over the flip-flop 80, even when the flip-flop 80 is provided at any position in the layer 20.

For example, a structure can be employed in which backup data transmission and reception are performed between a backup circuit 82M in FIG. 30A and a circuit (e.g., the flip-flop 80) included in the functional circuit 50 directly under the backup circuit 82M, and backup data transmission and reception are not performed between a backup circuit 82F in FIG. 30A and a circuit included in the functional circuit 50 directly under the backup circuit 82F.

Figure 30B:
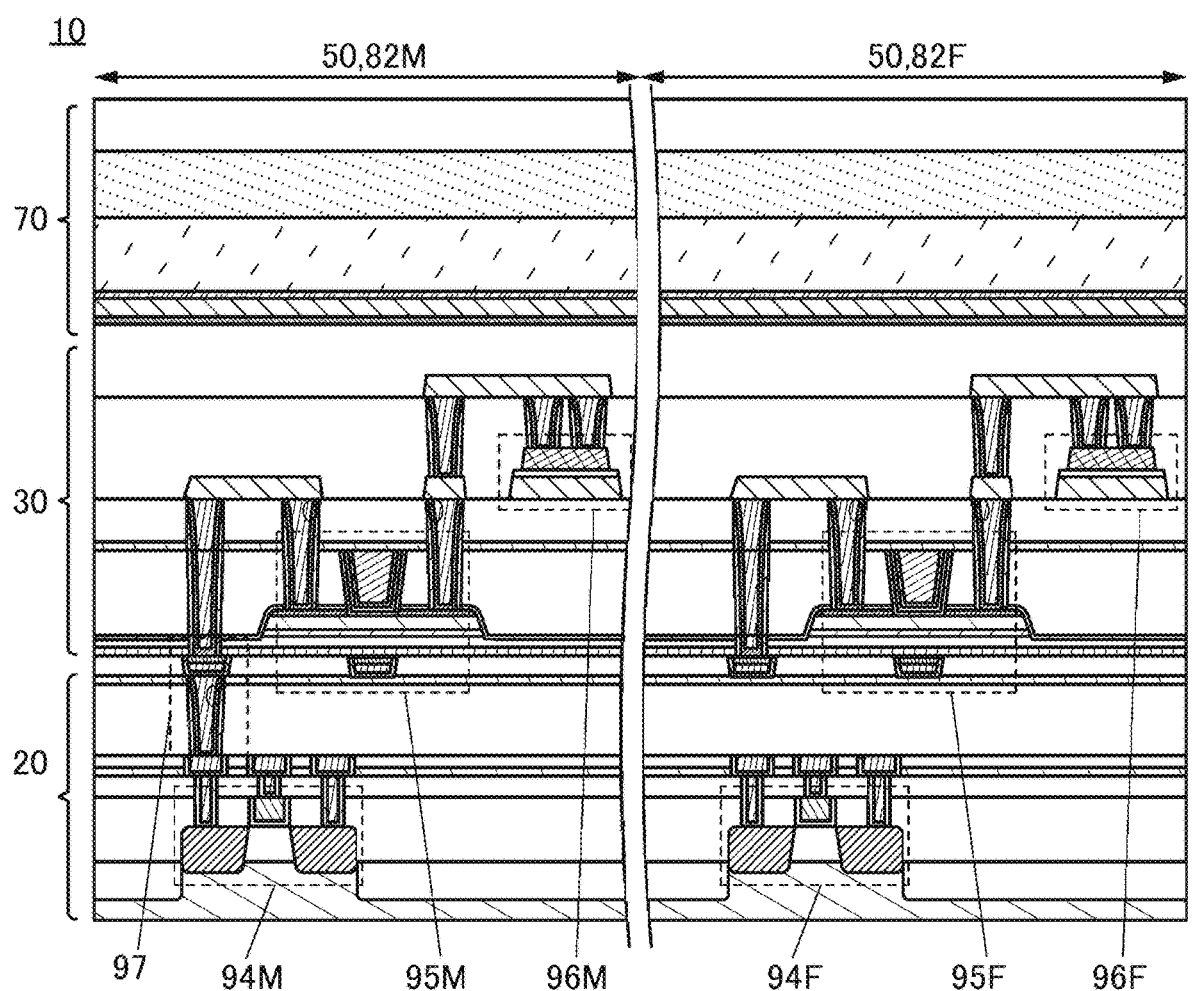
FIG. 30B is a cross-sectional view illustrating a structure example of the display device.

FIG. 30B illustrates a schematic cross-sectional view corresponding to the structure shown in FIG. 30A. For connection between a circuit included in the functional circuit 50 and the backup circuit 82M transmitting and receiving backup data, for example, a wiring 97 for electrically connecting the layer 20 and the layer 30 is provided, whereby a transistor 94M in the layer 20 can be electrically connected to a transistor 95M and a capacitor 96M in the layer 30.

In contrast, the wiring 97 for electrically connecting the layer 20 and the layer 30 is not provided between the circuit included in the functional circuit 50 and the backup circuit 82F transmitting and receiving backup data. With such a structure, the transistor 94M in the layer 20 is not electrically connected to the transistor 95M and the capacitor 96M in the layer 30. Each terminal of the backup circuit 82F which is not electrically connected to the circuit included in the functional circuit 50 may be in an electrically floating state or may be connected to a wiring to which a fixed potential is supplied.

As illustrated in FIG. 30A and FIG. 30B, with a structure in which the electrical connection between the circuit included in the functional circuit 50 in the layer 20 and the backup circuit 82 in the layer 30 can be selected, connection with a backup circuit performing data backup can be ensured only by changing a layout of wiring layers even when an position of the functional circuit 50 arithmetically processing data in the layer 20 is changed.

Figure 31:
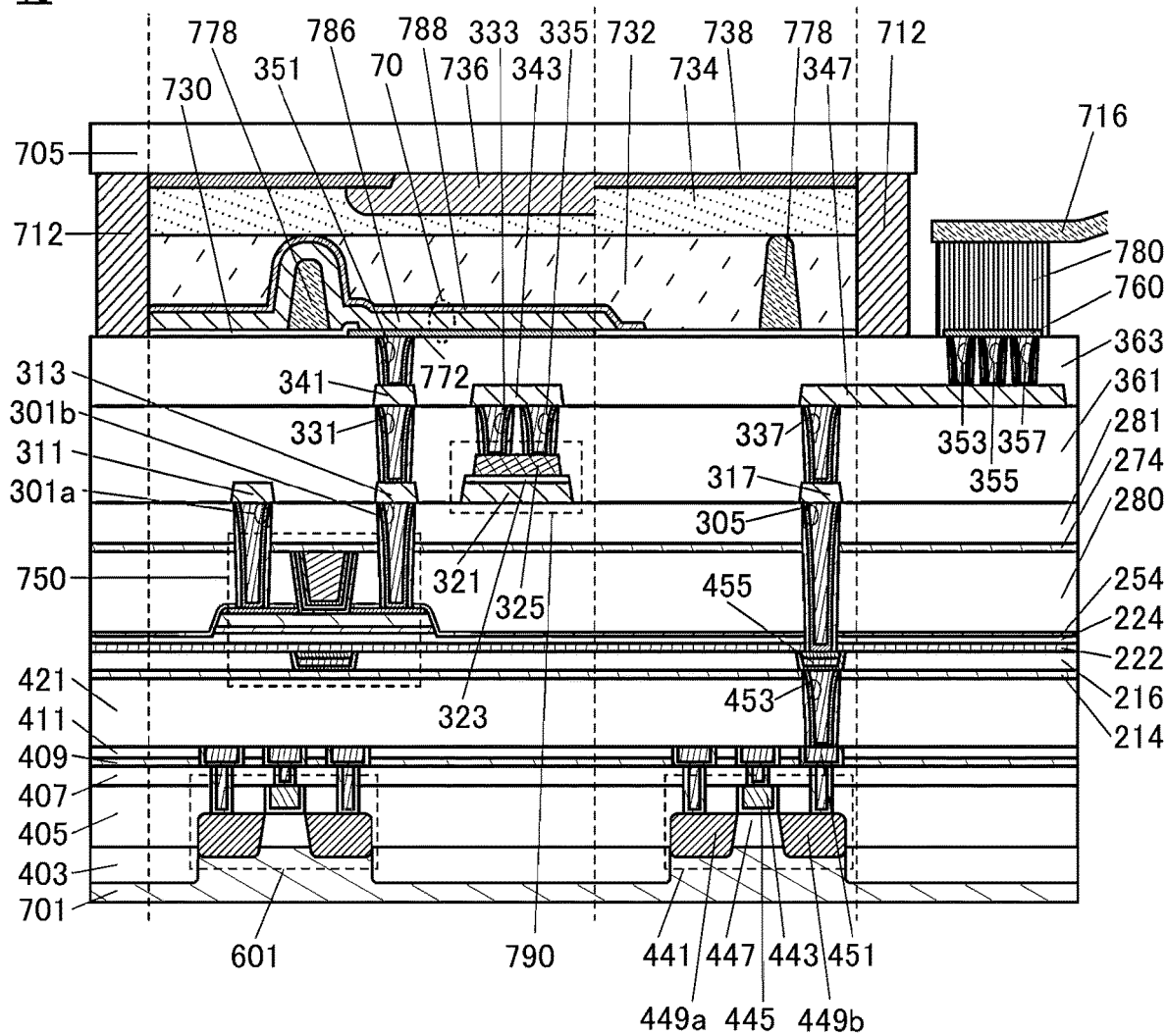
FIG. 31 is a cross-sectional view illustrating a structure example of a display device.

FIG. 31 illustrates a modification example of the display device 10 illustrated in FIG. 28. The display device 10 illustrated in FIG. 31 is different from the display device 10 illustrated in FIG. 28 in that a coloring layer 736 is provided. Note that the coloring layer 736 is provided to have a region overlapping with the light-emitting element 70. Providing the coloring layer 736 can improve the color purity of light extracted from the light-emitting element 70. Thus, the display device 10 can display high-quality images. Furthermore, all the light-emitting elements for example, in the display device 10 can be light-emitting elements that emit white light; hence, the EL layers 786 are not necessarily formed separately for each color, leading to higher resolution of the display device 10.

The light-emitting element 70 can have a micro optical resonator (microcavity) structure. Thus, light of predetermined colors (e.g., RGB) can be extracted without a coloring layer, and the display device 10 can perform color display. The structure without a coloring layer can prevent light absorption by the coloring layer. Thus, the display device 10 can display high-luminance images, and the power consumption of the display device 10 can be reduced. Note that a structure in which a coloring layer is not provided can be employed even when the EL layer 786 is formed into an island shape for each pixel or into a stripe shape for each pixel column, i.e., the EL layers 786 are formed separately for each color. Note that the luminance of the display device 10 can be, for example, higher than or equal to 500 cd/m$^2$, preferably higher than or equal to 1000 cd/m$^2$ and lower than or equal to 10000 cd/m$^2$, further preferably higher than or equal to 2000 cd/m$^2$ and lower than or equal to 5000 cd/m$^2$.

Figure 32:
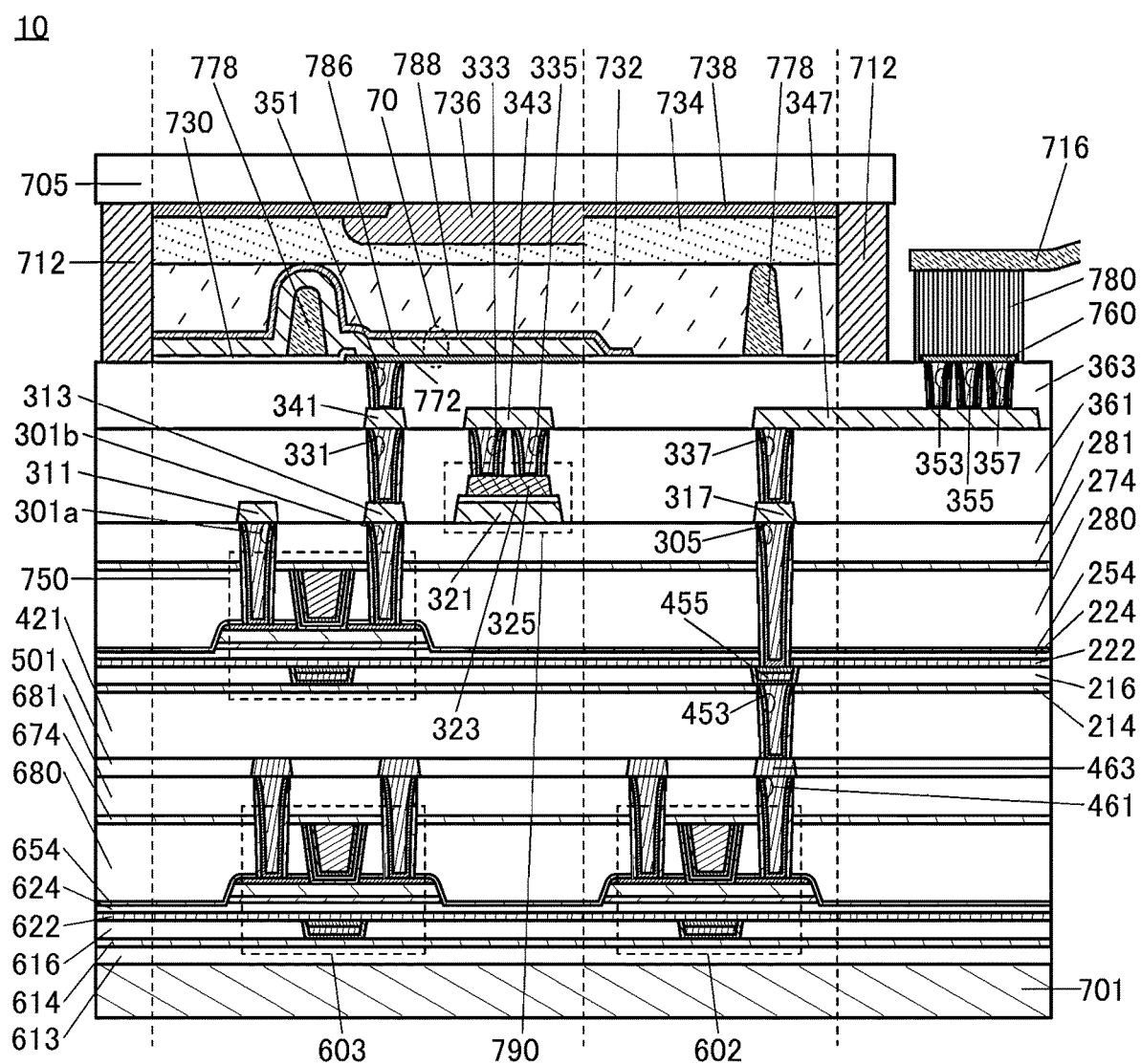
FIG. 32 is a cross-sectional view illustrating a structure example of a display device.

Although FIG. 28 and FIG. 31 each illustrate a structure in which the transistor 441 and the transistor 601 are provided such that their channel formation regions are formed inside the substrate 701 and the OS transistor is stacked over the transistor 441 and the transistor 601, one embodiment of the present invention is not limited thereto. FIG. 32 illustrates a modification example of FIG. 31. The display device 10 illustrated in FIG. 32 is different from the display device 10 illustrated in FIG. 31 mainly in that a transistor 602 and a transistor 603 that are OS transistors are provided in place of the transistor 441 and the transistor 601. An OS transistor can be used as the transistor 750. That is, the display device 10 illustrated in FIG. 32 includes a stack of OS transistors.

An insulator 613 and an insulator 614 are provided over the substrate 701, and the transistor 602 and the transistor 603 are provided over the insulator 614. Note that a transistor or the like may be provided between the substrate 701 and the insulator 613. For example, a transistor having a structure similar to those of the transistor 441 and the transistor 601 illustrated in FIG. 31 may be provided between the substrate 701 and the insulator 613.

The transistor 602 and the transistor 603 can be transistors provided in the layer 20 described in Embodiment 1.

The transistor 602 and the transistor 603 can be transistors having a structure similar to that of the transistor 750. Note that the transistor 602 and the transistor 603 may be OS transistors having a structure different from that of the transistor 750.

An insulator 616, an insulator 622, an insulator 624, an insulator 654, an insulator 680, an insulator 674, and an insulator 681 are provided over the insulator 614, in addition to the transistor 602 and the transistor 603. A conductor 461 is embedded in the insulator 654, the insulator 680, the insulator 674, and the insulator 681. Here, the top surface of the conductor 461 and the top surface of the insulator 681 can be substantially level with each other.

An insulator 501 is provided over the conductor 461 and the insulator 681. A conductor 463 is embedded in the insulator 501. Here, the top surface of the conductor 463 and the top surface of the insulator 501 can be substantially level with each other.

The insulator 421 and the insulator 214 are provided over the conductor 463 and the insulator 501. The conductor 453 is embedded in the insulator 421 and the insulator 214. Here, the top surface of the conductor 453 and the top surface of the insulator 214 can be substantially level with each other.

As illustrated in FIG. 32, one of a source and a drain of the transistor 602 is electrically connected to the FPC 716 through the conductor 461, the conductor 463, the conductor 453, the conductor 455, the conductor 305, the conductor 317, the conductor 337, the conductor 347, the conductor 353, the conductor 355, the conductor 357, the connection electrode 760, and the anisotropic conductor 780.

The insulator 613, the insulator 614, the insulator 680, the insulator 674, the insulator 681, and the insulator 501 have a function of an interlayer film and may also have a function of a planarization film that covers unevenness thereunder.

When the display device 10 has the structure illustrated in FIG. 32, all the transistors included in the display device 10 can be OS transistors while the bezel and size of the display device 10 are reduced. Accordingly, the transistors provided in the layer 20 and the transistors provided in the layer 30, which are described in Embodiment 1, can be manufactured using the same apparatus, for example. Consequently, the manufacturing cost of the display device 10 can be reduced, making the display device 10 inexpensive.

Figure 33:
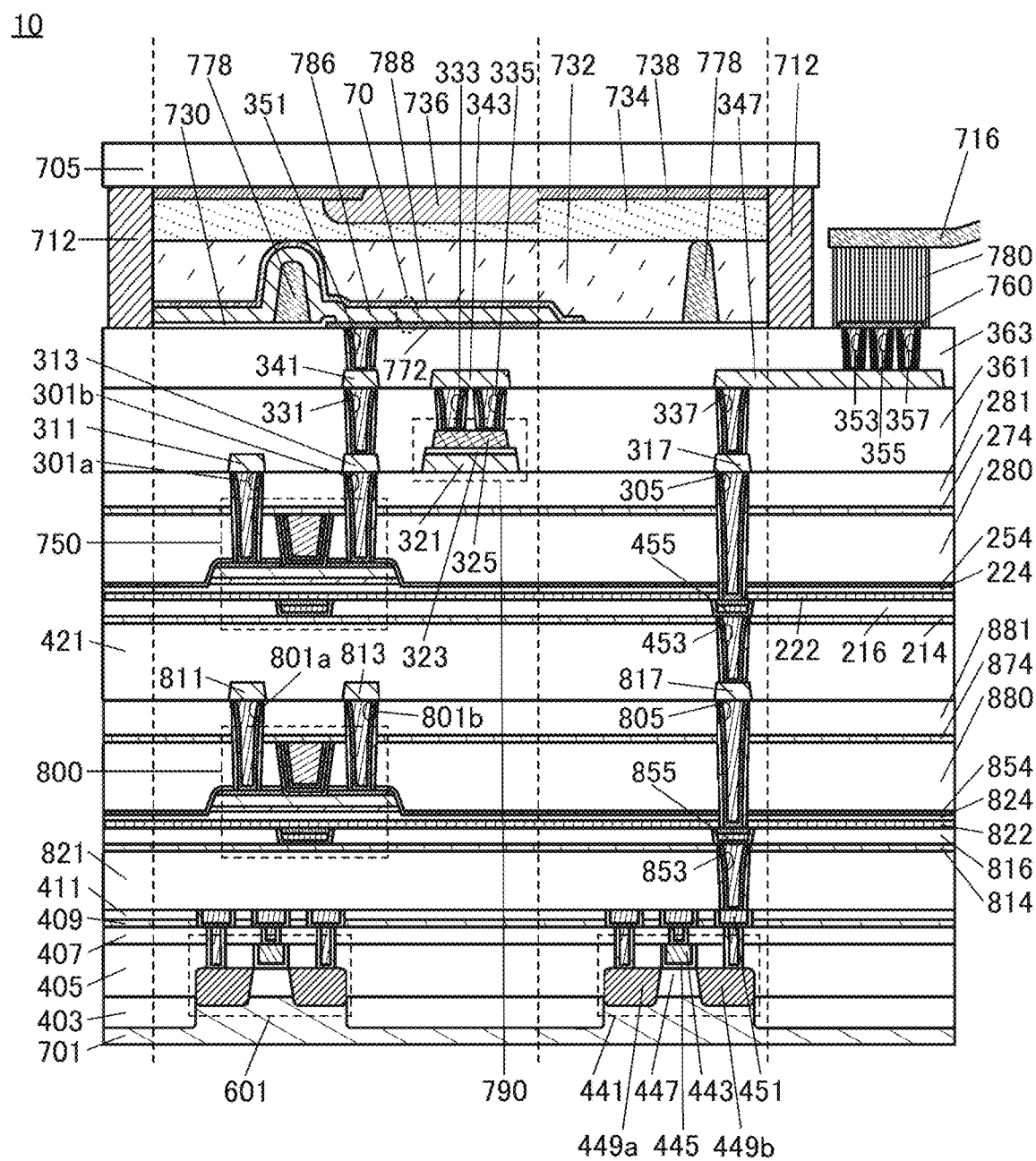
FIG. 33 is a cross-sectional view illustrating a structure example of a display device.

FIG. 33 is a cross-sectional view illustrating a structure example of the display device 10. The display device 10 illustrated in FIG. 33 is different from the display device 10 illustrated in FIG. 31 mainly in that a layer including a transistor 800 is provided between the layer including the transistor 750 and the layer including the transistor 601 and the transistor 441.

In the structure of FIG. 33, the layer 20 described in Embodiment 1 can be formed of the layer including the transistor 601 and the transistor 441 and the layer including the transistor 800. The transistor 750 can be a transistor provided in the layer 30 described in Embodiment 1.

An insulator 821 and an insulator 814 are provided over the conductor 451 and the insulator 411. A conductor 853 is embedded in the insulator 821 and the insulator 814. Here, the top surface of the conductor 853 and the top surface of the insulator 814 can be substantially level with each other.

An insulator 816 is provided over the conductor 853 and the insulator 814. A conductor 855 is embedded in the insulator 816. Here, the top surface of the conductor 855 and the top surface of the insulator 816 can be substantially level with each other.

An insulator 822, an insulator 824, an insulator 854, an insulator 880, an insulator 874, and an insulator 881 are provided over the conductor 855 and the insulator 816. A conductor 805 is embedded in the insulator 822, the insulator 824, the insulator 854, the insulator 880, the insulator 874, and the insulator 881. Here, the top surface of the conductor 805 and the top surface of the insulator 881 can be substantially level with each other.

The insulator 421 and the insulator 214 are provided over the conductor 817 and the insulator 881.

As illustrated in FIG. 33, the low-resistance region 449b having a function of the other of the source region and the drain region of the transistor 441 is electrically connected to the FPC 716 through the conductor 451, the conductor 853, the conductor 855, the conductor 805, the conductor 817, the conductor 453, the conductor 455, the conductor 305, the conductor 317, the conductor 337, the conductor 347, the conductor 353, the conductor 355, the conductor 357, the connection electrode 760, and the anisotropic conductor 780.

The transistor 800 is provided over the insulator 814. The transistor 800 can be the transistor provided in the layer 20 described in Embodiment 1. The transistor 800 is preferably an OS transistor. The transistor 800 can be, for example, the transistor provided in the backup circuit 82.

A conductor 801a and a conductor 801b are embedded in the insulator 854, the insulator 880, the insulator 874, and the insulator 881. The conductor 801a is electrically connected to one of a source and a drain of the transistor 800, and the conductor 801b is electrically connected to the other of the source and the drain of the transistor 800. Here, the top surfaces of the conductor 801a and the conductor 801b and the top surface of the insulator 881 can be substantially level with each other.

The transistor 750 can be the transistor provided in the layer 30 described in Embodiment 1. For example, the transistor 750 can be the transistor provided in the pixel circuit 62. The transistor 750 is preferably an OS transistor.

The insulator 405, the insulator 407, the insulator 409, the insulator 411, the insulator 821, the insulator 814, the insulator 880, the insulator 874, the insulator 881, the insulator 421, the insulator 214, the insulator 280, the insulator 274, the insulator 281, the insulator 361, and the insulator 363 have a function of an interlayer film and may also have a function of a planarization film that covers unevenness thereunder.

In the example illustrated in FIG. 33, the conductor 801a, the conductor 801b, and the conductor 805 are formed in the same layer. In the illustrated example, a conductor 811, a conductor 813, and the conductor 817 are formed in the same layer.

Figure 34:
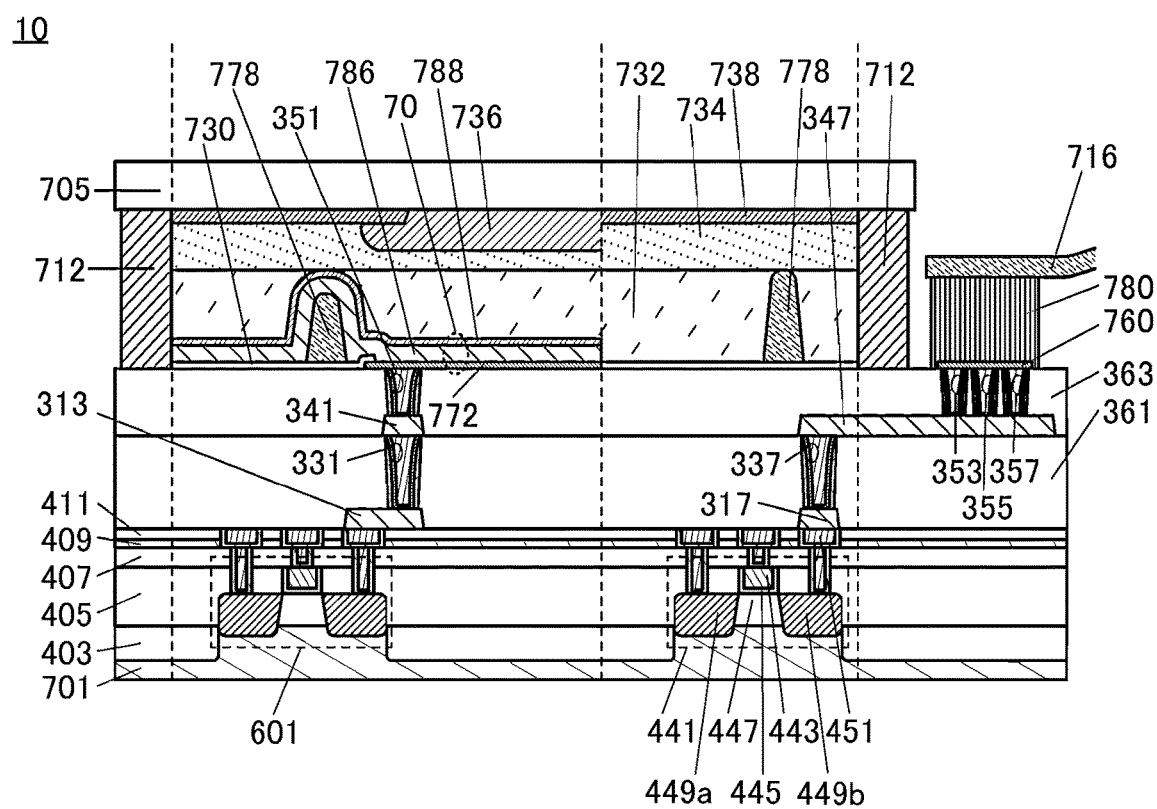
FIG. 34 is a cross-sectional view illustrating a structure example of a display device.

FIG. 34 is a cross-sectional view illustrating a structure example of the display device 10. The display device 10 illustrated in FIG. 34 is different from the display device 10 illustrated in FIG. 31 mainly in that the layer including the transistor 750 is not illustrated.

In the structure in FIG. 34, as a transistor corresponding to the transistor 750, which is an OS transistor, it is possible to use the Si transistor included in the layer 20 described in Embodiment 1, for example, the transistor 601. The transistor 601 preferably has a structure in which a channel length is longer than that of the transistor 441 because the transistor 601 is used as a transistor with low off-state current.

Note that in the structure of FIG. 34, a layer in which a conductor functions as a wiring as well as the layer including the transistor 750, which is an OS transistor, are not illustrated. A plurality of layers in which conductors function as wirings may be provided between the layer including the Si transistors such as the transistor 601 and the transistor 441 and a layer including the light-emitting element 70. With such a structure, the layout flexibility of the display portion and elements such as a transistor under the display portion can be increased.

At least part of this embodiment can be implemented in combination with the other embodiments described in this specification as appropriate.

Embodiment 3

In this embodiment, transistors and light-emitting elements (light-emitting devices) that can be used in the display device of one embodiment of the present invention are described.

<Structure Example of Transistor>

Figure 35A:
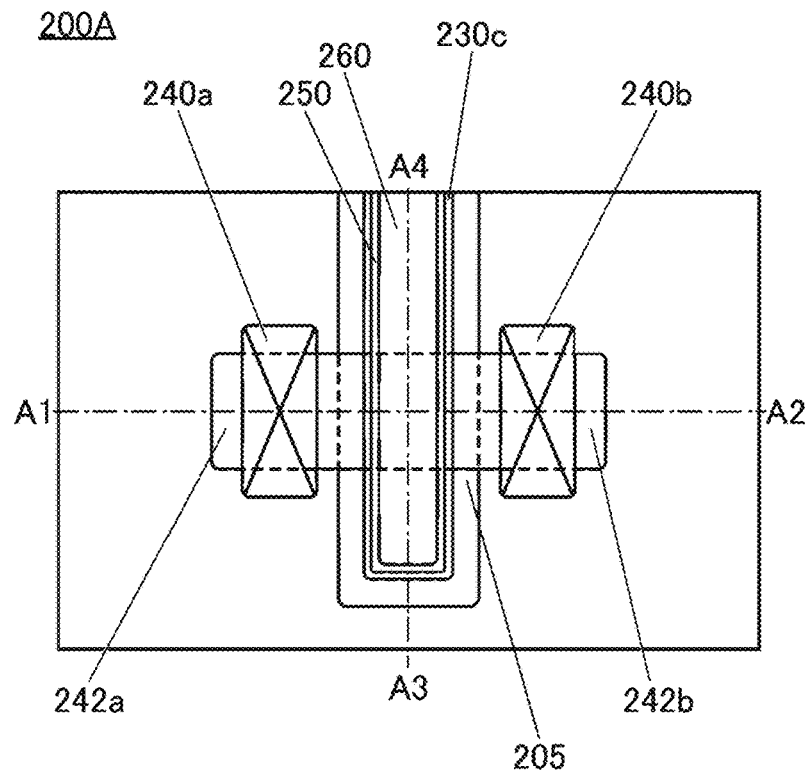
FIG. 35A is a top view illustrating a structure example of a transistor.
Figure 35C:
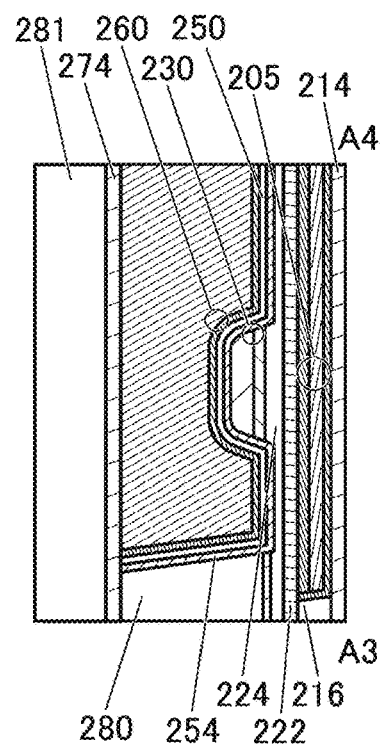
FIG. 35B and FIG. 35C are cross-sectional views illustrating a structure example of the transistor.
Figure 35B:
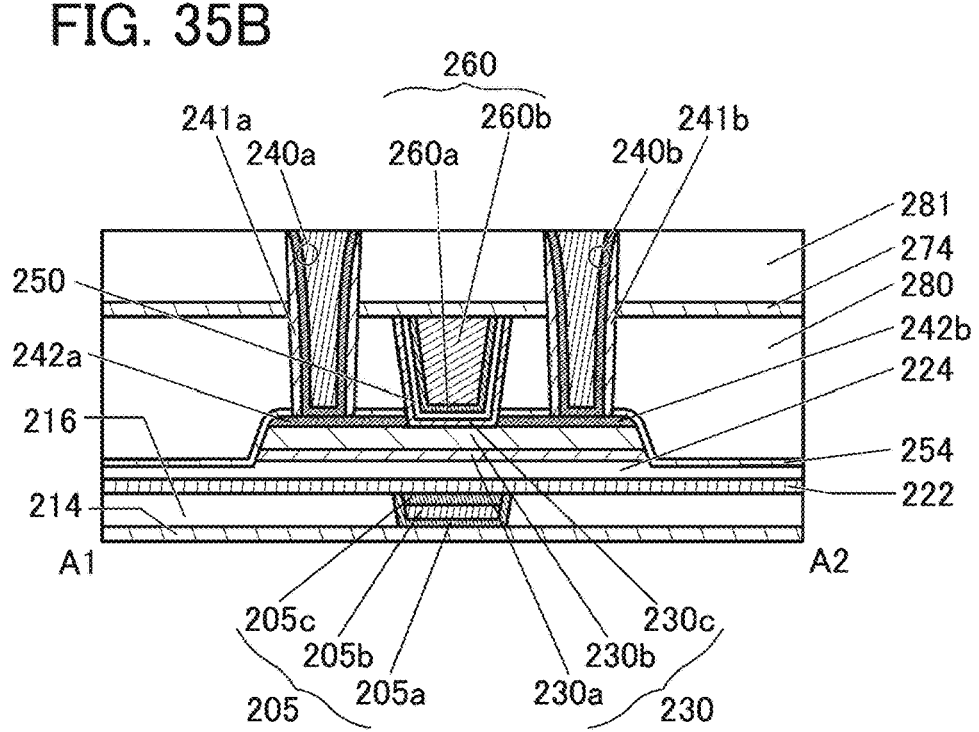

FIG. 35A, FIG. 35B, and FIG. 35C are a top view and cross-sectional views of a transistor 200A that can be used in the display device of one embodiment of the present invention and the periphery of the transistor 200A. The transistor 200A can be used in the display device of one embodiment of the present invention.

FIG. 35A is the top view of the transistor 200A. FIG. 35B and FIG. 35C are the cross-sectional views of the transistor 200A. Here, FIG. 35B is a cross-sectional view of a portion indicated by dashed-dotted line A1-A2 in FIG. 35A and is also a cross-sectional view of the transistor 200A in the channel length direction. FIG. 35C is a cross-sectional view of a portion indicated by dashed-dotted line A3-A4 in FIG. 35A and is also a cross-sectional view of the transistor 200A in the channel width direction. Note that some components are omitted in the top view of FIG. 35A for clarity of the drawing.

As illustrated in FIG. 35, the transistor 200A includes a metal oxide 230a provided over a substrate (not illustrated); a metal oxide 230b provided over the metal oxide 230a; a conductor 242a and a conductor 242b that are provided apart from each other over the metal oxide 230b; the insulator 280 that is provided over the conductor 242a and the conductor 242b and has an opening between the conductor 242a and the conductor 242b; a conductor 260 provided in the opening; an insulator 250 provided between the conductor 260 and each of the metal oxide 230b, the conductor 242a, the conductor 242b, and the insulator 280; and a metal oxide 230c provided between the insulator 250 and each of the metal oxide 230b, the conductor 242a, the conductor 242b, and the insulator 280. Here, as illustrated in FIG. 35B and FIG. 35C, preferably, the top surface of the conductor 260 is substantially level with the top surfaces of the insulator 250, the insulator 254, the metal oxide 230c, and the insulator 280. Hereinafter, the metal oxide 230a, the metal oxide 230b, and the metal oxide 230c may be collectively referred to as a metal oxide 230. The conductor 242a and the conductor 242b may be collectively referred to as a conductor 242.

In the transistor 200A illustrated in FIG. 35, the side surfaces of the conductor 242a and the conductor 242b on the conductor 260 side are substantially perpendicular. Note that the transistor 200A illustrated in FIG. 35 is not limited thereto, and the angle formed between the side surfaces and the bottom surfaces of the conductor 242a and the conductor 242b may be greater than or equal to 10° and less than or equal to 80°, preferably greater than or equal to 30° and less than or equal to 60°. The side surfaces of the conductor 242a and the conductor 242b that face each other may have a plurality of surfaces.

As illustrated in FIG. 35, the insulator 254 is preferably provided between the insulator 280 and each of the insulator 224, the metal oxide 230a, the metal oxide 230b, the conductor 242a, the conductor 242b, and the metal oxide 230c. Here, as illustrated in FIG. 35B and FIG. 35C, the insulator 254 is preferably in contact with the side surface of the metal oxide 230c, the top surface and the side surface of the conductor 242a, the top surface and the side surface of the conductor 242b, the side surfaces of the metal oxide 230a and the metal oxide 230b, and the top surface of the insulator 224.

The transistor 200A has a structure in which three layers of the metal oxide 230a, the metal oxide 230b, and the metal oxide 230c are stacked in and around the region where the channel is formed (hereinafter also referred to as channel formation region); however, the present invention is not limited thereto. For example, a two-layer structure of the metal oxide 230b and the metal oxide 230c or a stacked-layer structure of four or more layers may be employed. Although the conductor 260 is illustrated to have a stacked-layer structure of two layers in the transistor 200A, the present invention is not limited thereto. For example, the conductor 260 may have a single-layer structure or a stacked-layer structure of three or more layers. Furthermore, each of the metal oxide 230a, the metal oxide 230b, and the metal oxide 230c may have a stacked-layer structure of two or more layers.

For example, in the case where the metal oxide 230c has a stacked-layer structure including a first metal oxide and a second metal oxide over the first metal oxide, the first metal oxide preferably has a composition similar to that of the metal oxide 230b and the second metal oxide preferably has a composition similar to that of the metal oxide 230a.

Here, the conductor 260 functions as a gate electrode of the transistor, and the conductor 242a and the conductor 242b function as a source electrode and a drain electrode. As described above, the conductor 260 is formed to be embedded in the opening of the insulator 280 and the region interposed between the conductor 242a and the conductor 242b. Here, the positions of the conductor 260, the conductor 242a, and the conductor 242b are selected in a self-aligned manner with respect to the opening of the insulator 280. In other words, in the transistor 200A, the gate electrode can be provided between the source electrode and the drain electrode in a self-aligned manner. Thus, the conductor 260 can be formed without an alignment margin, resulting in a reduction in the area occupied by the transistor 200A. Accordingly, the display device can have higher resolution. In addition, the display device can have a narrow bezel.

As illustrated in FIG. 35, the conductor 260 preferably includes a conductor 260a provided on the inner side of the insulator 250 and a conductor 260b provided to be embedded inside the conductor 260a.

The transistor 200A preferably includes the insulator 214 provided over the substrate (not illustrated); the insulator 216 provided over the insulator 214; a conductor 205 provided to be embedded in the insulator 216; the insulator 222 provided over the insulator 216 and the conductor 205;

and the insulator 224 provided over the insulator 222. The metal oxide 230a is preferably provided over the insulator 224.

The insulator 274 and the insulator 281 functioning as interlayer films are preferably provided over the transistor 200A. Here, the insulator 274 is preferably provided in contact with the top surfaces of the conductor 260, the insulator 250, the insulator 254, the metal oxide 230c, and the insulator 280.

The insulator 222, the insulator 254, and the insulator 274 preferably have a function of inhibiting diffusion of at least one of hydrogen (e.g., hydrogen atoms and hydrogen molecules). For example, the insulator 222, the insulator 254, and the insulator 274 preferably have a lower hydrogen permeability than the insulator 224, the insulator 250, and the insulator 280. Moreover, the insulator 222 and the insulator 254 preferably have a function of inhibiting diffusion of oxygen (e.g., at least one of oxygen atoms and oxygen molecules). For example, the insulator 222 and the insulator 254 preferably have a lower oxygen permeability than the insulator 224, the insulator 250, and the insulator 280.

Here, the insulator 224, the metal oxide 230, and the insulator 250 are separated from the insulator 280 and the insulator 281 by the insulator 254 and the insulator 274. This can inhibit entry of impurities such as hydrogen contained in the insulator 280 and the insulator 281 into the insulator 224, the metal oxide 230, and the insulator 250 or excess oxygen into the insulator 224, the metal oxide 230a, the metal oxide 230b, and the insulator 250.

A conductor 240 (a conductor 240a and a conductor 240b) that is electrically connected to the transistor 200A and functions as a plug is preferably provided. Note that an insulator 241 (an insulator 241a and an insulator 241b) is provided in contact with the side surface of the conductor 240 functioning as a plug. That is, the insulator 241 is provided in contact with the inner wall of an opening in the insulator 254, the insulator 280, the insulator 274, and the insulator 281. In addition, a structure may be employed in which a first conductor of the conductor 240 is provided in contact with the side surface of the insulator 241 and a second conductor of the conductor 240 is provided on the inner side of the first conductor. Here, the top surface of the conductor 240 and the top surface of the insulator 281 can be substantially level with each other. Although the transistor 200A has a structure in which the first conductor of the conductor 240 and the second conductor of the conductor 240 are stacked, the present invention is not limited thereto. For example, the conductor 240 may have a single-layer structure or a stacked-layer structure of three or more layers. In the case where a component has a stacked-layer structure, layers may be distinguished by ordinal numbers corresponding to the formation order.

In the transistor 200A, a metal oxide functioning as an oxide semiconductor (hereinafter also referred to as an oxide semiconductor) is preferably used as the metal oxide 230 including the channel formation region (the metal oxide 230a, the metal oxide 230b, and the metal oxide 230c). For example, it is preferable to use a metal oxide having a band gap of 2 eV or more, preferably 2.5 eV or more as the metal oxide to be the channel formation region of the metal oxide 230.

The metal oxide preferably contains at least indium (In) or zinc (Zn). In particular, the metal oxide preferably contains indium (In) and zinc (Zn). In addition to them, the element M is preferably contained. As the element M, one or more of aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and cobalt (Co) can be used. In particular, the element M is preferably one or more of aluminum (Al), gallium (Ga), yttrium (Y), and tin (Sn). Furthermore, the element M preferably contains one or both of Ga and Sn.

As illustrated in FIG. 35B, the metal oxide 230b in a region that does not overlap with the conductor 242 sometimes has a smaller thickness than the metal oxide 230b in a region that overlaps with the conductor 242. The thin region is formed when part of the top surface of the metal oxide 230b is removed at the time of forming the conductor 242a and the conductor 242b. When a conductive film to be the conductor 242 is formed, a low-resistance region is sometimes formed on the top surface of the metal oxide 230b in the vicinity of the interface with the conductive film. Removing the low-resistance region positioned between the conductor 242a and the conductor 242b on the top surface of the metal oxide 230b in the above manner can prevent formation of the channel in the region.

According to one embodiment of the present invention, a display device that includes small-size transistors and has high resolution can be provided. A display device that includes a transistor with high on-state current and has high luminance can be provided. A display device that includes a transistor operating at high speed and thus operates at high speed can be provided. A display device that includes a transistor having stable electrical characteristics and is highly reliable can be provided. A display device that includes a transistor with low off-state current and has low power consumption can be provided.

The structure of the transistor 200A that can be used in the display device of one embodiment of the present invention is described in detail.

The conductor 205 is provided to have a region overlapping with the metal oxide 230 and the conductor 260. Furthermore, the conductor 205 is preferably provided to be embedded in the insulator 216.

The conductor 205 includes a conductor 205a, a conductor 205b, and a conductor 205c. The conductor 205a is provided in contact with the bottom surface and the side wall of the opening provided in the insulator 216. The conductor 205b is provided to be embedded in a recessed portion formed in the conductor 205a. Here, the top surface of the conductor 205b is lower in level than the top surface of the conductor 205a and the top surface of the insulator 216. The conductor 205c is provided in contact with the top surface of the conductor 205b and the side surfaces of the conductor 205a. Here, the top surface of the conductor 205c is substantially level with the top surface of the conductor 205a and the top surface of the insulator 216. That is, the conductor 205b is surrounded by the conductor 205a and the conductor 205c.

For the conductor 205a and the conductor 205c, it is preferable to use a conductive material having a function of inhibiting diffusion of impurities such as a hydrogen atom, a hydrogen molecule, a water molecule, a nitrogen atom, a nitrogen molecule, a nitrogen oxide molecule (N2O, NO, NO2, or the like), and a copper atom. Alternatively, it is preferable to use a conductive material having a function of inhibiting diffusion of oxygen (e.g., at least one of an oxygen atom and an oxygen molecule).

When the conductor 205a and the conductor 205c are formed with a conductive material having a function of inhibiting diffusion of hydrogen, impurities such as hydrogen contained in the conductor 205b can be inhibited from diffusing into the metal oxide 230 through the insulator 224 and the like. When the conductor 205a and the conductor 205c are formed with a conductive material having a function of inhibiting diffusion of oxygen, the conductivity of the conductor 205b can be inhibited from being lowered because of oxidation. As the conductive material having a function of inhibiting diffusion of oxygen, for example, titanium, titanium nitride, tantalum, tantalum nitride, ruthenium, or ruthenium oxide is preferably used. Thus, the conductor 205a is a single layer or a stack of the above conductive materials. For example, titanium nitride is used for the conductor 205a.

For the conductor 205b, a conductive material containing tungsten, copper, or aluminum as its main component is preferably used. For example, tungsten is used for the conductor 205b.

The conductor 260 sometimes functions as a first gate (also referred to as a top gate) electrode. The conductor 205 sometimes functions as a second gate (also referred to as a bottom gate) electrode. In that case, by changing a potential applied to the conductor 205 not in synchronization with but independently of a potential applied to the conductor 260, $V_{th}$ of the transistor 200A can be controlled. In particular, by applying a negative potential to the conductor 205, $V_{th}$ of the transistor 200A can be higher than 0 V and the off-state current can be made low. Thus, drain current at the time when a potential applied to the conductor 260 is 0 V can be lower in the case where a negative potential is applied to the conductor 205 than in the case where the negative potential is not applied to the conductor 205.

The conductor 205 is preferably provided to be larger than the channel formation region in the metal oxide 230. In particular, it is preferable that the conductor 205 extend beyond an end portion of the metal oxide 230 that intersects with the channel width direction, as illustrated in FIG. 35C. That is, the conductor 205 and the conductor 260 preferably overlap with each other with the insulators therebetween on the outer side of the side surface of the metal oxide 230 in the channel width direction.

With the above structure, the channel formation region of the metal oxide 230 can be electrically surrounded by an electric field of the conductor 260 having a function of the first gate electrode and an electric field of the conductor 205 having a function of the second gate electrode.

As illustrated in FIG. 35C, the conductor 205 extends to function as a wiring as well. However, without limitation to this structure, a structure in which a conductor functioning as a wiring is provided below the conductor 205 may be employed.

The insulator 214 preferably functions as a barrier insulating film that inhibits entry of impurities such as water or hydrogen to the transistor 200A from the substrate side. Accordingly, it is preferable to use, for the insulator 214, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, $NO$, and $NO_2$), and a copper atom (an insulating material through which the impurities are less likely to pass). Alternatively, it is preferable to use an insulating material having a function of inhibiting diffusion of oxygen (e.g., at least one of an oxygen atom and an oxygen molecule) (an insulating material through which the oxygen is less likely to pass).

For example, aluminum oxide, silicon nitride, or the like is preferably used for the insulator 214. Accordingly, it is possible to inhibit diffusion of impurities such as water or hydrogen to the transistor 200A side from the substrate side through the insulator 214. Alternatively, it is possible to inhibit diffusion of oxygen contained in the insulator 224 and the like to the substrate side through the insulator 214.

The permittivity of each of the insulator 216, the insulator 280, and the insulator 281 functioning as an interlayer film is preferably lower than that of the insulator 214. When a material with a low permittivity is used for an interlayer film, the parasitic capacitance generated between wirings can be reduced. For the insulator 216, the insulator 280, and the insulator 281, for example, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like can be used as appropriate.

The insulator 222 and the insulator 224 have a function of a gate insulator.

Here, the insulator 224 in contact with the metal oxide 230 preferably releases oxygen by heating. In this specification, oxygen that is released by heating is referred to as excess oxygen in some cases. For example, silicon oxide, silicon oxynitride, or the like can be used as appropriate for the insulator 224. When an insulator containing oxygen is provided in contact with the metal oxide 230, oxygen vacancies in the metal oxide 230 can be reduced, leading to improved reliability of the transistor 200A.

Specifically, an oxide material that releases part of oxygen by heating is preferably used for the insulator 224. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis preferably falls within the range of 100° C. to 700° C. or 100° C. to 400° C.

As illustrated in FIG. 35C, the insulator 224 is sometimes thinner in a region overlapping with neither the insulator 254 nor the metal oxide 230b than in the other regions. In the insulator 224, the region overlapping with neither the insulator 254 nor the metal oxide 230b preferably has a thickness with which the above oxygen can be adequately diffused.

Like the insulator 214 and the like, the insulator 222 preferably functions as a barrier insulating film that inhibits entry of impurities such as water or hydrogen to the transistor 200A from the substrate side. For example, the insulator 222 preferably has a lower hydrogen permeability than the insulator 224. When the insulator 224, the metal oxide 230, the insulator 250, and the like are surrounded by the insulator 222, the insulator 254, and the insulator 274, entry of impurities such as water or hydrogen into the transistor 200A from the outside can be inhibited.

Furthermore, it is preferable that the insulator 222 have a function of inhibiting diffusion of oxygen (e.g., at least one of an oxygen atom and an oxygen molecule) (it is preferable that the oxygen be less likely to pass through the insulator 222). For example, the insulator 222 preferably has a lower oxygen permeability than the insulator 224. The insulator 222 preferably has a function of inhibiting diffusion of oxygen or impurities, in which case oxygen contained in the metal oxide 230 is less likely to diffuse to the substrate side. Moreover, the conductor 205 can be inhibited from reacting with oxygen contained in the insulator 224 or the metal oxide 230.

As the insulator 222, an insulator containing an oxide of one or both of aluminum and hafnium, which is an insulating material, is preferably used. As the insulator containing an oxide of one or both of aluminum and hafnium, aluminum oxide, hafnium oxide, an oxide containing aluminum and hafnium (hafnium aluminate), or the like is preferably used. In the case where the insulator 222 is formed with such a material, the insulator 222 functions as a layer inhibiting release of oxygen from the metal oxide 230 or entry of impurities such as hydrogen into the metal oxide 230 from the periphery of the transistor 200A.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the above insulators.

The insulator 222 may be a single layer or a stacked layer using an insulator containing what is called a high-k material such as aluminum oxide, hafnium oxide, tantalum oxide, zirconium oxide, lead zirconate titanate (PZT), strontium titanate ($SrTiO_3$), or $(Ba,Sr)TiO_3$ (BST). With further miniaturization and higher integration of transistors, a problem such as leakage current might arise because of a thinned gate insulator. When a high-k material is used for the insulator functioning as a gate insulator, a gate potential at the time of operation of the transistor can be reduced while the physical thickness is maintained.

Note that the insulator 222 and the insulator 224 may each have a stacked-layer structure of two or more layers. In that case, without limitation to a stacked-layer structure formed of the same material, a stacked-layer structure formed of different materials may be employed. For example, an insulator similar to the insulator 224 may be provided below the insulator 222.

The metal oxide 230 includes the metal oxide 230a, the metal oxide 230b over the metal oxide 230a, and the metal oxide 230c over the metal oxide 230b. When the metal oxide 230 includes the metal oxide 230a below the metal oxide 230b, it is possible to inhibit diffusion of impurities into the metal oxide 230b from the components formed below the metal oxide 230a. Moreover, when the metal oxide 230 includes the metal oxide 230c over the metal oxide 230b, it is possible to inhibit diffusion of impurities into the metal oxide 230b from the components formed above the metal oxide 230c.

Note that the metal oxide 230 preferably has a stacked-layer structure of a plurality of oxide layers that differ in the atomic ratio of metal atoms. For example, in the case where the metal oxide 230 contains at least indium (In) and the element M, the proportion of the number of atoms of the element M contained in the metal oxide 230a to the number of atoms of all elements that constitute the metal oxide 230a is preferably higher than the proportion of the number of atoms of the element M contained in the metal oxide 230b to the number of atoms of all elements that constitute the metal oxide 230b. In addition, the atomic ratio of the element M to In in the metal oxide 230a is preferably greater than the atomic ratio of the element M to In in the metal oxide 230b. Here, a metal oxide that can be used as the metal oxide 230a or the metal oxide 230b can be used as the metal oxide 230c.

The energy of the conduction band minimum of each of the metal oxide 230a and the metal oxide 230c is preferably higher than the energy of the conduction band minimum of the metal oxide 230b. In other words, the electron affinity of each of the metal oxide 230a and the metal oxide 230c is preferably smaller than the electron affinity of the metal oxide 230b. In this case, a metal oxide that can be used as the metal oxide 230a is preferably used as the metal oxide 230c. Specifically, the proportion of the number of atoms of the element M contained in the metal oxide 230c to the number of atoms of all elements that constitute the metal oxide 230c is preferably higher than the proportion of the number of atoms of the element M contained in the metal oxide 230b to the number of atoms of all elements that constitute the metal oxide 230b. In addition, the atomic ratio of the element M to In in the metal oxide 230c is preferably greater than the atomic ratio of the element M to In in the metal oxide 230b.

Here, the energy level of the conduction band minimum gently changes at junction portions between the metal oxide 230a, the metal oxide 230b, and the metal oxide 230c. In other words, the energy levels of the conduction band minimum at junction portions between the metal oxide 230a, the metal oxide 230b, and the metal oxide 230c continuously vary or are continuously connected. This can be achieved by decreasing the densities of defect states in mixed layers formed at the interface between the metal oxide 230a and the metal oxide 230b and the interface between the metal oxide 230b and the metal oxide 230c.

Specifically, when the metal oxide 230a and the metal oxide 230b or the metal oxide 230b and the metal oxide 230c contain the same element (as a main component) in addition to oxygen, a mixed layer with a low density of defect states can be formed. For example, an In—Ga—Zn oxide, a Ga—Zn oxide, gallium oxide, or the like may be used as the metal oxide 230a and the metal oxide 230c, in the case where the metal oxide 230b is an In—Ga—Zn oxide. The metal oxide 230c may have a stacked-layer structure. For example, a stacked-layer structure of an In—Ga—Zn oxide and a Ga—Zn oxide over the In—Ga—Zn oxide or a stacked-layer structure of an In—Ga—Zn oxide and gallium oxide over the In—Ga—Zn oxide can be employed. In other words, the metal oxide 230c may have a stacked-layer structure of an In—Ga—Zn oxide and an oxide that does not contain In.

Specifically, as the metal oxide 230a, a metal oxide with In:Ga:Zn=1:3:4 [atomic ratio] or 1:1:0.5 [atomic ratio] can be used. As the metal oxide 230b, a metal oxide with In:Ga:Zn=4:2:3 [atomic ratio] or 3:1:2 [atomic ratio] can be used. As the metal oxide 230c, a metal oxide with In:Ga:Zn=1:3:4 [atomic ratio], In:Ga:Zn=4:2:3 [atomic ratio], Ga:Zn=2:1 [atomic ratio], or Ga:Zn=2:5 [atomic ratio] can be used. Specific examples of a stacked-layer structure of the metal oxide 230c include a stacked-layer structure of a layer with In:Ga:Zn=4:2:3 [atomic ratio] and a layer with Ga:Zn=2:1 [atomic ratio], a stacked-layer structure of a layer with In:Ga:Zn=4:2:3 [atomic ratio] and a layer with Ga:Zn=2:5 [atomic ratio], and a stacked-layer structure of a layer with In:Ga:Zn=4:2:3 [atomic ratio] and a layer of gallium oxide.

At this time, the metal oxide 230b serves as a main carrier path. When the metal oxide 230a and the metal oxide 230c have the above structure, the densities of defect states at the interface between the metal oxide 230a and the metal oxide 230b and the interface between the metal oxide 230b and the metal oxide 230c can be made low. This reduces the influence of interface scattering on carrier conduction, and the transistor 200A can have high on-state current and high frequency characteristics. Note that in the case where the metal oxide 230c has a stacked-layer structure, not only the effect of reducing the density of defect states at the interface between the metal oxide 230b and the metal oxide 230c, but also the effect of inhibiting diffusion of the constituent element contained in the metal oxide 230c to the insulator 250 side can be expected. Specifically, the metal oxide 230c has a stacked-layer structure in which the upper layer is an oxide that does not contain In, whereby the diffusion of In to the insulator 250 side can be inhibited. Since the insulator 250 functions as a gate insulator, the transistor has defects in characteristics when In diffuses. Thus, the metal oxide 230c having a stacked-layer structure allows a highly reliable display device to be provided.

The conductor 242 (the conductor 242a and the conductor 242b) functioning as the source electrode and the drain electrode is provided over the metal oxide 230b. For the conductor 242, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen.

When the conductor 242 is provided in contact with the metal oxide 230, the oxygen concentration of the metal oxide 230 in the vicinity of the conductor 242 sometimes decreases. In addition, a metal compound layer that contains the metal contained in the conductor 242 and the component of the metal oxide 230 is sometimes formed in the metal oxide 230 in the vicinity of the conductor 242. In such cases, the carrier density of the region in the metal oxide 230 in the vicinity of the conductor 242 increases, and the region becomes a low-resistance region.

Here, the region between the conductor 242a and the conductor 242b is formed to overlap with the opening of the insulator 280. Accordingly, the conductor 260 can be provided in a self-aligned manner between the conductor 242a and the conductor 242b.

The insulator 250 functions as a gate insulator. The insulator 250 is preferably provided in contact with the top surface of the metal oxide 230c. For the insulator 250, silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride, which are thermally stable, are preferable.

As in the insulator 224, the concentration of impurities such as water or hydrogen in the insulator 250 is preferably reduced. The thickness of the insulator 250 is preferably greater than or equal to 1 nm and less than or equal to 20 nm.

A metal oxide may be provided between the insulator 250 and the conductor 260. The metal oxide preferably inhibits oxygen diffusion from the insulator 250 into the conductor 260. Accordingly, oxidation of the conductor 260 due to oxygen in the insulator 250 can be inhibited. The metal oxide functions as part of the gate insulator in some cases. Therefore, when silicon oxide, silicon oxynitride, or the like is used for the insulator 250, a metal oxide that is a high-k material with a high dielectric constant is preferably used as the metal oxide. When the gate insulator has a stacked-layer structure of the insulator 250 and the metal oxide, the stacked-layer structure can be thermally stable and have a high dielectric constant. Accordingly, a gate potential applied during operation of the transistor can be lowered while the physical thickness of the gate insulator is maintained. In addition, the equivalent oxide thickness (EOT) of the insulator functioning as the gate insulator can be reduced.

Specifically, a metal oxide containing one kind or two or more kinds selected from hafnium, aluminum, gallium, yttrium, zirconium, tungsten, titanium, tantalum, nickel, germanium, magnesium, and the like can be used. It is particularly preferable to use an insulator containing an oxide of one or both of aluminum and hafnium, such as aluminum oxide, hafnium oxide, or an oxide containing aluminum and hafnium (hafnium aluminate).

Although the conductor 260 is illustrated to have a two-layer structure in FIG. 35, the conductor 260 may have a single-layer structure or a stacked-layer structure of three or more layers.

As the conductor 260a, the aforementioned conductor having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom is preferably used. Alternatively, it is preferable to use a conductive material having a function of inhibiting diffusion of oxygen (e.g., at least one of an oxygen atom and an oxygen molecule).

When the conductor 260a has a function of inhibiting diffusion of oxygen, it is possible to inhibit reduction of the conductivity due to oxidation of the conductor 260b by oxygen contained in the insulator 250. As a conductive material having a function of inhibiting oxygen diffusion, for example, tantalum, tantalum nitride, ruthenium, ruthenium oxide, or the like is preferably used.

A conductive material containing tungsten, copper, or aluminum as its main component is preferably used for the conductor 260b. The conductor 260 also functions as a wiring; thus, a conductor having high conductivity is preferably used. For example, a conductive material containing tungsten, copper, or aluminum as its main component can be used. The conductor 260b may have a stacked-layer structure, for example, a stacked-layer structure of titanium or titanium nitride and the above conductive material.

As illustrated in FIG. 35A and FIG. 35C, the side surface of the metal oxide 230 is covered with the conductor 260 in a region where the metal oxide 230b does not overlap with the conductor 242, that is, the channel formation region of the metal oxide 230. Accordingly, an electric field of the conductor 260 having a function of the first gate electrode is likely to act on the side surface of the metal oxide 230. Thus, the on-state current of the transistor 200A can be increased and the frequency characteristics can be improved.

The insulator 254, like the insulator 214 and the like, preferably functions as a barrier insulating film that inhibits entry of impurities such as water or hydrogen into the transistor 200A from the insulator 280 side. The insulator 254 preferably has a lower hydrogen permeability than the insulator 224, for example. Furthermore, as illustrated in FIG. 35B and FIG. 35C, the insulator 254 is preferably in contact with the side surface of the metal oxide 230c, the top surface and the side surface of the conductor 242a, the top surface and the side surface of the conductor 242b, the side surfaces of the metal oxide 230a and the metal oxide 230b, and the top surface of the insulator 224. Such a structure can inhibit entry of hydrogen contained in the insulator 280 into the metal oxide 230 through the top surfaces or side surfaces of the conductor 242a, the conductor 242b, the metal oxide 230a, the metal oxide 230b, and the insulator 224.

Furthermore, it is preferable that the insulator 254 have a function of inhibiting diffusion of oxygen (e.g., at least one of an oxygen atom and an oxygen molecule) (it is preferable that the oxygen be less likely to pass through the insulator 254). For example, the insulator 254 preferably has a lower oxygen permeability than the insulator 280 or the insulator 224.

The insulator 254 is preferably formed by a sputtering method. When the insulator 254 is formed by a sputtering method in an oxygen-containing atmosphere, oxygen can be added to the vicinity of a region of the insulator 224 that is in contact with the insulator 254. Thus, oxygen can be supplied from the region to the metal oxide 230 through the insulator 224. Here, with the insulator 254 having a function of inhibiting upward diffusion of oxygen, oxygen can be prevented from diffusing from the metal oxide 230 into the insulator 280. Moreover, with the insulator 222 having a function of inhibiting downward diffusion of oxygen, oxygen can be prevented from diffusing from the metal oxide 230 to the substrate side. In the above manner, oxygen is supplied to the channel formation region of the metal oxide 230. Accordingly, oxygen vacancies in the metal oxide 230 can be reduced, so that the transistor can be inhibited from having normally-on characteristics.

As the insulator 254, an insulator containing an oxide of one or both of aluminum and hafnium is preferably formed, for example. Note that for the insulator containing an oxide of one or both of aluminum and hafnium, aluminum oxide, hafnium oxide, an oxide containing aluminum and hafnium (hafnium aluminate), or the like is preferably used.

The insulator 224, the insulator 250, and the metal oxide 230 are covered with the insulator 254 having a barrier property against hydrogen, whereby the insulator 280 is separated from the insulator 224, the metal oxide 230, and the insulator 250 by the insulator 254. This can inhibit entry of impurities such as hydrogen from the outside of the transistor 200A, resulting in favorable electrical characteristics and high reliability of the transistor 200A.

The insulator 280 is provided over the insulator 224, the metal oxide 230, and the conductor 242 with the insulator 254 therebetween. The insulator 280 preferably includes, for example, silicon oxide, silicon oxynitride, silicon nitride oxide, silicon oxide to which fluorine is added, silicon oxide to which carbon is added, silicon oxide to which carbon and nitrogen are added, or porous silicon oxide. In particular, silicon oxide and silicon oxynitride are preferable because they are thermally stable. In particular, materials such as silicon oxide, silicon oxynitride, and porous silicon oxide are preferably used, in which case a region containing oxygen to be released by heating can be easily formed.

The concentration of impurities such as water or hydrogen in the insulator 280 is preferably reduced. In addition, the top surface of the insulator 280 may be planarized.

Like the insulator 214 and the like, the insulator 274 preferably functions as a barrier insulating film that inhibits entry of impurities such as water or hydrogen into the insulator 280 from the above. As the insulator 274, for example, the insulator that can be used as the insulator 214, the insulator 254, and the like can be used.

The insulator 281 functioning as an interlayer film is preferably provided over the insulator 274. As in the insulator 224 and the like, the concentration of impurities such as water or hydrogen in the film of the insulator 281 is preferably reduced.

The conductor 240a and the conductor 240b are provided in openings formed in the insulator 281, the insulator 274, the insulator 280, and the insulator 254. The conductor 240a and the conductor 240b are placed to face each other with the conductor 260 therebetween. Note that the top surfaces of the conductor 240a and the conductor 240b may be on the same plane as the top surface of the insulator 281.

The insulator 241a is provided in contact with the inner wall of the opening in the insulator 281, the insulator 274, the insulator 280, and the insulator 254, and the first conductor of the conductor 240a is formed in contact with the side surface of the insulator 241a. The conductor 242a is positioned on at least part of the bottom portion of the opening, and the conductor 240a is in contact with the conductor 242a. Similarly, the insulator 241b is provided in contact with the inner wall of the opening in the insulator 281, the insulator 274, the insulator 280, and the insulator 254, and the first conductor of the conductor 240b is formed in contact with the side surface of the insulator 241b. The conductor 242b is positioned on at least part of the bottom portion of the opening, and the conductor 240b is in contact with the conductor 242b.

For the conductor 240a and the conductor 240b, a conductive material containing tungsten, copper, or aluminum as its main component is preferably used. The conductor 240a and the conductor 240b may each have a stacked-layer structure.

In the case where the conductor 240 has a stacked-layer structure, the aforementioned conductor having a function of inhibiting diffusion of impurities such as water or hydrogen is preferably used as the conductor in contact with the metal oxide 230a, the metal oxide 230b, the conductor 242, the insulator 254, the insulator 280, the insulator 274, and the insulator 281. For example, tantalum, tantalum nitride, titanium, titanium nitride, ruthenium, ruthenium oxide, or the like is preferably used. The conductive material having a function of inhibiting diffusion of impurities such as water or hydrogen can be used as a single layer or stacked layers. The use of the conductive material can inhibit oxygen added to the insulator 280 from being absorbed by the conductor 240a and the conductor 240b. Moreover, impurities such as water or hydrogen can be inhibited from entering the metal oxide 230 through the conductor 240a and the conductor 240b from a layer above the insulator 281.

As the insulator 241a and the insulator 241b, for example, the insulator that can be used as the insulator 254 and the like may be used. Since the insulator 241a and the insulator 241b are provided in contact with the insulator 254, impurities such as water or hydrogen in the insulator 280 or the like can be inhibited from entering the metal oxide 230 through the conductor 240a and the conductor 240b. Furthermore, oxygen contained in the insulator 280 can be inhibited from being absorbed by the conductor 240a and the conductor 240b.

Although not illustrated, a conductor functioning as a wiring may be provided in contact with the top surface of the conductor 240a and the top surface of the conductor 240b. For the conductor functioning as a wiring, a conductive material containing tungsten, copper, or aluminum as its main component is preferably used. Furthermore, the conductor may have a stacked-layer structure and may be a stack of titanium or titanium nitride and the above conductive material, for example. The conductor may be formed to be embedded in an opening provided in an insulator.

<Materials for Transistor>

Materials that can be used for the transistor will be described.

[Substrate]

Examples of a substrate where the transistor 200A is formed include an insulator substrate, a semiconductor substrate, and a conductor substrate. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate of silicon, germanium, or the like and a compound semiconductor substrate of silicon carbide, silicon germanium, gallium arsenide, indium phosphide, zinc oxide, or gallium oxide. Another example is a semiconductor substrate in which an insulator region is included in the semiconductor substrate, e.g., an SOI (Silicon On Insulator) substrate. Examples of the conductor substrate include a graphite substrate, a metal substrate, an alloy substrate, and a conductive resin substrate. Other examples include a substrate including a metal nitride and a substrate including a metal oxide. Other examples include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the elements provided for the substrates include a capacitor, a resistor, a switching element, a light-emitting element, and a memory element.

[Insulator]

Examples of an insulator include an oxide, a nitride, an oxynitride, a nitride oxide, a metal oxide, a metal oxynitride, and a metal nitride oxide, each of which has an insulating property.

With further miniaturization and higher integration of transistors, for example, a problem such as leakage current may arise because of a thinned gate insulator. When a high-k material is used for the insulator functioning as a gate insulator, the voltage at the time of operation of the transistor can be reduced while the physical thickness is maintained. In contrast, when a material with a low dielectric constant is used for the insulator functioning as an interlayer film, parasitic capacitance generated between wirings can be reduced. Thus, a material is preferably selected depending on the function of an insulator.

Examples of the insulator having a high dielectric constant include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having a low dielectric constant include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor including an oxide semiconductor is surrounded by insulators having a function of inhibiting passage of oxygen and impurities such as hydrogen (e.g., the insulator 214, the insulator 222, the insulator 254, and the insulator 274), the electrical characteristics of the transistor can be stable. An insulator having a function of inhibiting passage of oxygen and impurities such as hydrogen can be formed to have a single layer or a stacked layer including an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Specifically, for the insulator having a function of inhibiting passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide or a metal nitride such as aluminum nitride, aluminum titanium nitride, titanium nitride, silicon nitride oxide, or silicon nitride can be used.

An insulator functioning as a gate insulator is preferably an insulator including a region containing oxygen to be released by heating. For example, when a structure is employed in which silicon oxide or silicon oxynitride that includes a region containing oxygen to be released by heating is provided in contact with the metal oxide 230, oxygen vacancies in the metal oxide 230 can be filled.

[Conductor]

For a conductor, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. A semiconductor having high electrical conductivity, typified by polycrystalline silicon containing an impurity element such as phosphorus, or silicide such as nickel silicide may be used.

A plurality of conductors formed with any of the above materials may be stacked. For example, a stacked-layer structure combining a material containing the above metal element and a conductive material containing oxygen may be employed. In addition, a stacked-layer structure combining a material containing the above metal element and a conductive material containing nitrogen may be employed. Furthermore, a stacked-layer structure combining a material containing the above metal element, a conductive material containing oxygen, and a conductive material containing nitrogen may be employed.

In the case where a metal oxide is used for the channel formation region of the transistor, the conductor functioning as the gate electrode preferably employs a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in the metal oxide where the channel is formed. A conductive material containing the above metal element and nitrogen may be used. For example, a conductive material containing nitrogen such as titanium nitride or tantalum nitride may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used. With the use of such a material, hydrogen contained in the metal oxide where the channel is formed can be captured in some cases. Alternatively, hydrogen entering from an external insulator or the like can be captured in some cases.

<Structure Example of Light-Emitting Element 70>

Figure 36A:
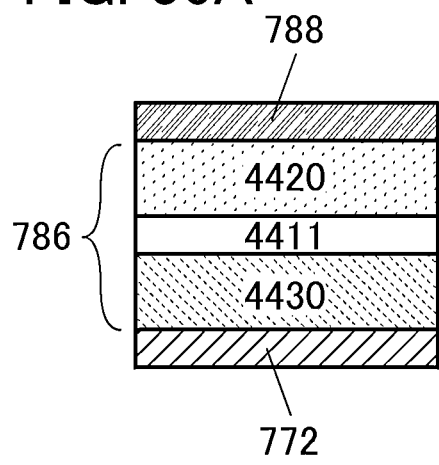
FIG. 36A to FIG. 36C are diagrams illustrating structure examples of a display device.

The EL layer 786 included in the light-emitting element 70 can be formed with a plurality of layers such as a layer 4420, a light-emitting layer 4411, and a layer 4430, as shown in FIG. 36A. The layer 4420 can include, for example, a layer containing a substance with a high electron-injection property (an electron-injection layer) and a layer containing a substance with a high electron-transport property (an electron-transport layer). The light-emitting layer 4411 contains a light-emitting compound, for example. The layer 4430 can include, for example, a layer containing a substance with a high hole-injection property (a hole-injection layer) and a layer containing a substance with a high hole-transport property (a hole-transport layer).

A structure including the layer 4420, the light-emitting layer 4411, and the layer 4430, which are provided between a pair of electrodes, can serve as a single light-emitting unit, and the structure in FIG. 36A is referred to as a single structure in this specification.

Figure 36B:
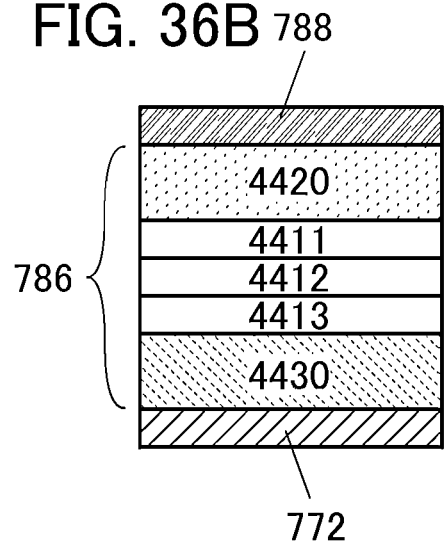

Note that a structure in which a plurality of light-emitting layers (light-emitting layers 4411, 4412, and 4413) are provided between the layer 4420 and the layer 4430 as shown in FIG. 36B is another variation of the single structure.

Figure 36C:
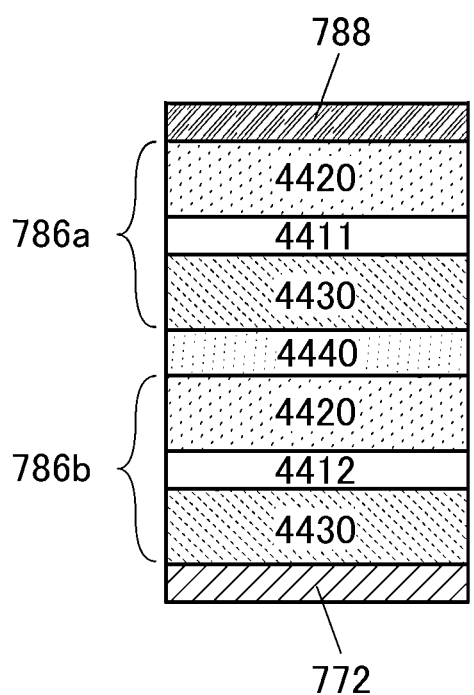

A structure in which a plurality of light-emitting units (EL layers 786a and 786b) are connected in series with an intermediate layer (charge-generation layer) 4440 therebetween as shown in FIG. 36C is referred to as a tandem structure in this specification. In this specification and the like, the structure shown in FIG. 36C is referred to as a tandem structure; however, without being limited to this, a tandem structure may be referred to as a stack structure, for example. The tandem structure enables a light-emitting element to emit light with high luminance.

The emission color of the light-emitting element 70 can be red, green, blue, cyan, magenta, yellow, white, or the like depending on the material that forms the EL layer 786. Furthermore, the color purity can be further increased when the light-emitting element 70 has a microcavity structure.

The light-emitting element that emits white light preferably contains two or more kinds of light-emitting substances in the light-emitting layer. To obtain white light emission, two or more kinds of light-emitting substances are selected such that their emission colors are complementary.

The light-emitting layer preferably contains two or more of light-emitting substances that emit light of R (red), G (green), B (blue), Y (yellow), O (orange), and the like. Alternatively, the light-emitting layer preferably contains two or more of light-emitting substances that emit light containing two or more of spectral components of R, G, and B.

<Formation Method of Light-Emitting Element 70>

A formation method of the light-emitting element 70 provided over the pixel circuit 62 is described below.

Figure 37A:
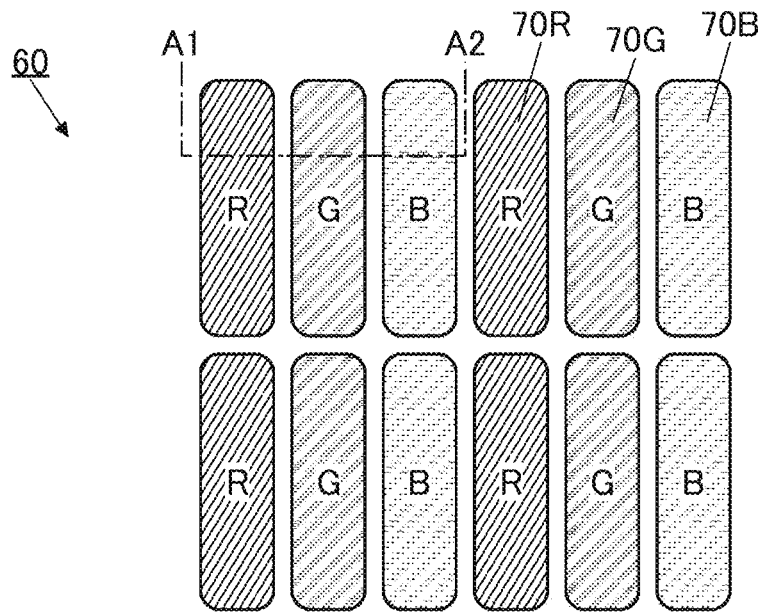
FIG. 37A to FIG. 37C are diagrams illustrating structure examples of display devices.

FIG. 37A illustrates a schematic top view of the light-emitting element 70 of one embodiment of the present invention. The light-emitting element 70 includes a plurality of light-emitting elements 70R emitting red light, a plurality of light-emitting elements 70G emitting green light, and a plurality of light-emitting elements 70B emitting blue light. In FIG. 37A, light-emitting regions of the light-emitting elements are denoted by R, G, and B to easily differentiate the light-emitting elements. Note that the structure of the light-emitting element 70 illustrated in FIG. 37A may be referred to as an SBS (Side By Side) structure. Although the structure illustrated in FIG. 37A has three colors of red (R), green (G), and blue (B), one embodiment of the present invention is not limited thereto. For example, the structure may have four or more colors.

The light-emitting elements 70R, the light-emitting elements 70G, and the light-emitting elements 70B are arranged in a matrix. FIG. 37A illustrates what is called a stripe arrangement, in which the light-emitting elements of the same color are arranged in one direction. Note that the arrangement method of the light-emitting elements is not limited thereto; another arrangement method such as a delta arrangement, a zigzag arrangement, or a PenTile arrangement may also be used.

As the light-emitting elements 70R, the light-emitting elements 70G, and the light-emitting elements 70B, an organic EL device such as an OLED (Organic Light Emitting Diode) or a QLED (Quantum-dot Light Emitting Diode) is preferably used. Examples of light-emitting substances contained in the EL element include a substance that emits fluorescent light (a fluorescent material), a substance that emits phosphorescent light (a phosphorescent material), an inorganic compound (e.g., a quantum dot material), a substance that exhibits thermally activated delayed fluorescence (a thermally activated delayed fluorescent (TADF) material). Note that as a TADF material, a material that is in a thermal equilibrium state between a singlet excited state and a triplet excited state may be used. Since such a TADF material enables a short emission lifetime (excitation lifetime), an efficiency decrease of a light-emitting element in a high-luminance region can be inhibited.

Figure 37B:
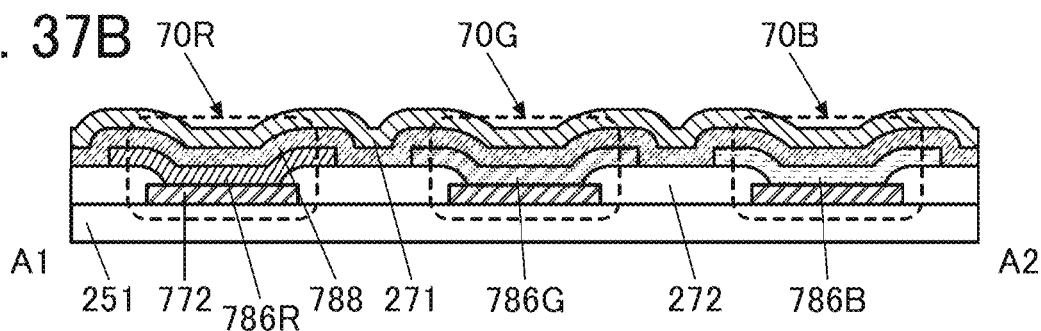

FIG. 37B is a cross-sectional schematic view taken along dashed-dotted line A1-A2 in FIG. 37A.

FIG. 37B shows a cross section of the light-emitting element 70R, the light-emitting element 70G, and the light-emitting element 70B. The light-emitting element 70R, the light-emitting element 70G, and the light-emitting element 70B are provided over a substrate 251 and each include the conductor 772 functioning as a pixel electrode and the conductor 788 functioning as a common electrode.

The light-emitting element 70R includes an EL layer 786R between the conductor 772 functioning as a pixel electrode and the conductor 788 functioning as a common electrode. The EL layer 786R contains a light-emitting organic compound that emits light which has a peak at least in a red wavelength range. An EL layer 786G included in the light-emitting element 70G contains a light-emitting organic compound that emits light which has a peak at least in a green wavelength range. An EL layer 786B included in the light-emitting element 70B contains a light-emitting organic compound that emits light which has a peak at least in a blue wavelength range.

The EL layer 786R, the EL layer 786G, and the EL layer 786B may each include one or more of an electron-injection layer, an electron-transport layer, a hole-injection layer, and a hole-transport layer in addition to the layer containing a light-emitting organic compound (the light-emitting layer).

The conductor 772 functioning as a pixel electrode is provided for each of the light-emitting elements. The conductor 788 functioning as a common electrode is provided as a continuous layer shared by the light-emitting elements. A conductive film that transmits visible light is used for either the conductor 772 functioning as a pixel electrode or the conductor 788 functioning as a common electrode, and a reflective conductive film is used for the other. When the conductor 772 functioning as a pixel electrode has a light-transmitting property and the conductor 788 functioning as a common electrode has a reflective property, a bottom-emission display device can be obtained, whereas when the conductor 772 functioning as a pixel electrode has a reflective property and the conductor 788 functioning as a common electrode has a light-transmitting property, a top-emission display device can be obtained. Note that when both the conductor 772 functioning as a pixel electrode and the conductor 788 functioning as a common electrode have a light-transmitting property, a dual-emission display device can be obtained.

An insulating layer 272 is provided to cover end portions of the conductor 772 functioning as a pixel electrode. End portions of the insulating layer 272 are preferably tapered.

The EL layer 786R, the EL layer 786G, and the EL layer 786B each include a region in contact with the top surface of the conductor 772 functioning as a pixel electrode and a region in contact with the surface of the insulating layer 272. End portions of the EL layer 786R, the EL layer 786G, and the EL layer 786B are positioned over the insulating layer 272.

As illustrated in FIG. 37B, there is a gap between the two EL layers of the light-emitting elements with different colors. In this manner, the EL layer 786R, the EL layer 786G, and the EL layer 786G are preferably provided so as not to be in contact with each other. This suitably prevents unintentional light emission (also referred to as crosstalk) from being caused by current flowing through two adjacent EL layers. As a result, the contrast can be increased to achieve a display device with high display quality.

The EL layer 786R, the EL layer 786G, and the EL layer 786G can be formed separately by a vacuum evaporation method or the like using a shadow mask such as a metal mask. Alternatively, these layers may be formed separately by a photolithography method. The use of the photolithography method achieves a display device with high resolution, which is difficult to obtain in the case of using a metal mask.

A protective layer 271 is provided over the conductor 788 functioning as a common electrode so as to cover the light-emitting element 70R, the light-emitting element 70G, and the light-emitting element 70B. The protective layer 271 has a function of preventing diffusion of impurities such as water into each light-emitting element from above.

The protective layer 271 can have, for example, a single-layer structure or a stacked-layer structure at least including an inorganic insulating film. Examples of the inorganic insulating film include an oxide film or a nitride film such as a silicon oxide film, a silicon oxynitride film, a silicon nitride oxide film, a silicon nitride film, an aluminum oxide film, an aluminum oxynitride film, or a hafnium oxide film. Alternatively, a semiconductor material such as indium gallium oxide or indium gallium zinc oxide may be used for the protective layer 271. The protective layer 271 may be formed by an ALD method, a CVD method, or a sputtering method. Although the protective layer 271 which has a structure including an inorganic insulating film is illustrated as an example, one embodiment of the present invention is not limited thereto. For example, the protective layer 271 may have a stacked-layer structure of an inorganic insulating film and an organic insulating film.

Figure 37C:
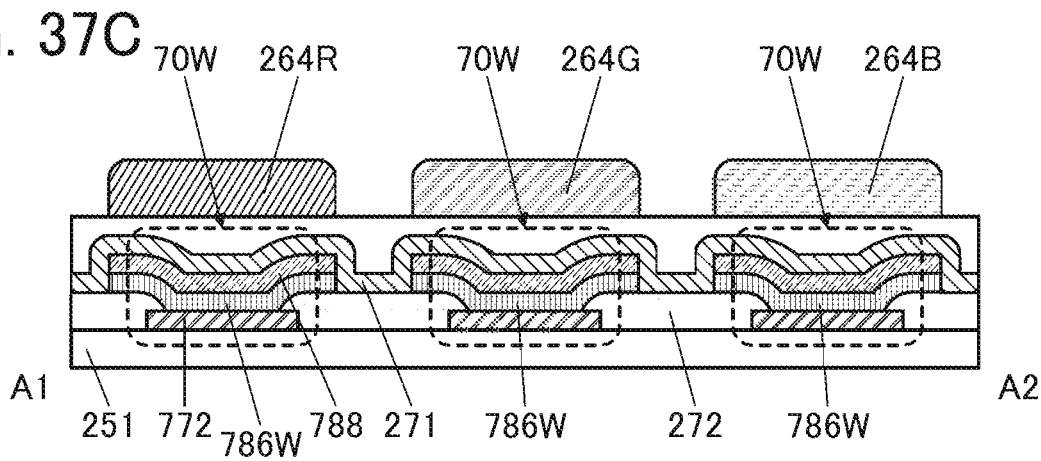

FIG. 37C illustrates an example different from the above.

In FIG. 37C, a light-emitting element 70W emitting white light is provided. The light-emitting element 70W includes an EL layer 786W emitting white light between a pixel electrode and the conductor 788 functioning as a common electrode.

The EL layer 786W can have, for example, a structure in which two or more light-emitting layers that are selected so as to emit light of complementary colors are stacked. It is also possible to use a stacked EL layer in which a charge-generation layer is provided between light-emitting layers.

FIG. 37C illustrates three light-emitting elements 70W side by side. A coloring layer 264R is provided above the left light-emitting element 70W. The coloring layer 264R functions as a band path filter transmitting red light. Similarly, a coloring layer 264G transmitting green light is provided above the middle light-emitting element 70W, and a coloring layer 264B transmitting blue light is provided above the right light-emitting element 70W. Hence, the display device can display an image with colors.

In the two adjacent light-emitting elements 70W, the EL layer 786W and the conductor 788 functioning as a common electrode are isolated from the adjacent EL layer 786W and the adjacent conductor 788. This favorably prevents unintentional light emission from being caused by current flowing through the EL layers 786W of the two adjacent light-emitting elements 70W. Particularly when the EL layer 786W is a stacked EL element in which a charge-generation layer is provided between two light-emitting layers, crosstalk is more significant as the resolution increases, i.e., as the distance between adjacent pixels decreases, leading to lower contrast. Thus, the above structure can achieve a display device having both high resolution and high contrast.

The EL layer 786W and the conductor 788 functioning as a common electrode are preferably isolated by a photolithography method. This can reduce the distance between light-emitting elements, achieving a display device with a higher aperture ratio than that formed with, for example, a shadow mask such as a metal mask.

Note that in the case of a bottom-emission light-emitting element, a coloring layer may be provided between the conductor 772 functioning as a pixel electrode and the substrate 251.

Figure 38A:
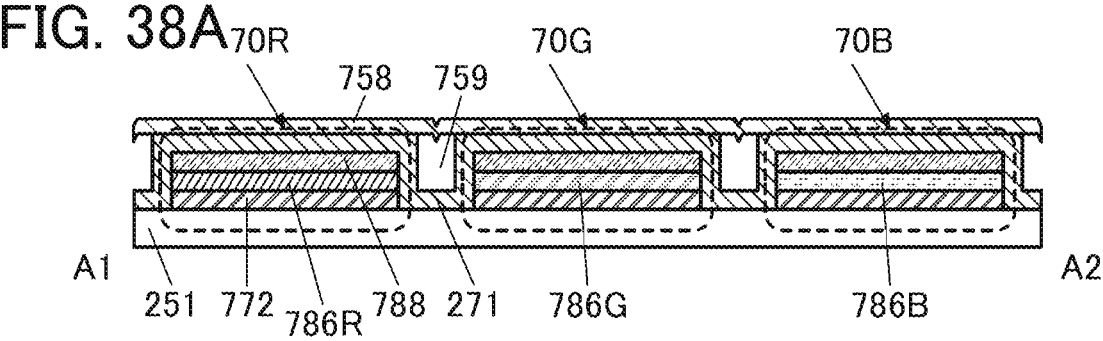
FIG. 38A to FIG. 38C are diagrams illustrating structure examples of display devices.

FIG. 38A illustrates an example different from the above. Specifically, in FIG. 38A, the insulating layers 272 are not provided between the light-emitting element 70R, the light-emitting element 70G, and the light-emitting element 70B. With such a structure, the display device can have a high aperture ratio. Furthermore, the protective layer 271 covers the side surfaces of the light-emitting element 70R, the light-emitting element 70G, and the light-emitting element 70B. With such a structure, impurities (typically, water or the like) can be inhibited from entering the light-emitting element 70R, the light-emitting element 70G, and the light-emitting element 70B through their side surfaces. In the structure illustrated in FIG. 38A, the top shapes of the conductor 772, the EL layer 786R, and the conductor 788 agree approximately with one another. This structure can be formed in such a manner that the conductor 772, the EL layer 786R, and the conductor 788 are formed and collectively processed using a resist mask or the like. In this process, the EL layer 786R and the conductor 788 are processed using the conductor 788 as a mask, and thus this process can be called self-alignment patterning. Note that although the light-emitting element 70R is described here, the light-emitting element 70G and the light-emitting element 70B can have the same structure.

In FIG. 38A, a protective layer 758 is further provided over the protective layer 271. For example, the protective layer 271 is formed with an apparatus that can form a film with excellent coverage (typically, an ALD apparatus or the like), and the protective layer 758 is formed with an apparatus that can form a film with coverage inferior to that of the protective layer 271 (typically, a sputtering apparatus or the like), whereby a region 759 can be provided between the protective layer 271 and the protective layer 758. In other words, the regions 759 are positioned between the light-emitting element 70R and the light-emitting element 70G and between the light-emitting element 70G and the light-emitting element 70B.

Note that the region 759 includes, for example, one or more selected from air, nitrogen, oxygen, carbon dioxide, and Group 18 elements (typically, helium, neon, argon, xenon, and krypton). Furthermore, for example, a gas used during the deposition of the protective layer 758 is sometimes included in the region 759. For example, in the case where the protective layer 758 is deposited by a sputtering method, one or more of the above-described Group 18 elements may be included in the region 759. In the case where a gas is included in the region 759, the gas can be identified with a gas chromatography method or the like, for example. Alternatively, in the case where the protective layer 758 is deposited by a sputtering method, a gas used in the sputtering is sometimes included in the protective layer 758. In this case, an element such as argon is sometimes detected when the protective layer 758 is analyzed by an energy dispersive X-ray analysis (EDX analysis) or the like.

In the case where the refractive index of the region 759 is lower than the refractive index of the protective layer 271, light emitted from the light-emitting element 70R, the light-emitting element 70G, or the light-emitting element 70B is reflected at an interface between the protective layer 271 and the region 759. Hence, light emitted from the light-emitting element 70R, the light-emitting element 70G, or the light-emitting element 70B can be inhibited from entering an adjacent pixel. Thus, mixture of light of different colors can be inhibited, so that the image quality of the display device can be improved.

In the case of the structure illustrated in FIG. 38A, a region between the light-emitting element 70R and the light-emitting element 70G or a region between the light-emitting element and the light-emitting element 70B (hereinafter simply referred to as a distance between the light-emitting elements) can be shortened. Specifically, the distance between the light-emitting elements can be less than or equal to 1 µm, preferably less than or equal to 500 nm, further preferably less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or 10 nm. In other words, the display device includes a region in which an interval between the side surface of the light-emitting element 70R and the side surface of the light-emitting element 70G or an interval between the side surface of the light-emitting element 70G and the side surface of the light-emitting element 70B is less than or equal to 1 µm, preferably less than or equal to 0.5 µm (500 nm), further preferably less than or equal to 100 nm.

In the case where the region 759 includes air, for example, the light-emitting elements can be isolated from each other and color mixture of light from the light-emitting elements, crosstalk, or the like can be inhibited.

The region 759 may include an insulating layer or the like including an organic material. The region 759 may be filled with, for example, an acrylic resin, a polyimide resin, an epoxy resin, an imide resin, a polyamide resin, a polyimide-amide resin, a silicone resin, a siloxane resin, a benzocyclobutene-based resin, a phenol resin, precursors of these resins, or the like. The region 759 may be filled with a photosensitive resin. A photoresist may be used for the photosensitive resin. As the photosensitive resin, a positive photosensitive material or a negative photosensitive material can be used.

The region 759 may include an insulating layer or the like including an inorganic material. As the inorganic material, an inorganic insulating film such as an oxide insulating film, a nitride insulating film, an oxynitride insulating film, or a nitride oxide insulating film can be used, for example. The above inorganic insulating film can have either a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film.

The region 759 preferably includes both of the above inorganic material and organic material. Examples of a structure of the region 759 include a stacked-layer structure of an aluminum oxide film and a photoresist on the aluminum oxide film.

Figure 38B:
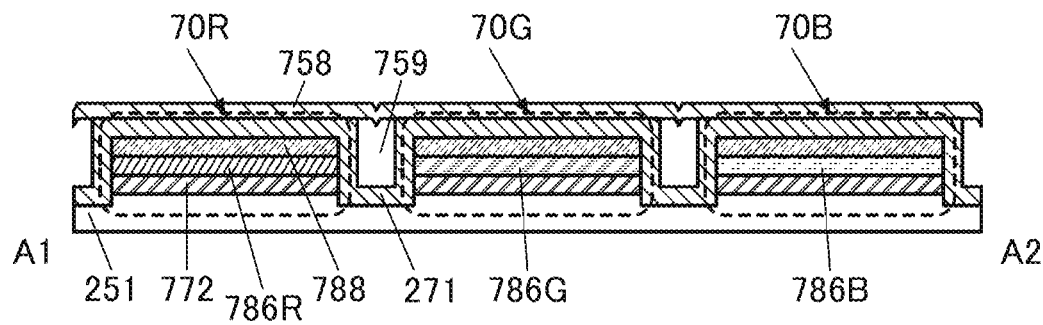

FIG. 38B illustrates an example different from the above. Specifically, the structure illustrated in FIG. 38B is different from the structure illustrated in FIG. 38A in the structure of the substrate 251. The substrate 251 has a recessed portion in its top surface that is formed by being partially etched when the light-emitting element 70R, the light-emitting element 70G, and the light-emitting element 70B are processed. In addition, the protective layer 271 is formed in the recessed portion. In other words, in the cross-sectional view, a region is provided, in which the bottom surface of the protective layer 271 is positioned below the bottom surface of the conductor 772. With such a region, impurities (typically, water or the like) can be suitably inhibited from entering the light-emitting element 70R, the light-emitting element 70G, and the light-emitting element 70B from the bottom. It is likely that the depressed portion can be formed when impurities (also referred to as residue) that could be attached to the side surfaces of the light-emitting element 70R, the light-emitting element 70G, and the light-emitting element 70B in processing of the light-emitting elements are removed by wet etching or the like. After the residue is removed, the side surfaces of the light-emitting elements are covered with the protective layer 271, whereby a highly reliable display device can be provided.

Figure 38C:
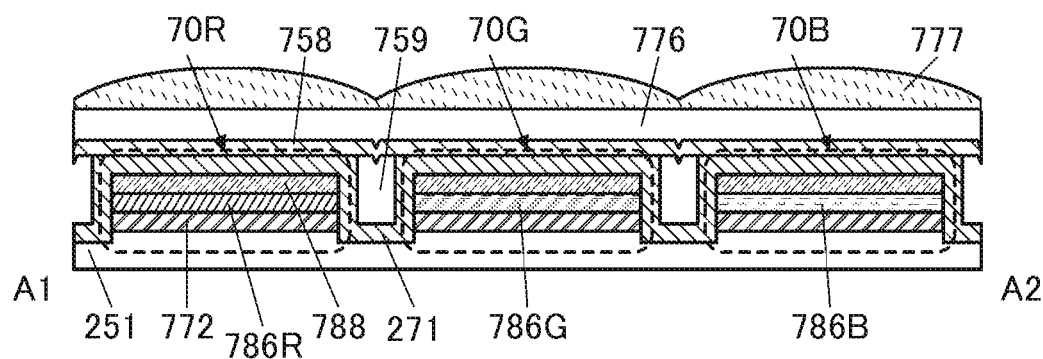

FIG. 38C illustrates an example different from the above. Specifically, the structure illustrated in FIG. 38C includes an insulating layer 776 and a microlens array 777 in addition to the components illustrated in FIG. 38B. The insulating layer 776 has a function of an adhesive layer. Note that when the refractive index of the insulating layer 776 is lower than the refractive index of the microlens array 777, the microlens array 777 can condense light emitted from the light-emitting element 70R, the light-emitting element 70G, and the light-emitting element 70B. This can increase the light extraction efficiency of the display device. This is particularly suitable when a user sees the display surface from the front of the display device because the user can see bright images. As the insulating layer 776, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with a low moisture permeability, such as an epoxy resin, is preferred. Alternatively, a two-component resin may be used. An adhesive sheet or the like may be used.

In this specification and the like, a device formed using a metal mask or an FMM (fine metal mask) may be referred to as a device having an MM (metal mask) structure. In this specification and the like, a device formed without using a metal mask or an FMM may be referred to as a device having an MML (metal maskless) structure.

The above is the description of the light-emitting element.

At least part of this embodiment can be implemented in combination with the other embodiments described in this specification as appropriate.

Embodiment 4

Described in this embodiment is a metal oxide (hereinafter also referred to as an oxide semiconductor) that can be used in the OS transistor described in the above embodiment.

<Classification of Crystal Structures>

First, the classification of the crystal structures of an oxide semiconductor is described with reference to FIG. 39A. FIG. 39A is a diagram showing the classification of the crystal structures of an oxide semiconductor, typically IGZO (a metal oxide containing In, Ga, and Zn).

As shown in FIG. 39A, an oxide semiconductor is roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (cloud-aligned composite). Note that the term "Crystalline" excludes single crystal, poly crystal, and completely amorphous. The term "Crystal" includes single crystal and poly crystal.

Note that the structures in the thick frame shown in FIG. 39A are in an intermediate state between "Amorphous" and "Crystal", and belong to a new crystalline phase. That is, these structures are completely different from "Amorphous", which is energetically unstable, or "Crystal".

A crystal structure of a film or a substrate can be evaluated with an X-ray diffraction (XRD) spectrum. FIG. 39B shows an XRD spectrum, which is obtained by GIXD (Grazing-Incidence XRD) measurement, of a CAAC-IGZO film classified into "Crystalline". Note that a GIXD method is also referred to as a thin film method or a Seemann-Bohlin method. The XRD spectrum that is shown in FIG. 39B and obtained by GIXD measurement is hereinafter simply referred to as an XRD spectrum. The CAAC-IGZO film in FIG. 39B has a composition of In:Ga:Zn=4:2:3 [atomic ratio] or the neighborhood thereof. The CAAC-IGZO film in FIG. 39B has a thickness of 500 nm.

As shown in FIG. 39B, a clear peak indicating crystallinity is observed in the XRD spectrum of the CAAC-IGZO film. Specifically, a peak indicating c-axis alignment is observed at $2\theta$ of around 31° in the XRD spectrum of the CAAC-IGZO film. As shown in FIG. 39B, the peak at $2\theta$ of around 31° is asymmetric with the angle at which the peak intensity is observed as the axis.

A crystal structure of a film or a substrate can also be evaluated with a diffraction pattern obtained by a nanobeam electron diffraction (NBED) method (such a pattern is also referred to as a nanobeam electron diffraction pattern). FIG. 39C shows a diffraction pattern of the CAAC-IGZO film. FIG. 39C shows a diffraction pattern obtained by the NBED method in which an electron beam is incident in the direction parallel to the substrate. The CAAC-IGZO film in FIG. 39C has a composition of In:Ga:Zn=4:2:3 [atomic ratio] or the neighborhood thereof. In the nanobeam electron diffraction method, electron diffraction is performed with a probe diameter of 1 nm.

As shown in FIG. 39C, a plurality of spots indicating c-axis alignment are observed in the diffraction pattern of the CAAC-IGZO film.

[Structure of Oxide Semiconductor]

Oxide semiconductors might be classified in a manner different from the one in FIG. 39A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Next, the CAAC-OS, the nc-OS, and the a-like OS will be described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more minute crystals (crystals each of which has a maximum diameter of less than 10 nm). In the case where the crystal region is formed of one minute crystal, the maximum diameter of the crystal region is less than 10 nm. In the case where the crystal region is formed of a large number of minute crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example. When the CAAC-OS film is subjected to structural analysis by out-of-plane XRD measurement with an XRD apparatus using θ/2θ scanning, for example, a peak indicating c-axis alignment is detected at or around 2θ of 31°. Note that the position of the peak indicating c-axis alignment (the value of 2θ) may change depending on the kind, composition, or the like of the metal elements contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear grain boundary cannot be observed even in the vicinity of the distortion in the CAAC-OS. That is, formation of a grain boundary is inhibited by the distortion of a lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear grain boundary is observed is what is called polycrystal. It is highly probable that the grain boundary becomes a recombination center and traps carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is less likely to occur. Entry of impurities, formation of defects, or the like might decrease the crystallinity of an oxide semiconductor. This means that the CAAC-OS can be referred to as an oxide semiconductor having small amounts of impurities and defects (e.g., oxygen vacancies). Therefore, an oxide semiconductor including the CAAC-OS is physically stable. Consequently, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a minute crystal. Note that the size of the minute crystal is, for example, greater than or equal to 1 nm and less than or equal to 10 nm, particularly greater than or equal to 1 nm and less than or equal to 3 nm; thus, the minute crystal is also referred to as a nanocrystal. There is no regularity of crystal orientation between different nanocrystals in the nc-OS. Hence, the orientation in the whole film is not observed. Accordingly, in some cases, the nc-OS cannot be distinguished from an a-like OS or an amorphous oxide semiconductor, depending on an analysis method. For example, when an nc-OS film is subjected to structural analysis by out-of-plane XRD measurement with an XRD apparatus using θ/2θ scanning, a peak indicating crystallinity is not observed. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). In contrast, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[A-Like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has a higher hydrogen concentration in the film than the nc-OS and the CAAC-OS.

[Composition of Oxide Semiconductor]

Next, the CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. Alternatively, for example, the first region has [In] higher than [In] in the second region and [Ga] lower than [Ga] in the second region. Moreover, the second region has [Ga] higher than [Ga] in the first region and [In] lower than [In] in the first region.

Specifically, the first region contains indium oxide, indium zinc oxide, or the like as its main component. The second region contains gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, in EDX mapping obtained by energy dispersive X-ray spectroscopy (EDX), it is confirmed that the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current (Ion), high field-effect mobility ($\mu$), and excellent switching operation can be achieved.

An oxide semiconductor can have any of various structures that show various different properties. Two or more of the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, a case where the oxide semiconductor is used for a transistor is described.

When the above oxide semiconductor is used for a transistor, the transistor can have high field-effect mobility. In addition, the transistor can have high reliability.

An oxide semiconductor having a low carrier concentration is preferably used for the transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$ and higher than or equal to $1\times10^{9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charges trapped by the trap states in an oxide semiconductor take a long time to be released and may behave like fixed charges. Thus, a transistor whose channel formation region is formed in an oxide semiconductor having a high density of trap states has unstable electrical characteristics in some cases.

In order to obtain stable electrical characteristics of the transistor, it is effective to reduce the impurity concentration in the oxide semiconductor. In order to reduce the impurity concentration in the oxide semiconductor, the impurity concentration in an adjacent film is preferably reduced. Examples of impurities include hydrogen, nitrogen, alkali metal, alkaline earth metal, iron, nickel, and silicon.

<Impurity>

The influence of impurities in the oxide semiconductor is described.

When silicon or carbon, which is one of Group 14 elements, is contained in an oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by SIMS) are each set lower than or equal to $2\times10^{18}$ atoms/cm$^3$, preferably lower than or equal to $2\times10^{17}$ atoms/cm$^3$.

When the oxide semiconductor contains alkali metal or alkaline earth metal, defect states are formed and carriers are generated in some cases. Accordingly, a transistor including an oxide semiconductor that contains alkali metal or alkaline earth metal tends to have normally-on characteristics. Thus, the concentration of alkali metal or alkaline earth metal in the oxide semiconductor, which is obtained by SIMS, is set lower than or equal to $1\times10^{18}$ atoms/cm$^3$, preferably lower than or equal to $2\times10^{16}$ atoms/cm$^3$.

An oxide semiconductor containing nitrogen easily becomes n-type by generation of electrons serving as carriers and an increase in carrier concentration. As a result, a transistor including, as a semiconductor, an oxide semiconductor containing nitrogen tends to have normally-on characteristics. When nitrogen is contained in the oxide semiconductor, a trap state is sometimes formed. This might make the electrical characteristics of the transistor unstable. Thus, the nitrogen concentration in the oxide semiconductor, which is obtained by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in an oxide semiconductor reacts with oxygen bonded to a metal atom to be water, and thus causes an oxygen vacancy in some cases. Entry of hydrogen into the oxygen vacancy generates an electron serving as a carrier in some cases. Furthermore, in some cases, bonding of part of hydrogen to oxygen bonded to a metal atom causes generation of an electron serving as a carrier. Thus, a transistor including an oxide semiconductor containing hydrogen tends to have normally-on characteristics. For this reason, hydrogen in the oxide semiconductor is preferably reduced as much as possible. Specifically, the hydrogen concentration in the oxide semiconductor, which is obtained by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for a channel formation region in a transistor, stable electrical characteristics can be given.

At least part of this embodiment can be implemented in combination with the other embodiments described in this specification as appropriate.

Embodiment 5

In this embodiment, an integrated circuit with a display portion (hereinafter, also referred to as a display IC) and electronic devices each of which includes a display device of one embodiment of the present invention will be described.

Figure 40A:
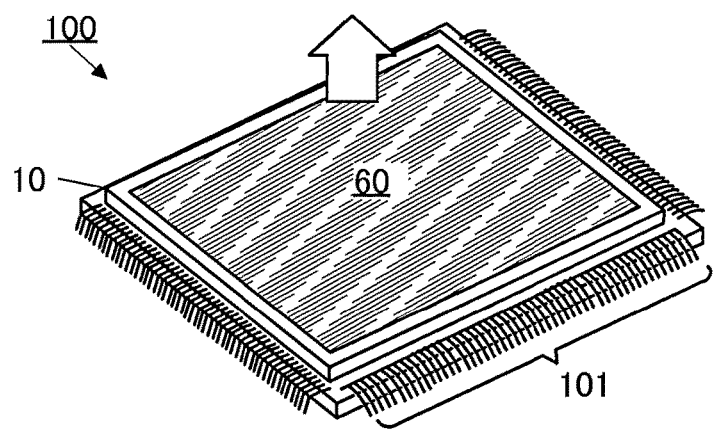
FIG. 40A and FIG. 40B are diagrams illustrating an example of a display IC.

FIG. 40A is a perspective view of a display IC 100 including the display device 10 of one embodiment of the present invention. The display IC 100 is illustrated to include the display device 10 and a plurality of pins 101. The display IC may include a heat sink for heat radiation or the like in addition to the pins 101. Note that the pins 101 may be an FPC.

The display IC 100 can have a structure in which light (indicated by an arrow in the diagram) is emitted from the display portion 60 included in the display device 10 so that an image is seen.

Figure 40B:
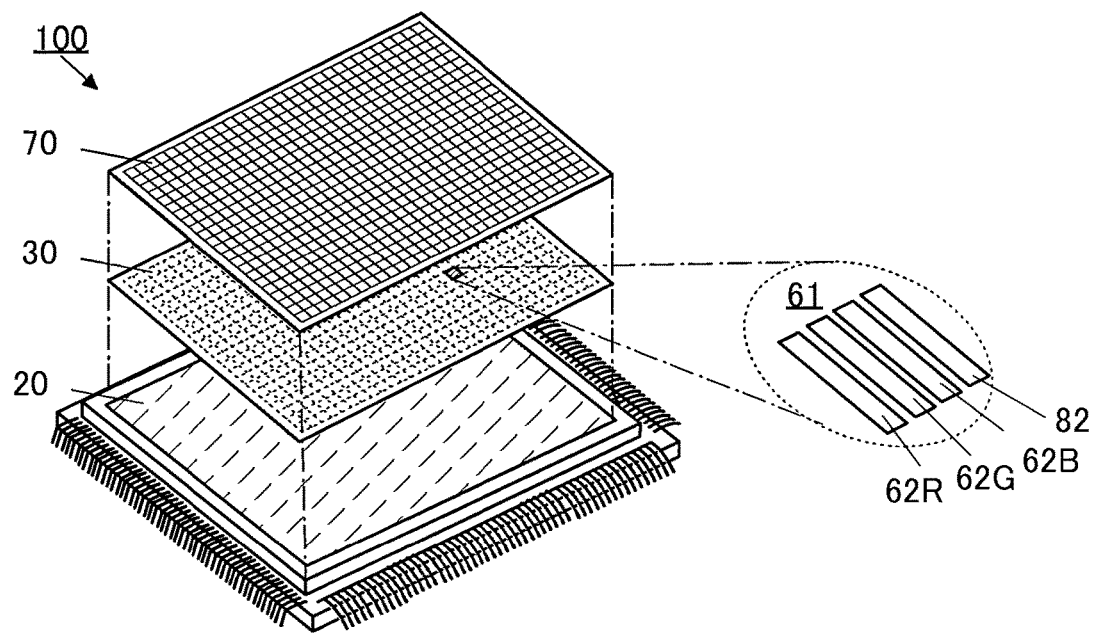

FIG. 40B is a perspective view schematically illustrating the structures of the layer 20, the layer 30, and the light-emitting element 70 of the display device 10. As described in Embodiment 1 above or the like, the layer 30 in which the OS transistors are provided includes the backup circuit 82 in addition to the pixel circuits 62R, 62G, and 62B in the region of the pixel 61.

As illustrated in FIG. 40B, the backup circuit 82 provided together with the pixel circuits 62R, 62G, and 62B can be provided for the RGB subpixels. The backup circuit 82 can retain data of the circuit such as the functional circuit 50 or the CPU 51, which is provided in the layer by using the OS transistors. The memory circuits 82B provided in the layer 30 in which the OS transistors are provided can be uniformly provided in the layer 30; hence, electrical connection between the backup circuit 82 and the functional circuit 50 or the CPU 51 can be easily made unlike in the case where the backup circuits 82 are locally provided.

Next, electronic devices each including the above display IC will be described.

Figure 41A:
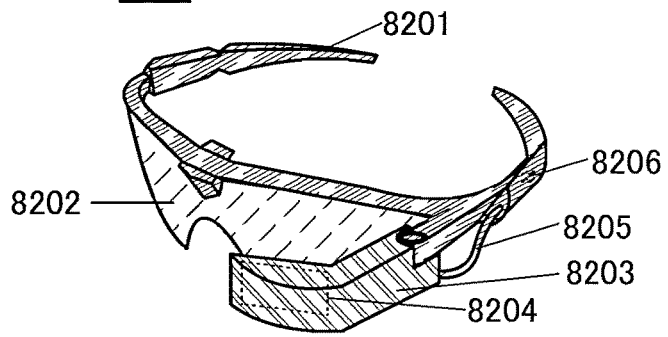
FIG. 41A to FIG. 41D are diagrams illustrating examples of electronic devices.

FIG. 41A is an external view of a head-mounted display 8200.

The head-mounted display 8200 includes a mounting portion 8201, a lens 8202, a main body 8203, a display portion 8204, a cable 8205, and the like. A battery 8206 is incorporated in the mounting portion 8201.

The cable 8205 supplies electric power from the battery 8206 to the main body 8203. The main body 8203 includes a wireless receiver or the like and can display an image corresponding to received image data on the display portion 8204. The movement of the eyeball or the eyelid of a user is captured by a camera in the main body 8203 and then coordinates of a user's sight line are calculated using the captured information to utilize the user's sight line as an input means.

The mounting portion 8201 may include a plurality of electrodes so as to be in contact with the user. The main body 8203 may have a function of sensing current flowing through the electrodes with the movement of the user's eyeball to recognize the user's sight line. The main body 8203 may have a function of sensing current flowing through the electrodes to monitor the user's pulse. The mounting portion 8201 may include sensors such as a temperature sensor, a pressure sensor, and an acceleration sensor to have a function of displaying the user's biological information on the display portion 8204. The main body 8203 may have a function of sensing the movement of the user's head or the like to move an image displayed on the display portion 8204 in synchronization with the movement of the user's head or the like.

The display IC of one embodiment of the present invention can be used in the display portion 8204. Thus, power consumption of the head-mounted display 8200 can be reduced, so that the head-mounted display 8200 can be used continuously for a long time. The power consumption of the head-mounted display 8200 can be reduced, which allows the battery 8206 to be downsized and get lighter and accordingly allows the head-mounted display 8200 to be downsized and get lighter. Thus, a burden on the user of the head-mounted display 8200 can be reduced, and the user is less likely to feel fatigue.

Figure 41B:
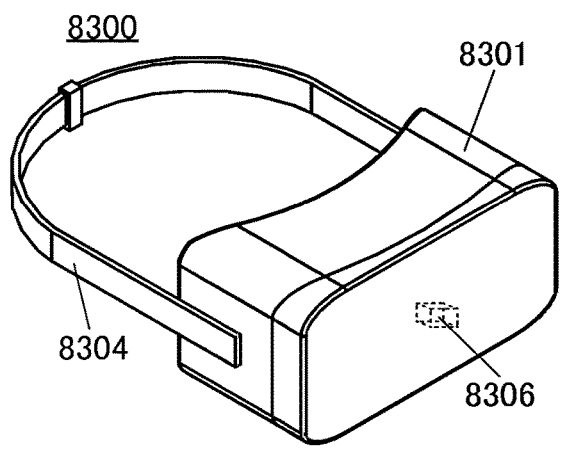
Figure 41C:
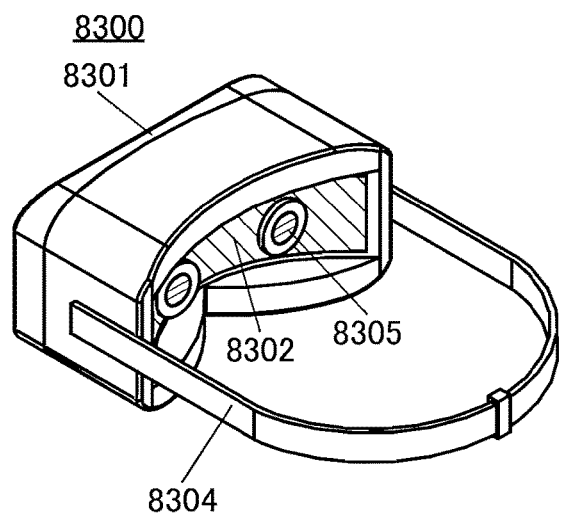
Figure 41D:
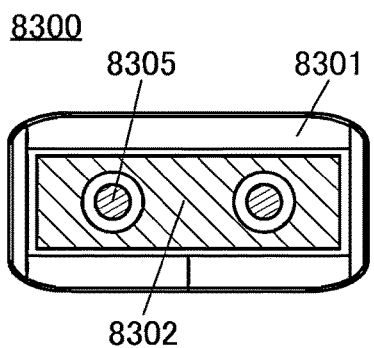

FIG. 41B, FIG. 41C, and FIG. 41D are external views of a head-mounted display 8300. The head-mounted display 8300 includes a housing 8301, a display portion 8302, a fixing band 8304, and a pair of lenses 8305. A battery 8306 is incorporated in the housing 8301, and electric power can be supplied from the battery 8306 to the display portion 8302 or the like.

A user can see display on the display portion 8302 through the lenses 8305. It is favorable that the display portion 8302 be curved and provided. When the display portion 8302 is curved and provided, a user can feel high realistic sensation. Although the structure in which one display portion 8302 is provided is described as an example in this embodiment, the structure is not limited thereto, and two display portions 8302 may be provided, for example. In that case, one display portion is placed for one eye of the user, so that three-dimensional display using parallax or the like is possible.

The above-mentioned display IC can be used in the display portion 8302. Thus, power consumption of the head-mounted display 8300 can be reduced, so that the head-mounted display 8300 can be used continuously for a long time. The power consumption of the head-mounted display 8300 can be reduced, which allows the battery 8306 to be downsized and get lighter and accordingly allows the head-mounted display 8300 to be downsized and get lighter. Consequently, a burden on the user of the head-mounted display 8300 can be reduced, and the user is less likely to feel fatigue.

Figure 42A:
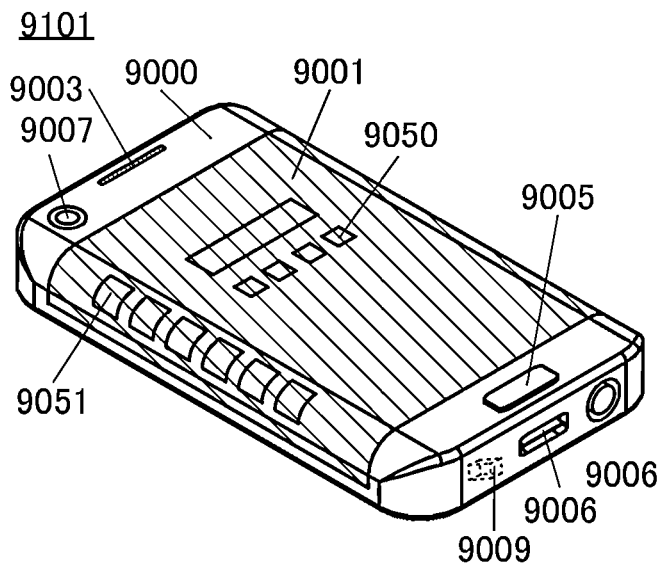
FIG. 42A and FIG. 42B are diagrams illustrating examples of electronic devices.
Figure 42B:
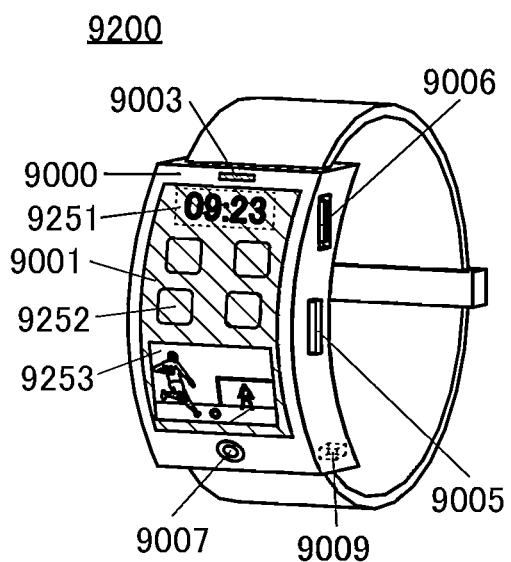

Next, FIG. 42A and FIG. 42B illustrate examples of electronic devices that are different from the electronic devices illustrated in FIG. 41A to FIG. 41D.

Electronic devices illustrated in FIG. 42A and FIG. 42B each include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, an electric field, current, voltage, electric power, radiation, a flow rate, humidity, gradient, oscillation, a smell, or infrared rays), a battery 9009, and the like.

The electronic devices illustrated in FIG. 42A and FIG. 42B have a variety of functions. For example, the electronic devices can have a variety of functions, such as a function of displaying a variety of information (a still image, a moving image, a text image, and the like) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading a program or data stored in a memory medium and displaying the program or data on the display portion. Note that functions of the electronic devices in FIG. 42A and FIG. 42B are not limited to the above, and the electronic devices can have a variety of functions. Although not illustrated in FIG. 42A and FIG. 42B, a plurality of display portions may be included in the electronic devices. The electronic devices may have a camera or the like and a function of taking a still image, a function of taking a moving image, a function of storing the taken image in a memory medium (an external memory medium or a memory medium incorporated in the camera), a function of displaying the taken image on the display portion, or the like.

The electronic devices in FIG. 42A and FIG. 42B are described in detail below.

FIG. 42A is a perspective view showing a portable information terminal 9101. The portable information terminal 9101 has a function of, for example, one or more selected from a telephone set, a notebook, an information browsing system, and the like. Specifically, the portable information terminal 9101 can be used as a smartphone. The portable information terminal 9101 can display text or an image on its plurality of surfaces. For example, three operation buttons 9050 (also referred to as operation icons, or simply, icons) can be displayed on one surface of the display portion 9001. Furthermore, information 9051 indicated by dashed rectangles can be displayed on another surface of the display portion 9001. Examples of the information 9051 include display indicating reception of an e-mail, an SNS (social networking service), or a telephone call; the title of an e-mail, an SNS, or the like; the sender of an e-mail, an SNS, or the like; the date; the time; remaining battery; and the reception strength of an antenna. Alternatively, the operation buttons 9050 or the like may be displayed on the position where the information 9051 is displayed, in place of the information 9051.

The above-mentioned display IC can be used in the portable information terminal 9101. Thus, power consumption of the portable information terminal 9101 can be reduced, so that the portable information terminal 9101 can be continuously used for a long time. The power consumption of the portable information terminal 9101 can be reduced, which allows the battery 9009 to be downsized and get lighter and accordingly allows the portable information terminal 9101 to be downsized and get lighter. Thus, the portability of the portable information terminal 9101 can be increased.

FIG. 42B is a perspective view of a watch-type portable information terminal 9200. The portable information terminal 9200 is capable of executing a variety of applications such as mobile phone calls, e-mailing, viewing and editing texts, music reproduction, Internet communication, and computer games. The display surface of the display portion 9001 is curved, and display can be performed on the curved display surface. FIG. 42B illustrates an example in which time 9251, operation buttons 9252 (also referred to as operation icons, or simply, icons), and a content 9253 are displayed on the display portion 9001. The content 9253 can be a moving image, for example.

The portable information terminal 9200 can employ near field communication conformable to a communication standard. For example, mutual communication with a headset capable of wireless communication can be performed, and thus hands-free calling is possible. The portable information terminal 9200 includes the connection terminal 9006, and data can be directly transmitted to and received from another information terminal via a connector. Power charging through the connection terminal 9006 is also possible. Note that the charging operation may be performed by wireless power feeding without using the connection terminal 9006.

The above-mentioned display IC can be used in the portable information terminal 9200. Thus, power consumption of the portable information terminal 9200 can be reduced, so that the portable information terminal 9200 can be continuously used for a long time. The power consumption of the portable information terminal 9200 can be reduced, which allows the battery 9009 to be downsized and get lighter and accordingly allows the portable information terminal 9200 to be downsized and get lighter. Thus, the portability of the portable information terminal 9200 can be increased.

At least part of this embodiment can be implemented in combination with the other embodiments described in this specification as appropriate.

Supplementary Notes on Description in this Specification and the Like

The following are notes on the description of the foregoing embodiments and the structures in the embodiments.

One embodiment of the present invention can be constituted by appropriately combining the structure described in an embodiment with any of the structures described in the other embodiments. In addition, in the case where a plurality of structure examples are described in one embodiment, the structure examples can be combined as appropriate.

Note that a content (or part thereof) described in one embodiment can be applied to, combined with, or replaced with another content (or part thereof) in the same embodiment and/or a content (or part thereof) described in another embodiment or other embodiments, for example.

Note that in each embodiment, a content described in the embodiment is a content described with reference to a variety of diagrams or a content described with text disclosed in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In this specification and the like, components are classified on the basis of the functions, and shown as blocks independent of one another in block diagrams. However, in an actual circuit and the like, it is difficult to classify such components on the basis of the functions, and there is a case where one circuit is associated with a plurality of functions or a case where a plurality of circuits are associated with one function. Therefore, blocks in the block diagrams are not limited by the components described in the specification, and the description can be changed appropriately depending on situations.

In drawings, the size, the layer thickness, or the region is shown arbitrarily for description convenience. Therefore, the size, the layer thickness, or the region is not limited to the illustrated scale. Note that the drawings are schematically shown for clarity, and embodiments of the present invention are not limited to shapes, values, or the like shown in the drawings. For example, variation in signal, voltage, or current due to noise or variation in signal, voltage, or current due to difference in timing can be included.

In this specification and the like, the terms "one of a source and a drain" (or a first electrode or a first terminal) and "the other of the source and the drain" (or a second electrode or a second terminal) are used to describe the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, the terms such as "electrode" and "wiring" do not limit the functions of the components. For example, an "electrode" is used as part of a wiring in some cases, and vice versa. Furthermore, the term "electrode" or "wiring" can also mean a combination of a plurality of electrodes or wirings provided in an integrated manner, for example.

In this specification and the like, voltage and potential can be replaced with each other as appropriate. The voltage refers to a potential difference from a reference potential, and when the reference potential is a ground potential, for example, the voltage can be replaced with the potential. The ground potential does not necessarily mean 0 V. Potentials are relative values, and a potential supplied to a wiring or the like is sometimes changed depending on the reference potential.

In this specification and the like, the terms "film" and "layer" can be interchanged with each other depending on the case or circumstances. For example, the term "conductive layer" can be changed to the term "conductive film" in some cases. As another example, the term "insulating film" can be changed to the term "insulating layer" in some cases.

In this specification and the like, a switch has a function of controlling whether current flows or not by being in a conduction state (on state) or a non-conduction state (off state). Alternatively, a switch has a function of selecting and changing a current path.

In this specification and the like, the channel length refers to, for example, the distance between a source and a drain in a region where a semiconductor (or a portion where current flows in a semiconductor when a transistor is on) and a gate overlap with each other or in a region where a channel is formed in a top view of the transistor.

In this specification and the like, the channel width refers to, for example, the length of a portion where a source and a drain face each other in a region where a semiconductor (or a portion where current flows in a semiconductor when a transistor is on) and a gate electrode overlap with each other or in a region where a channel is formed.

In this specification and the like, the expression "A and B are connected" means the case where A and B are electrically connected to each other as well as the case where A and B are directly connected to each other. Here, the expression "A and B are electrically connected" means the case where electric signals can be transmitted and received between A and B when an object having any electric action exists between A and B.

REFERENCE NUMERALS

10: display device, 20: layer, 30: layer, 40: driver circuit, 50: functional circuit, 60: display portion, 61: pixel, 62R, 62G, 62B: pixel circuit, 80: flip-flop, 82: backup circuit, BD: backup data

The invention claimed is:

1. A display device comprising:
a pixel circuit; a driver circuit; and a functional circuit,
wherein the driver circuit is configured to output a signal for performing display in the pixel circuit,
wherein the functional circuit comprises a CPU comprising a CPU core comprising a flip-flop electrically connected to a backup circuit,
the display device further comprising:
a first transistor and a second transistor;
an insulator over the first transistor and the second transistor; and
a third transistor and a fourth transistor over the insulator,
wherein the driver circuit comprises the first transistor,
wherein the flip-flop comprises the second transistor,
wherein the pixel circuit comprises the third transistor, and
wherein the backup circuit comprises the fourth transistor.

2. The display device according to claim 1,
wherein the backup circuit is configured to retain data retained in the flip-flop in a state where supply of a power supply voltage is stopped when the CPU does not operate.

3. The display device according to claim 1,
wherein the functional circuit comprises an accelerator, and
wherein the accelerator is a circuit performing product-sum operation.

4. The display device according to claim 1,
wherein the pixel circuit comprises an organic EL device, and
wherein the organic EL device is a light-emitting device processed by a photolithography method.

5. The display device according to claim 1,
wherein the backup circuit comprises a capacitor electrically connected to the fourth transistor.

6. A display device comprising:
a pixel circuit; a driver circuit; and a functional circuit,
wherein the driver circuit is configured to output an image signal for performing display in the pixel circuit,
wherein the functional circuit comprises a CPU comprising a CPU core comprising a flip-flop electrically connected to a backup circuit,
the display device further comprising:
a first transistor and a second transistor;
an insulator over the first transistor and the second transistor; and
a third transistor and a fourth transistor over the insulator,
wherein the driver circuit comprises the first transistor,
wherein the flip-flop comprises the second transistor,
wherein the pixel circuit comprises the third transistor,
wherein the backup circuit comprises the fourth transistor, and
wherein the CPU is configured to correct the image signal in accordance with an amount of current flowing through the pixel circuit.

7. The display device according to claim 6,
wherein the backup circuit is configured to retain data retained in the flip-flop in a state where supply of a power supply voltage is stopped when the CPU does not operate.

8. The display device according to claim 6,
wherein the functional circuit comprises an accelerator, and wherein the accelerator is a circuit performing product-sum operation.

9. The display device according to claim 6,
wherein the pixel circuit comprises an organic EL device, and
wherein the organic EL device is a light-emitting device processed by a photolithography method.

10. The display device according to claim 6,
wherein the backup circuit comprises a capacitor electrically connected to the fourth transistor.

11. A display device comprising:
a pixel circuit; a driver circuit; and a functional circuit,
wherein the driver circuit is configured to output an image signal for performing display in the pixel circuit,
wherein the functional circuit comprises a CPU comprising a CPU core comprising a flip-flop electrically connected to a backup circuit,
the display device further comprising:
a first transistor and a second transistor;
an insulator over the first transistor and the second transistor; and
a third transistor and a fourth transistor over the insulator,
wherein the driver circuit comprises the first transistor,
wherein the flip-flop comprises the second transistor,
wherein the pixel circuit comprises the third transistor,
wherein the backup circuit comprises the fourth transistor, and
wherein the first transistor comprises a semiconductor layer comprising silicon in a channel formation region,
wherein the fourth transistor comprises a semiconductor layer comprising a metal oxide in a channel formation region, and
wherein the CPU is configured to correct the image signal in accordance with an amount of current flowing through the pixel circuit.

12. The display device according to claim 11,
wherein the metal oxide comprises In, an element M, and Zn, and
wherein M is one or more of Al, Ga, Y, and Sn.

13. The display device according to claim 11,
wherein the backup circuit is configured to retain data retained in the flip-flop in a state where supply of a power supply voltage is stopped when the CPU does not operate.

14. The display device according to claim 11,
wherein the functional circuit comprises an accelerator, and
wherein the accelerator is a circuit performing product-sum operation.

15. The display device according to claim 11,
wherein the pixel circuit comprises an organic EL device, and
wherein the organic EL device is a light-emitting device processed by a photolithography method.

16. The display device according to claim 11,
wherein the backup circuit comprises a capacitor electrically connected to the fourth transistor.

* * * * *